(12) United States Patent
Makeev

(10) Patent No.: US 11,766,837 B2
(45) Date of Patent: Sep. 26, 2023

(54) CARBON-FIBER REINFORCED POLYMERIC COMPOSITES AND METHODS RELATED THERETO

(71) Applicant: BOARD OF REGENTS, THE UNIVERSITY OF TEXAS SYSTEM, Austin, TX (US)

(72) Inventor: Andrew Makeev, Arlington, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 58 days.

(21) Appl. No.: 17/606,137

(22) PCT Filed: May 4, 2020

(86) PCT No.: PCT/US2020/031269
§ 371 (c)(1),
(2) Date: Oct. 25, 2021

(87) PCT Pub. No.: WO2020/242727
PCT Pub. Date: Dec. 3, 2020

(65) Prior Publication Data
US 2022/0297390 A1      Sep. 22, 2022

Related U.S. Application Data

(60) Provisional application No. 62/843,081, filed on May 3, 2019.

(51) Int. Cl.
*B29C 70/08* (2006.01)
*B29C 70/02* (2006.01)
(Continued)

(52) U.S. Cl.
CPC ............ *B29C 70/08* (2013.01); *B29C 70/025* (2013.01); *C08J 5/042* (2013.01); *C08J 5/10* (2013.01); *B29K 2063/00* (2013.01); *B29K 2105/089* (2013.01); *B29K 2105/16* (2013.01); *B29K 2105/251* (2013.01); *B29K 2307/04* (2013.01);
(Continued)

(58) Field of Classification Search
CPC ...... D21H 13/50; B29C 70/08; B29C 70/025; C08J 5/10; C08J 5/042; C08J 2363/00; B29K 2063/00; B29K 2105/089; B29K 2105/16; B29K 2105/251; B29K 2307/04; B29K 2507/04; B29K 2509/02
USPC ........ 442/179; 428/294.1, 297.4, 298.7, 299, 428/364, 365, 361, 375, 378
See application file for complete search history.

(56) References Cited

U.S. PATENT DOCUMENTS

| | | |
|---|---|---|
| 6,503,856 B1 | 1/2003 | Broadway et al. |
| 2013/0344325 A1 | 12/2013 | Nguyen et al. |

(Continued)

FOREIGN PATENT DOCUMENTS

JP      2016081900      * 5/2016

OTHER PUBLICATIONS

Hexcel HexTow IM2A Carbon Fiber, accessed online Feb. 13, 2023.*

(Continued)

*Primary Examiner* — Camie S Thompson
(74) *Attorney, Agent, or Firm* — Meunier Carlin & Curfman LLC

(57) ABSTRACT

Disclosed herein are carbon-fiber reinforced polymeric composite and methods related thereto.

18 Claims, 28 Drawing Sheets

(51) Int. Cl.

| | | |
|---|---|---|
| *C08J 5/04* | (2006.01) | |
| *C08J 5/10* | (2006.01) | |
| *B29K 63/00* | (2006.01) | |
| *B29K 105/08* | (2006.01) | |
| *B29K 105/16* | (2006.01) | |
| *B29K 105/00* | (2006.01) | |
| *B29K 307/04* | (2006.01) | |
| *B29K 507/04* | (2006.01) | |
| *B29K 509/02* | (2006.01) | |

(52) U.S. Cl.
CPC ...... *B29K 2507/04* (2013.01); *B29K 2509/02* (2013.01); *C08J 2363/00* (2013.01)

(56) References Cited

U.S. PATENT DOCUMENTS

| | | |
|---|---|---|
| 2015/0240042 A1 | 8/2015 | Nguyen et al. |
| 2016/0114556 A1 | 4/2016 | Le Lay et al. |
| 2016/0209143 A1* | 7/2016 | Curliss .................... F41A 21/04 |

OTHER PUBLICATIONS

Nippon Graphite Fiber Corporation, Granoc Yarn XN Series, accessed online Feb. 13, 2023.*
American Society for Testing and Materials (2006). Standard Test Method for Short-Beam Strength of Polymer Matrix Composite Materials and Their Laminates. ASTM Standard D 2344/D 2344M, ASTM International, West Conshohocken, PA. 8 pages.
Argon AS., "Fracture of Composites," Treatise on Materials Science & Technology, vol. 1, pp. 79-114, 1972.
Budiansky B et al. "Compressive failure of fibre composites," Journal of the Mechanics and Physics of Solids, vol. 41, No. 1, pp. 183-211, 1993.
Canal LP et al. "Intraply fracture of fiber-reinforced composites: Microscopic mechanisms and modeling," Composites Science and Technology, pp. 1223-1232, 2012.
Chandra N et al. "Interfacial mechanics of push-out tests: theory and experiments," Composites: Part A, vol. 32, pp. 575-584, 2001.
Cytec (2012). CYCOM 381 Epoxy Prepreg. Technical Data Sheet. 11 pages.
Dharan CKH et al. "Longitudinal Compressive Strength of Continuous Fiber Composites," Journal of Composite Materials, vol. 41, No. 11, 2007. pp. 1389-17.
Dow NF e al. "Evaluations of filament-reinforced composites for aerospace structural application," NASA CR-207, 1965, 187 pages.
El-Hofy MH et al. "Laser beam machining of carbon fiber reinforced composites: a review," The International Journal of Advanced Manufacturing Technology, vol. 101, p. 2965-2975, 2019.
Ghaffari S et al. "Microstructural Methods for Developing High-Performance Composite Materials," in AIAA SciTech Forum, Orlando, 2020, 16 pages.
Godara A et al. "Interfacial shear strength of a glass fiber/epoxy bonding in composites modified with carbon nanotubes," Composites Science and Technology, pp. 1346-1352, 2010.
Grafil, Inc. (2008). PYROFIL TM HS40 12K Typical Fiber Properties. Accessed at https://www.rockwestcomposites.com/media/downloads/HS40-12K_(07_2008).pdf on Feb. 26, 2019, 1 page.
Hackett et al. (2010). Improved Carbon Fiber Composite Compression Strength and Shear Stiffness through Matrix Modification with Nanosilica. American Society for Composites 25th Technical Conference, 15 pages.
Hackett S et al. (2010). The effect of nanosilica concentration on the enhancement of epoxy matrix resins for prepreg composites. SAMPE. Accesed at http://multimedia.3m.com/mws/mediawebserver?mwsId=ttttvW9lEgUmy7VpzAVpy7 _ 2XW62EW9iXut2Xut2ttttt -&fn=Prepreg _ WhitePaper704.pdf on Feb. 26, 2019, 17 pages.
Hapke J et al. "Compressive failure of UD-CFRP containing void defects: In situ SEM microanalysis," Composites Science and Technology, vol. 71, No. 9, pp. 1242-1249, 2011.

Herrera-Franco PJ et al. "Comparison of methods for the measurement of fibre/matrix adhesion in composites," Composites, vol. 23, No. 1, pp. 2-27, 1992.
Hexcel Corporation. (2016). HexPly® 8552 Mid-Toughened, High Strength, Damage-Resistant, Structural Epoxy Matrix. Product Data Sheet. Accesed at https://www.hexcel.com/user_area/content_media/raw/HexPly_8552_US_Datasheet.pdf on Feb. 26, 2019, 6 pages.
Hexcel Corporation. (2016). HexPly® 913 257° F (125° C) Curing Epoxy Matrix. Product Data Sheet. Accesed at https://www.hexcel.com/user_area/content_media/raw/HexPly_913_us_DataSheet.pdf on Feb. 26, 2019, 5 pages.
Hexcel Corporation. (2016). HexTow® HM63 Carbon Fiber. Product Data Sheet. Accesed at https://www.hexcel.com/user_area/content_media/raw/HM63_Aerospace_HexTow_DataSheet.pdf on Feb. 26, 2019, 2 pages.
Hexcel Corporation. (2016). HexTow® IM8 Carbon Fiber. Product Data Sheet. Accesed at https://www.hexcel.com/user_area/content_media/raw/IM8_HexTow_DataSheet.pdf on Feb. 26, 2019, 2 pages.
Hexcel Corporation. (2018). HexTow® IM7 Carbon Fiber. Product Data Sheet. Accesed at https://www.hexcel.com/user_area/content_media/raw/IM7_HexTow_DataSheet.pdf on Feb. 26, 2019, 2 pages.
Kerans RJ et al. "Theoretical Analysis of the Fiber Pullout and Pushout Tests," Journal of the American Ceramic Society 74(7), 1991, 1585-96.
Kumar S et al. (1988). Compressive strength of high performance fibers. In MRS Online Proceedings Library Archive: 134 https://doi.org/10.1557/ PROC-134-363. pp. 363-374.
Kyriakides et al. (1995). On the compressive failure of fiber reinforced composites. International Journal of Solids and Structures, 32 (6-7), 689-738.
Laffan MJ et al. "Measurement of the fracture toughness associated with the longitudinal fibre compressive failure mode of laminated composites," Composites: Part A, vol. 43, No. 11, pp. 1930-1938, 2012.
Liu X et al. "Laser ablation and micromachining with ultrashort laser pulses," IEEE Journal of Quantum Electronics, vol. 33, No. 10, 1997, pp. 1706-1716.
Lo KH et al. (1992). Compressive strength of unidirectional composites. Journal of Reinforced Plastics and Composites, 11 (8), 838-896. doi:https://doi.org/10.1177/073168449201100801.
Loumena C et al. "Potentials for lasers in CFRP production," International Congress on Applications of Lasers & Electro-Optics, No. 1, pp. 1026-1034, 2012.
Madhukar MS et al. "Fiber-Matrix Adhesion and Its Effect on Composite Mechanical Properties. III. Longitudinal (0°) Compressive Properties of Graphite/Epoxy Composites," Journal of Composite Materials, vol. 26, No. 3, p. 310-333, 1992.
Makeev A et al. "Fatigue life assessment for composite structures," in 26th ICAF Symposium, Montréal, Jun. 2011, 16 pages.
Makeev A et al. "Improving compressive strength of high modulus carbon-fiber reinforced polymeric composites through fiber hybridization," International Journal of Engineering Science, vol. 142, pp. 145-157, 2019.
Makeev, et al. (2009). A Test Method for Assessment of Shear Properties of Thick Composites. Journal of Composite Materials, 43 (25), 3091-3105.
Makeev, et al. (2012). A Method for Measurement of Multiple Constitutive Properties for Composite Materials. Composites Part A: Applied Science and Manufacturing, 43 (12), 2199-2210.
Makeev, et al. (2013). Short-Beam Shear Method for Assessment of Stress-Strain Curves for Fiber-Reinforced Polymer-Matrix Composite Materials. Strain, 49 (5), 440-450.
Makeev, et al. (2014). In Quest of Methods for Measuring 3D Mechanical Properties of Composites. Composites Science and Technology, 100 (2014), 105-112.
Makeev, et al. (2015). Advanced Composite Materials Technology for Rotorcraft through the Use of Nanoadditives. Journal of the American Helicopter Society, 60 (3), 1-10.
Makeev, et al. (2019). Analysis Methods for Improving Confidence in Material Qualification for Laminated Composites. Journal of the American Helicopter Society, 64 (1), Jan. 2006, 1-13.

(56) References Cited

OTHER PUBLICATIONS

Marshall DB et al. "An Indentation Method for Measuring Matrix-Fiber Frictional Stresses in Ceramic Composites," The American Ceramic Society, vol. 67, No. 12, pp. C-259-C-260, 1984.

Marshall DB et al. "Measurement of Interfacial Mechanical Properties in Fiber-Reinforced Ceramic Composites," American Ceramic Society, vol. 70, No. 8, pp. 542-548, 1987.

Mitsubishi Chemical Corporation. (2017). Pyrofol TM MR 70 12P Intermediate Modulus Carbon Fiber with Super High Strength. Product Data Sheet, 1 page.

Moran PM et al. "Kink band formation and band broadening in fiber composites under compressive loading," Acta Metallurgica et Materialia, vol. 43, No. 8, pp. 2943-2958, 1995.

Moran PM et al. "Kink band propagation and broadening in ductile matrix fiber composites: Experiments and analysis," International Journal of Solids and Structures, vol. 35, No. 15, pp. 1709-1722, 1998.

Nairn JA et al. "Stress Transfer Into A Fragmented, Anisotropic Fiber Through An Imperfect Interface," International Journal of Solids Structures, vol. 34, No. 10, pp. 1255-1281, 1996.

Naya F et al. "Computational micromechanics of fiber kinking in unidirectional FRP under different environmental conditions," Composites Science and Technology, vol. 144, pp. 26-35, 2017.

Naya F et al. "Interface Characterization in Fiber-Reinforced Polymer-Matrix Composites," The minerals, Metals & Materials Society, 2016.

Niino H et al. "Laser Cutting of Carbon Fiber Reinforced Plastics (CFRP and CFRTP) by IR Fiber Laser Irradiation," JLMN—Journal of Laser Micro/Nanoengineering, vol. 11, No. 1, pp. 104-110, 2016.

Patel RS et al. "Laser Machining Of CFRP," in 21st International Conference on Composite Materials, Xi'an, 2017, 7 pages.

Pimenta S et al. "A micromechanical model for kink-band formation: Part I—Experimental study and numerical modelling," Composites Science and Technology, vol. 69, No. 7-8, pp. 948-955, 2009.

Rosen BW. (1965). Mechanics of Composite Strengthening. Fibre Composite Materials (pp. 37-75). American Society of Metals.

SACMA SRM 1R-94. (1994). Test Method for Compressive Properties of Orientated Fiber-Resin Composites. Suppliers of Advanced Composite Materials Association. Arlington, VA. 14 pages.

Salama A et al. "High-power picosecond laser drilling/machining of carbon fibre-reinforced polymer (CFRP) composites," Applied physics A, vol. 73, No. 122, 2016.

Schultheisz CR et al. "Compressive failure of composites, part I: testing and micromechanical theories," Progress Aerospace Science, vol. 32, 1996.

Seon G et al. "Mesh Morphing Methodology for Strength Predictions in Composites, Composite Structures,," Composite Structures, vol. 140 , p. 612-620, 2016.

Seon G et al. "Structures Perspective for Strength and Fatigue Prognosis in Composites with Manufacturing Irregularities," Journal of the American Helicopter Society, vol. 60, No. 1, pp. 1-10, 2015.

Sha J et al. "Measurement and analysis of fiber-matrix interface strength of carbon fiber-reinforced phenolic resin matrix composites," Journal of Composite Materials, vol. 48, No. 11, pp. 1303-1311, 2014.

Sivashanker S et al. "Microbuckle propagation in a unidirectional carbon fibre-epoxy matrix composite," Acta Materialia, vol. 44, No. 7, pp. 2581-2590, 1996.

Soutis C et al. "Static Compression Failure of Carbon Fibre T800/924C Composite Plate with a Single Hole," Journal of Composite Materials, vol. 24, No. 5, p. 536-558, 1990.

Sun Q et al. "Experimental and computational analysis of failure mechanisms in unidirectional carbon fiber reinforced polymer laminates under longitudinal compression loading," Composite Structures, vol. 203, pp. 335-348, 2018.

Suriano R et al. "Femtosecond laser ablation of polymeric substrates for the fabrication of microfluidic channels," Applied Surface Science, vol. 257, No. 14, pp. 6243-6250, 2011.

Sutcliffe MF et al. "Microbuckle propagation in carbon fibre-epoxy composites," Acta metallurgica et materialia, vol. 42, No. 7, pp. 2219-2231, 1994.

Toray. (2018). M55J High Modulus Carbon Fiber. Accessed at https://www.toraycma.com/file _ viewer.php?id=5096 on Feb. 26, 2019 2 pages.

Totry E et al. "Effect of fiber, matrix and interface properties on the in-plane shear deformation of carbon-fiber reinforced composites," Composites Science and Technology, p. 970-980, 2010.

Waas AM et al. "Compressive failure of composites, part II: Experimental studies," Progress in Aerospace Sciences, vol. 32, No. 1, pp. 43-78, 1996.

Wang Y et al. "Evolution of kink bands in a notched unidirectional carbon fibre-epoxy composite under four-point bending," Composites Science and Technology, vol. 172, pp. 143-152, 2019.

Wang Y et al. "X-ray computed tomography study of kink bands in unidirectional composites," Composite Structures, vol. 160, pp. 917-924, 2017.

Wang Y et al. "X-Ray Microtomographic Imaging Of Kink Bands In Carbon Fibre-Epoxy Composites," In 16th European Conference On Composite Materials, Seville, Spain, 2014.

Weber R et al. "Heat accumulation during pulsed laser materials processing," Optics Express, vol. 22, No. 9, pp. 11312-11324, 2014.

Wind JL et al. "Initiation of failure at notches in unidirectional fiber composites," Composite Structures, vol. 122, pp. 51-56, 2015.

Young R et al. "Fragmentation analysis of glass fibres in model composites through the use of Raman spectroscopy," Composites Part A: Applied Science and Manufacturing, vol. 32, No. 2, pp. 253-269, 2001.

Zhandarov S et al. "Characterization of fiber/matrix interface strength: applicability of different tests, approaches and parameters," Composites Science and Technology, vol. 65, No. 1, pp. 149-160, 2005.

Zhou XF et al. "Interfacial properties of polymer composites measured by push-out and fragmentation tests," Composites Part A: Applied Science and Manufacturing, vol. 32, No. 11, pp. 1543-1551, 2001.

International Search Report and Written Opinion issued in PCT/US2020/031269, dated Nov. 17, 2020, 9 pages.

Corrected International Preliminary Report on Patentability issued in PCT/US2020/031269, dated Jul. 2, 2021, 10 pages.

\* cited by examiner (a) (b) (c)

CARBON-FIBER REINFORCED POLYMERIC COMPOSITES AND METHODS RELATED THERETO

CROSS-REFERENCE TO RELATED APPLICATIONS

This is a national stage application filed under 35 U.S.C. § 371 of International Application No. PCT/US2020/031269, filed May 4, 2020, which claims the benefit of priority to U.S. Provisional Application No. 62/843,081 filed May 3, 2019, each of which are hereby incorporated herein by reference in their entirety.

STATEMENT ACKNOWLEDGING GOVERNMENT SUPPORT

The invention was made with government support under Grant No. W911W6-17-2-0002 awarded by The United States Army. The government has certain rights in the invention.

BACKGROUND

There has been a strong demand in using high-modulus (HM) carbon-fiber composites potentially enabling lightweight aircraft structures with significant weight savings. However, extremely low fiber-direction compressive strength has been a well-recognized weakness of the HM composites, prohibiting their implementation in aircraft platforms. The compositions and methods described herein address this and other needs. For example, by hybridizing fibers with varying moduli, as discussed herein, the fiber-direction compressive strength of composites can be improved.

SUMMARY

In accordance with the purposes of the disclosed systems and methods, as embodied and broadly described herein, the disclosed subject matter relates carbon-fiber reinforced polymeric composite and methods related thereto.

Additional advantages of the disclosed materials and methods will be set forth in part in the description which follows, and in part will be obvious from the description. The advantages of the disclosed materials and methods will be realized and attained by means of the elements and combinations particularly pointed out in the appended claims. It is to be understood that both the foregoing general description and the following detailed description are exemplary and explanatory only and are not restrictive of the disclosed systems and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

FIG. 21a) Schematic illustration of the FPB specimen with dimensions, FIG. 21b) schematic illustration of the specimen and Plexiglas assembly, FIG. 21c) specimen bonded to Plexiglas antibuckling guides, and FIG. 21d) specimen and Plexiglas antibuckling supports.

FIG. 27a) FEI Versa 3D SEM, FIG. 27b) Bruker integrated PI 88 SEM PicoIndenter load frame, and FIG. 27c) fiber push-out test specimen and fixture.

(FIG. 39a) FEI Versa 3D SEM; (FIG. 39b) Bruker integrated PI 88 SEM PicoIndenter load frame; and (FIG. 39c) test sample and fixture.

(FIG. 43a, FIG. 43c) 5 µm diameter carbon fibers before test, (FIG. 43b) test data showing signs of fiber fracture, (FIG. 43d) test data showing matrix damage.

(FIG. 44a, FIG. 44b) flat ended diamond tip with a 1 µm diameter; (FIG. 44c, FIG. 44d) a diamond tip with a 5 µm diameter; (FIG. 44e, FIG. 44f,) fiber push-out test with a 4 µm diameter probe.

DETAILED DESCRIPTION

Figures 1A, 1B, 1C:
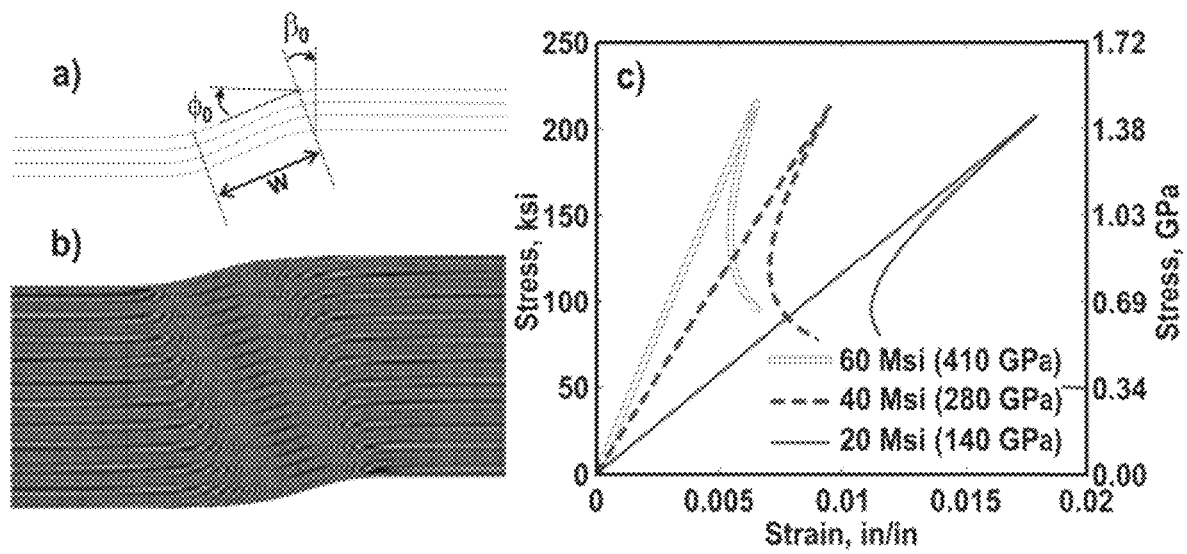
FIG. 1a-FIG. 1c. Example of 2D Riks Analysis using Abaqus FE solver showing a) approximation of the initial misalignment angle used in the FE model, b) development of localized shear stress into a kink-band and c) effect of different fiber Young's modulus on the kinking stress-strain response.

The compositions and methods described herein may be understood more readily by reference to the following detailed description of specific aspects of the disclosed subject matter and the Examples included therein.

Before the present compositions and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Optional" or "optionally" means that the subsequently described event or circumstance can or cannot occur, and that the description includes instances where the event or circumstance occurs and instances where it does not.

As used herein, an "intermediate-modulus carbon fiber" or "IM carbon fiber" generally refers to a carbon fiber having a fiber tensile modulus of from 38 Megapounds per square inch (Msi) to 47 Msi. For example, an IM carbon fiber has a fiber tensile modulus of from 38 Msi (e.g., 39 Msi or more, 40 Msi or more, 41 Msi or more, 42 Msi or more, 43 Msi or more, 44 Msi or more, 45 Msi or more, or 46 Msi or more) to 47 Msi (e.g., 46 Msi or less, 45 Msi or less, 44 Msi or less, 43 Msi or less, 42 Msi or less, 41 Msi or less, 40 Msi or less, or 39 Msi or less). The fiber tensile modulus of an IM carbon fiber can range from any of the minimum values described above to any of the maximum values described above (e.g., from 38 Msi to 47 Msi, from 38 Msi to 42 Msi, from 42 Msi to 47 Msi, from 38 Msi to 41 Msi, from 41 Msi to 44 Msi, from 44 Msi to 47 Msi, from 38 Msi to 45 Msi, from 40 Msi to 47 Msi, of from 40 Msi to 47 Msi).

As used herein, a "high-modulus carbon fiber" or "HM carbon fiber" generally refers to a carbon fiber having a fiber tensile modulus of from 48 Msi to 100 Msi. For example, a HM carbon fiber has a fiber tensile modulus of from 48 Msi (e.g., 49 Msi or more, 50 Msi or more, 55 Msi or more, 60 Msi or more, 65 Msi or more, 70 Msi or more, 75 Msi or more, 80 Msi or more, 85 Msi or more, 90 Msi or more, or 95 Msi or more) to 100 Msi (e.g., 95 Msi or less, 90 Msi or less, 85 Msi or less, 80 Msi or less, 75 Msi or less, 70 Msi or less, 65 Msi or less, 60 Msi or less, 55 Msi or less, or 50 Msi or less). The fiber tensile modulus of a HM carbon fiber can range from any of the minimum values described above to any of the maximum values described above (e.g., from 48 Msi to 100 Msi, from 48 Msi to 75 Msi, from 75 Msi to 100 Msi, from 48 Msi to 60 Msi, from 60 Msi to 70 Msi, from 70 Msi to 80 Msi, from 80 Msi to 90 Msi, from 90 Msi to 100 Msi, from 55 Msi to 100 Msi, from 48 Msi to 95 Msi, or from 55 Msi to 95 Msi).

It is understood that throughout this specification the identifiers "first" and "second" are used solely to aid the reader in distinguishing the various components, features, or steps of the disclosed subject matter. The identifiers "first" and "second" are not intended to imply any particular order, amount, preference, or importance to the components or steps modified by these terms.

Disclosed herein are carbon-fiber reinforced polymeric composites and methods related thereto. Disclosed herein are composite materials comprising a polymer and a hybrid layer substantially encapsulated by the polymer, wherein the hybrid layer comprises: a plurality of intermediate-modulus (IM) carbon fibers; a plurality of high-modulus (HM) carbon fibers; and a toughening agent comprising a plurality of particles; wherein the plurality of IM carbon fibers and the plurality of HM carbon fibers are entangled on a fiber level within the hybrid layer; and wherein the toughening agent is dispersed throughout the hybrid layer; and wherein the composite material has a higher axial modulus than the corresponding material in the absence of the plurality of HM carbon fibers; wherein the composite material has a higher fiber-direction compressive strength than the corresponding material in the absence of the plurality of IM carbon fibers; and wherein the composite material has a higher fiber-direction compressive strength than the corresponding material in the absence of the toughening agent.

The composite material can comprise the polymer in an amount of 0.5% or more by weight based on the weight of the composite material (e.g., 1% or more, 1.5% or more, 2% or more, 2.5% or more, 3% or more, 3.5% or more, 4% or more, 4.5% or more, 5% or more, 6% or more, 7% or more, 8% or more, 9% or more, 10% or more, 15% or more, 20% or more, 25% or more, 30% or more, 35% or more, 40% or more, 45% or more, 50% or more, 55% or more, 60% or more, 65% or more, or 70% or more). In some examples, the composite material can comprise the polymer in an amount of 75% or less by weight based on the weight of the composite material (e.g., 70% or less, 65% or less, 60% or less, 55% or less, 50% or less, 45% or less, 40% or less, 35% or less, 30% or less, 25% or less, 20% or less, 15% or less, 10% or less, 9% or less, 8% or less, 7% or less, 6% or less, 5% or less, 4.5% or less, 4% or less, 3.5% or less, 3% or less, 2.5% or less, 2% or less, 1.5% or less, or 1% or less). The amount of the polymer in the composite material can range from any of the minimum values described above to any of the maximum values described above. For example, the composite material can comprise the polymer in an amount of from 25% to 75% by weight based on the weight of the composite material (e.g., from 0.5% to 40%, from 40% to 75%, from 0.5% to 25%, from 25% to 50%, from 50% to 75%, from 10% to 75%, from 0.5% to 70%, from 10% to 70%, from 25% to 75%, from 30% to 75%, from 25% to 70%, from 30% to 70%, or from 35% to 50%). In some examples, the composite material can comprise the polymer in an amount of from 35% to 50% by weight based on the weight of the composite material.

The polymer can, for example, comprise an epoxy resin.

The composite material can comprise the toughening agent in an amount of 25% or more by weight based on the weight of the polymer in the composite material (e.g., 30% or more, 35% or more, 40% or more, 45% or more, 50% or more, 55% or more, 60% or more, 65% or more, or 70% or more). In some examples, the composite material can comprise the toughening agent in an amount of 75% or less by weight based on the weight of the polymer in the composite material (e.g., 70% or less, 65% or less, 60% or less, 55% or less, 50% or less, 45% or less, 40% or less, 35% or less, or 30% or less). The amount of the toughening agent in the composite material can range from any of the minimum values described above to any of the maximum values described above. For example, the composite material can comprise the toughening agent in an amount of from 25% to 75% by weight based on the weight of the polymer in the composite material (e.g., from 25% to 50%, from 50% to 75%, from 25% to 35%, from 35% to 45%, from 45% to 55%, from 55% to 65%, from 65% to 75%, from 30% to 75%, from 25% to 70%, from 30% to 60%, from 30% to 50%, or from 35% to 40%). In some examples, the composite material comprises the toughening agent in an amount of from 35% to 40% by weight based on the weight of the polymer in the composite material. The toughening agent can, for example, be dispersed substantially evenly throughout the hybrid layer.

The toughening agent can comprise any suitable material. For example, the plurality of particles comprising the toughening agent can comprise carbon nanotubes, graphene, silica, or a combination thereof. In some examples, the plurality of particles comprising the toughening agent can comprise silica.

The plurality of particles comprising the toughening agent can comprise particles of any shape (e.g., a sphere, a rod, a quadrilateral, an ellipse, a triangle, a polygon, etc.). In some examples, the plurality of particles comprising the toughening agent can have an irregular shape, a regular shape, an isotropic shape, an anisotropic shape, or a combination thereof. In some examples, the plurality of particles comprising the toughening agent can have an isotropic shape. In some examples, the plurality of particles comprising the toughening agent are substantially spherical.

The plurality of particles comprising the toughening agent can have an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. For a particle with a substantially spherical shape, the diameter of a particle can refer, for example, to the hydrodynamic diameter. As used herein, the hydrodynamic diameter of a particle can refer to the largest linear distance between two points on the surface of the particle. Mean particle size can be measured using methods known in the art, such as evaluation by scanning electron microscopy, transmission electron microscopy, and/or dynamic light scattering.

The plurality of particles comprising the toughening agent can, for example, have an average particle size of 10 nanometers (nm) or more (e.g., 11 nm or more, 12 nm or more, 13 nm or more, 14 nm or more, 15 nm or more, 16 nm or more, 17 nm or more, 18 nm or more, 19 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 275 nm or more, 300 nm or more, 325 nm or more, 350 nm or more, 375 nm or more, 400 nm or more, 425 nm or more, or 450 nm or more). In some examples, the plurality of particles comprising the toughening agent can, for example, have an average particle size of 500 nm or less (e.g., 475 nm or less, 450 nm or less, 425 nm or less, 400 nm or less, 375 nm or less, 350 nm or less, 325 nm or less, 300 nm or less, 275 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 19 nm or less, 18 nm or less, 17 nm or less, 16 nm or less, 15 nm or less, 14 nm or less, 13 nm or less, or 12 nm or less). The average particle size of the plurality of particles comprising the toughening agent can range from any of the minimum values described above to any of the maximum values described above. For example, the plurality of particles comprising the toughening agent can have an average particle size of from 10 nanometers (nm) to 500 nm (e.g., from 10 nm to 250 nm, from 250 nm to 500 nm, from 10 nm to 50 nm, from 50 nm to 100 nm, from 100 nm to 150 nm, from 150 nm to 200 nm, from 200 nm to 300 nm, from 300 nm to 400 nm, from 400 nm to 500 nm, from 10 nm to 200 nm, or from 50 nm to 150 nm). In some examples, the plurality of particles comprising the toughening agent can have an average particle size of about 100 nm.

In some examples, the plurality of particles comprising the toughening agent can be substantially monodisperse. "Monodisperse" and "homogeneous size distribution," as used herein, and generally describe a population of particles where all of the particles have the same or nearly the same particle size. As used herein, a monodisperse distribution refers to particle distributions in which 80% of the distribution (e.g., 85% of the distribution, 90% of the distribution, or 95% of the distribution) lies within 25% of the average particle size (e.g., within 20% of the average particle size, within 15% of the average particle size, within 10% of the average particle size, or within 5% of the average particle size).

In some examples, the plurality of particles comprising the toughening agent can comprise: a first population of particles comprising a first material and having a first average particle size and a first particle shape; and a second population of particles comprising a second material and having a second average particle size and a second particle shape; wherein the first average particle size and the second average particle size are different, the first particle shape and the second particle shape are different, the first material and the second material are different, or a combination thereof.

In some examples, the plurality of particles comprising the toughening agent can comprise a mixture of a plurality of populations of particles, wherein each population of particles within the mixture has a different size, shape, composition, or combination thereof. In some examples, the plurality of particles comprising the toughening agent within each population of particles are substantially monodisperse.

The plurality of IM carbon fibers, the plurality of HM carbon fibers, or a combination thereof can comprise polyacrylonitrile (PAN) based carbon fibers. The plurality of IM carbon fibers can, for example, have an average fiber tensile modulus of 40 Msi. The plurality of HM carbon fibers can, for example, have an average fiber tensile modulus of 64 Msi.

The hybrid layer can comprise an amount of the plurality of IM carbon fibers and an amount of the plurality of HM carbon fibers and wherein the ratio of the amount of the plurality of IM carbon fibers to the amount of the plurality of HM carbon fibers (IM:HM) is 1:1 or more, 1:2 or more, 1:3 or more, 1:4 or more, or 1:5 or more (w/w). In some examples, the ratio of the amount of the plurality of IM carbon fibers to the amount of the plurality of HM carbon fibers in the hybrid layer is 1:3.

The plurality of IM carbon fibers the plurality of HM carbon fibers, or a combination thereof can have an average diameter. "Average diameter" and "mean diameter" are used interchangeably herein, and generally refer to the statistical mean diameter of the fibers in a population of fibers. Average diameter can be measured using methods known in the art, such as evaluation by microscopy.

The plurality of IM carbon fibers, the plurality of HM carbon fibers, or a combination thereof can, for example, have an average diameter of 1 micrometer (micron, μm) or more (e.g., 2 μm or more, 3 μm or more, 4 μm or more, 5 μm or more, 6 μm or more, 7 μm or more, 8 μm or more, 9 μm or more, 10 μm or more, 11 μm or more, 12 μm or more, 13 μm or more, 14 μm or more, 15 μm or more, 16 μm or more, 17 μm or more, 18 μm or more, or 19 μm or more). In some examples, the plurality of IM carbon fibers, the plurality of HM carbon fibers, or a combination thereof can have an average diameter of 20 μm or less (e.g., 19 μm or less, 18 μm or less, 17 μm or less, 16 μm or less, 15 μm or less, 14 μm or less, 13 μm or less, 12 μm or less, 11 μm or less, 10 μm or less, 9 μm or less, 8 μm or less, 7 μm or less, 6 μm or less, 5 μm or less, 4 μm or less, 3 μm or less, or 2 μm or less). The average diameter of the plurality of IM carbon fibers, the plurality of HM carbon fibers, or a combination thereof can range from any of the minimum values described above to any of the maximum values described above. For example, the plurality of IM carbon fibers, the plurality of HM carbon fibers, or a combination thereof can have an average diameter of from 1 micrometer (micron, μm) to 20 μm (e.g., from 1 μm to 10 μm, from 10 μm to 20 μm, from 1 μm to 5 μm from 5 μm to 10 μm, from 10 μm to 15 μm, from 15 μm to 20 µm, from 1 µm to 15 µm, from 5 µm to 20 µm, from 5 µm to 15 µm, from 4 µm to 7 µm, or from 5 µm to 7 µm). In some examples, the plurality of IM carbon fibers, the plurality of HM carbon fibers, or a combination thereof have an average diameter of from 5 µm to 7 µm. In some examples, the plurality of IM carbon fibers and the plurality of HM fibers have substantially the same average diameter. In some examples, the plurality of IM carbon fibers, the plurality of HM carbon fibers, or a combination thereof can be substantially monodisperse in diameter. In some examples, the IM carbon fibers, the HM carbon fibers, or a combination thereof can comprise continuous filaments.

In some examples, the plurality of IM carbon fibers can comprise: a first population of IM carbon fibers comprising a first material and having a first average diameter and a first tensile modulus; and a second population of IM carbon fibers comprising a second material and having a second average diameter and a second tensile modulus; wherein the first average diameter and the second average diameter are different, the first tensile modulus and the second tensile modulus are different, the first material and the second material are different, or a combination thereof.

In some examples, the plurality of IM carbon fibers can comprise a mixture of a plurality of populations of IM carbon fibers, wherein each population of IM carbon fibers within the mixture has a different diameter, composition, tensile modulus, or combination thereof. In some examples, the plurality of IM carbon fibers within each population of IM carbon fibers are substantially monodisperse.

In some examples, the plurality of HM carbon fibers can comprise: a first population of HM carbon fibers comprising a first material and having a first average diameter and a first tensile modulus; and a second population of HM carbon fibers comprising a second material and having a second average diameter and a second tensile modulus; wherein the first average diameter and the second average diameter are different, the first tensile modulus and the second tensile modulus are different, the first material and the second material are different, or a combination thereof.

In some examples, the plurality of HM carbon fibers can comprise a mixture of a plurality of populations of HM carbon fibers, wherein each population of HM carbon fibers within the mixture has a different diameter, composition, tensile modulus, or combination thereof. In some examples, the plurality of HM carbon fibers within each population of HM carbon fibers are substantially monodisperse.

In some examples, the composite material has an axial modulus that is higher than the axial modulus of the corresponding material in the absence of the plurality of HM carbon fibers by 30% or more (e.g., 35% or more, 40% or more, 45% or more, or 50% or more). In some examples, the composite material has an improved microstructural stability and fiber-direction compression strength than the corresponding material in the absence of the plurality of IM carbon fibers, the plurality of HM carbon fibers, the toughening agent, or a combination thereof.

The composite material can, for example, have an axial modulus of 20 Megapounds per square inch (Msi) or more (e.g., 21 Msi or more, 22 Msi or more, 23 Msi or more, 24 Msi or more, 25 Msi or more, 26 Msi or more, 27 Msi or more, 28 Msi or more, 29 Msi or more, 30 Msi or more, 31 Msi or more, 32 Msi or more, 33 Msi or more, 34 Msi or more, 35 Msi or more, 36 Msi or more, 37 Msi or more, 38 Msi or more, 39 Msi or more, 40 Msi or more, 41 Msi or more, 42 Msi or more, 43 Msi or more, 44 Msi or more, 45 Msi or more, 46 Msi or more, 47 Msi or more, 48 Msi or more, or 49 Msi or more). In some examples, the composite material can have an axial modulus of 50 Msi or less (e.g., 49 Msi or less, 48 Msi or less, 47 Msi or less, 46 Msi or less, 45 Msi or less, 44 Msi or less, 43 Msi or less, 42 Msi or less, 41 Msi or less, 40 Msi or less, 39 Msi or less, 38 Msi or less, 37 Msi or less, 36 Msi or less, 35 Msi or less, 34 Msi or less, 33 Msi or less, 32 Msi or less, 31 Msi or less, 30 Msi or less, 29 Msi or less, 28 Msi or less, 27 Msi or less, 26 Msi or less, 25 Msi or less, 24 Msi or less, 23 Msi or less, 22 Msi or less, or 21 Msi or less). The axial modulus of the composite material can range from any of the minimum values described above to any of the maximum values described above. For example, the composite material can have an axial modulus of from 20 Megapounds per square inch (Msi) to 50 Msi (e.g., from 20 Msi to 35 Msi, from 35 Msi to 50 Msi, from 20 Msi to 30 Msi, from 30 Msi to 40 Msi, from 40 Msi to 50 Msi, from 20 Msi to 45 Msi, from 25 Msi to 50 Msi, from 25 to 45 Msi, or from 30 Msi to 50 Msi). In some examples, the composite material has an axial modulus of 30 Msi or more.

The composite material can, for example, have a fiber-direction compressive strength of 120 kilo-pounds per square inch (ksi) or more (e.g., 125 ksi or more, 130 ksi or more, 135 ksi or more, 140 ksi or more, 145 ksi or more, 150 ksi or more, 155 ksi or more, 160 ksi or more, 165 ksi or more, 170 ksi or more, 175 ksi or more, 180 ksi or more, 185 ksi or more, 190 ksi or more, 195 ksi or more, 200 ksi or more, 205 ksi or more, 210 ksi or more, 215 ksi or more, 220 ksi or more, 225 ksi or more, 230 ksi or more, 235 ksi or more, 240 ksi or more, 245 ksi or more, 250 ksi or more, 255 ksi or more, 260 ksi or more, 265 ksi or more, 270 ksi or more, 275 ksi or more, 280 ksi or more, 285 ksi or more, 290 ksi or more, or 295 ksi or more). In some examples, composite material can have a fiber-direction compressive strength of 300 ksi or less (e.g., 295 ksi or less, 290 ksi or less, 285 ksi or less, 280 ksi or less, 275 ksi or less, 270 ksi or less, 265 ksi or less, 260 ksi or less, 255 ksi or less, 250 ksi or less, 245 ksi or less, 240 ksi or less, 235 ksi or less, 230 ksi or less, 225 ksi or less, 220 ksi or less, 215 ksi or less, 210 ksi or less, 205 ksi or less, 200 ksi or less, 195 ksi or less, 190 ksi or less, 185 ksi or less, 170 ksi or less, 175 ksi or less, 170 ksi or less, 165 ksi or less, 160 ksi or less, 155 ksi or less, 150 ksi or less, 145 ksi or less, 140 ksi or less, 135 ksi or less, 130 ksi or less, or 125 ksi or less). The fiber-direction compressive strength of the composite material can range from any of the minimum values described above to any of the maximum values described above. For example, the composite material can have a fiber-direction compressive strength of from 120 kilo-pounds per square inch (ksi) to 300 ksi (e.g., from 120 ksi to 210 ksi, from 210 ksi to 350 ksi, from 120 ksi to 150 ksi, from 150 ksi to 180 ksi, from 180 ksi to 210 ksi, from 210 ksi to 240 ksi, from 240 ksi to 270 ksi, from 270 ksi to 300 ksi, from 120 ksi to 275 ksi, from 150 ksi to 300 ksi, from 150 ksi to 275 ksi, or from 200 ksi to 300 ksi). In some examples, the composite material can have a fiber-direction compressive strength of 200 ksi or more.

The composite material can, for example, have a shear modulus of 0.6 Msi or more (e.g., 0.7 Msi or more, 0.8 Msi or more, 0.9 Msi or more, 1 Msi or more, 1.1 Msi or more, 1.2 Msi or more, 1.3 Msi or more, 1.4 Msi or more, 1.5 Msi or more, 1.6 Msi or more, 1.7 Msi or more, 1.8 Msi or more, or 1.9 Msi or more). In some examples, the composite material can have a shear modulus of 2 Msi or less (e.g., 1.9 Msi or less, 1.8 Msi or less, 1.7 Msi or less, 1.6 Msi or less, 1.5 Msi or less, 1.4 Msi or less, 1.3 Msi or less, 1.2 Msi or less, 1.1 Msi or less, 1 Msi or less, 0.9 Msi or less, 0.8 Msi or less, or 0.7 Msi or less). The shear modulus of the composite material can range from any of the minimum valued described above to any of the maximum values described above. For example, the composite material can have a shear modulus of from 0.6 Msi to 2 Msi (e.g., from 0.6 Msi to 1.3 Msi, from 1.3 Msi to 2 Msi, from 0.6 Msi to 1 Msi, from 1 Msi to 1.5 Msi, from 1.5 Msi to 2 Msi, from 0.8 Msi to 2 Msi, from 0.6 Msi to 1.8 Msi, from 0.8 Msi to 1.8 Msi, or from 1 Msi to 2 Msi). In some examples, the composite material can have a shear modulus of 1 Msi or more.

The composite material can have a shear modulus and an axial modulus, wherein the ratio of the shear modulus to the axial modulus can, for example, be 2% or more (e.g., 2.5% or more, 3% or more, 3.5% or more, 4% or more, 4.5% or more, 5% or more, 5.5% or more, 6% or more, 6.5% or more, 7% or more, 7.5% or more, 8% or more, 8.5% or more, 9% or more, or 9.5% or more). In some examples, the ratio of the shear modulus to the axial modulus of the composite material can be 10% or less (e.g., 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, or 2.5% or less). The ratio of the shear modulus to the axial modulus of the composite material can range from any of the minimum values described above to any of the maximum values described above. For example, the composite material can have a shear modulus and an axial modulus, wherein the ratio of the shear modulus to the axial modulus can be from 2% to 10% (e.g., from 2% to 6%, from 6% to 10%, from 2% to 4%, from 4% to 6%, from 6% to 8%, from 8% to 10%, from 2% to 9%, from 3% to 10% or from 3% to 9%). In some examples, the ratio of the shear modulus to the axial modulus of the composite material can be 3% or more.

Also disclosed herein are methods of making the composite materials described herein. For example, the methods can comprise: entangling the plurality of IM carbon fibers with the plurality of HM carbon fibers on a fiber level to form an entangled layer; dispersing the toughening agent within a polymer precursor for form a precursor solution; coating the entangled layer with the precursor solution to form a coated layer; and curing the polymer precursor of the coated layer to thereby form the composite material.

Also disclosed herein are methods of use of the composite materials described herein. For example, the composite materials described herein can be used in an aerospace application or an automotive application, such as to fabricate a portion of an aircraft or automotive structure. In some examples, the composite materials described herein can be used in an aerospace application, such as to fabricate at least a portion of the airframe of a fixed-wing or rotary-wing aircraft and/or to fabricate at least a portion of the rotor system(s) of a rotary-wing aircraft.

EXAMPLES

The following section presents experimental results of working with various IM and HM carbon-fiber/epoxy-matrix composites including those toughened with nano-sized structural reinforcement of the matrix. Observations of the compressive strength behavior across different fiber and resin combinations inspired the idea of hybridizing carbon fibers with varying moduli to achieve the desired improvement of compressive strength.

Example 1

There has been a strong demand in using high-modulus (HM) carbon-fiber composites potentially enabling lightweight aircraft structures with significant weight savings. However, extremely low fiber-direction compressive strength has been a well-recognized weakness of the HM composites, prohibiting their implementation in aircraft platforms. For example, Hexcel HM63/913 advanced continuous carbon/epoxy tape composite with a 32.2 Msi (222 GPa) average $$\frac{E_{Tensile} + E_{Compressive}}{2}$$

Young's modulus exhibits a 146 ksi (1.01 GPa) fiber-direction compressive strength, which is much lower than the 224 ksi (1.54 GPa) fiber-direction compressive strength of IM7/913 legacy carbon/epoxy tape composite (Hexcel, 2016b) with a 23.4 Msi (161 GPa) average Young's modulus (Makeev, et al., 2015). HM carbon fibers with the highest fiber-direction Young's modulus produce composites with the lowest compressive strength, e.g. Toray M55J/2500 carbon/epoxy tape composite with a 40 Msi (276 GPa) average Young's modulus has a 129 ksi (0.889 GPa) fiber-direction compressive strength (Toray, 2019). All HM carbon fibers as well as intermediate-modulus (IM) carbon fibers considered herein are Polyacrylonitrile-based or PAN-based. Accordingly, fiber-direction compressive strength of PAN-based continuous carbon fiber-reinforced polymeric tape composites can be governed by microstructural stability, unlike that of pitch-based HM carbon fibers exhibiting longitudinal splitting failure mode (Waas & Schultheisz, 1996). However, strong decrease in fiber-direction compressive strength of HM carbon-fiber composites compared to their IM counterparts contradicts predictions from the microstructural buckling theories as further elaborated in the following.

The development of analytical and numerical models for the prediction of fiber-direction compressive failure of composites has been a very active field of research. In the pioneering work of Dow and Gruntfest (1960), and in a more systematic way by Rosen (1965), fiber microbuckling was suggested for the first time as the principal mechanism responsible for the low compressive strength of advanced composites. A comprehensive review of the development of micromechanical failure theories from the 1960s to the mid-1990s can be found in Waas & Schultheisz (1996). Recent developments include high-fidelity numerical models for the simulation of fiber kinking based on three-dimensional micromechanical finite element (FE) analysis that uses significant computational resources (Naya et al., 2017, Sun et al., 2018). However, despite of more than five decades of model development, there is currently no practical model able to predict the significant knockdown observed in fiber-direction compressive strength associated with replacing IM fibers with HM fibers in otherwise the same composite system. That is, no effective model predicting fiber-direction compressive strength in both HM and IM carbon-fiber composites starting from the properties of the individual constituents for the purpose of composite material design.

Fiber microbuckling and kinking failures have been the most accepted modes of failure of advanced carbon/epoxy composites under fiber-direction compression, with sometimes conflicting views in the literature whereas kinking should be considered as an independent failure mechanism or a final consequence of fiber microbuckling (Waas & Schultheisz, 1996). In the early analytical microbuckling model proposed by Rosen (1965), fibers were represented as two-dimensional layers supported by an elastic matrix with two possible modes of buckling failure, whether adjacent fibers deform out-of-phase (extensional mode) or in-phase (shear mode). The following expressions for the respective critical compressive stress at failure $\sigma_{cr}$ were obtained $$\text{Extensional mode: } \sigma_{cr} = 2V_f \sqrt{\frac{V_f E_m E_f}{3(1-V_f)}}$$

$$\text{Shear mode: } \sigma_{cr} = \frac{G_m}{(1-V_f)}$$

where $E_m$, $E_f$ are the Young's modulus of the matrix and fiber, respectively, $G_m$ is the shear modulus of the matrix and $V_f$ is the fiber volume fraction.

The decrease in fiber-compressive strength introduced by HM fibers in same matrix system and at the same fiber volume fraction cannot be captured using Rosen's model. Indeed, an increase of compressive strength due to the increase of fiber modulus $E_f$ is predicted for the extensional mode and the compressive strength should remain constant according to the expression of $\sigma_{cr}$ in the shear mode. Typical overestimation of the compressive strength by up to two orders of magnitude using the Rosen model compared to experimental data for common advanced carbon/epoxy composites has been well recognized in the literature (Argon, 1972, Lo & Chim, 1992, Waas & Schultheisz, 1996) and prompted further improvements of the first fiber microbuckling models. In particular, it has been now widely acknowledged that the fiber-direction compressive strength is strongly dependent upon the initial fiber misalignment and the shear non-linear behavior of the supporting matrix as they lead to localized shear deformation of the matrix followed by fiber fracture and kink-band formation. Following the work by Argon (1972) and later Budiansky and Fleck (1993), kinking models that include fiber misalignment and matrix shear non-linearity have been used to derive improved analytical expressions of the critical compressive stress at failure. Explicit modeling of the initial fiber misalignment and incorporation of shear non-linear constitutive models for the matrix is also included in FE-based micromechanical models of fiber kinking (Kyriakides et al., 1995, Naya et al., 2017, Sun et al., 2018). Over the past decades, the development of advanced kinking theory models has significantly improved the understanding of fiber-direction compressive failure in advanced composites. Yet, basic kinking models do not provide with a satisfactory rational for the reduction in compressive strength in HM carbon/epoxy composites.

Indeed, under similar manufacturing/curing conditions, significant changes in the non-linear shear behavior of polymer matrix supporting the fibers are not to be expected. Similarly, it seems reasonable to assume that initial fiber misalignment is reduced with the introduction of stiffer fibers, which would lead to an increase in compressive strength according to kinking theories. FIG. 1a-FIG. 1c presents results of 2D FE micromechanical analysis run for illustration purposes using Abaqus Riks Analysis to predict fiber kinking instability, similar to the work by Kyriakides et al. (1995). In this model, an initial fiber misalignment is introduced as shown in FIG. 1a and a Drucker-Prager model is used to account for the matrix non-linearity similarly to the model used in Naya et al. (2017). Linear elastic behavior of the fibers and a perfect bond of the matrix/fiber interface throughout the simulation are assumed. As shown in FIG. 1c, the maximum compressive stress obtained in 2D FE kinking analysis is slightly increased when the fiber Young's modulus is increased between 20 Msi (140 GPa) and 60 Msi (410 GPa), which contradicts the compressive strength reduction measured experimentally.

Inconsistency in predicting fiber-direction compressive strength using available analytical and numerical models indicates the potential complexity of the failure mechanisms. As noted in Waas and Schultheisz (1996), fiber breakage and longitudinal splitting are other possible failure modes that could occur during fiber-direction compression of composites, in addition to the microbuckling and kinking failure modes. Pitch-based fibers introduced at the early stages of the HM carbon fiber development exhibited very low compressive strength attributed to premature fiber failure due to splitting (Lo & Chim, 1992, Waas & Schultheisz, 1996). However, the compressive strain-to-failure capacity of modern PAN-based HM carbon fibers has significantly improved since to overcome such early limitations (Kumar & Helminiak, 1988). Nevertheless, localized fiber breakages could still occur and they may be precursors to kinking failure. Similarly, a weak matrix-to-fiber interface may lead to early microbuckling or kinking failure.

Meanwhile, in the absence of accurate models to predict fiber-direction compressive strength of HM carbon-fiber polymeric composites, and driven by the industry demands for developing a HM CFRP approaching fiber-direction compressive strength of IM carbon legacy composites at 30% (or greater) higher Young's modulus, this effort took an experimental approach of reinforcing material surrounding HM fibers, thus improving microstructural stability likely governing the fiber-direction compressive strength behavior.

Hybridizing fibers with varying moduli provides a means for improving the fiber-direction compressive strength of composites, as described herein. This has been implemented by comingling intermediate-modulus (IM) and high-modulus (HM) carbon fibers in HM carbon fiber-reinforced polymer (CFRP) toughened with nano-silica. Comingling IM and HM fibers at the filament level in addition to the matrix nano-sized structural reinforcement throughout the composite, increases shear modulus to axial modulus ratio of the composite material, thus improving microstructural stability likely governing the fiber-direction compressive strength behavior. The basis for this material design stems from the fact that fiber-direction compressive strength increases with the shear modulus to axial modulus ratio of composites across different fiber and resin combinations. The results demonstrate that the hybrid HM composite fiber-direction compressive strength achieves that of IM legacy composites but with more than 30% higher axial modulus.

Nano-Sized Reinforcement of the Matrix

Nano-sized structural reinforcement techniques can improve matrix-to-fiber interface properties and increase matrix (and composite) shear modulus throughout the material to better support the fibers, thus contributing to increasing fiber-direction compressive strength. Among many candidates for improving compressive and interlaminar properties of preimpregnated continuous fiber-reinforced polymer composite (prepreg) composite materials are nano-silica-loaded matrices (Makeev et al., 2015). Nanosilica (~100-nm diameter silica particles) is cost-effective; enables high loading (more than 40% weight content in the resin) with minimum impact on viscosity; and can be uniformly dispersible through surface chemistry technology (functional groups) (Hackett et al., 2010a,b). In 2009, 3M launched 3M™ Matrix Resin 3831, a 36% nanosilica weight content 250° F. curing epoxy resin system designed for use in composite prepreg manufacturing processes (Hackett et al., 2010b). Initial implementation of this resin in the sporting goods market has produced carbon-fiber composite fishing rods with 60-90% increased compression-dominated bending failure loads (Hackett et al., 2010b).

Incorporation of hard particles into polymers increases their modulus and can increase fracture resistance (Hackett et al., 2010a,b, Kinloch & Young, 1983, Makeev et al., 2015). Micron-scale inorganic fillers have been used to modify cured resin properties, but when processed into fiber-reinforced composite structures, these large particles are filtered out by the reinforcing fibers. Another undesirable effect of conventional micron-size fillers is increased resin viscosity before curing, which can compromise composite processing qualities (Hackett et al., 2010a,b, Makeev et al., 2015). 3M attempted to achieve the desirable resin modulus and laminate compression strength improvements through the incorporation of smaller, nano-sized amorphous silica particles into thermoset-matrix resins (Hackett et al., 2010a, b). Also in 2009, Patz Materials and Technologies (PMT) began working with 3M to address specific applications where 3M's nanosilica technology could yield significant benefit for composite structures (Makeev et al., 2015). PMT would formulate the applicable thermosetting polymer technology for the specific application and 3M would apply the nanosilica to that polymer. The key to the performance of the nanosilica in each polymer system is 3M's ability to tailor the surface chemistry for the nanosilica particles. For each formulated product that PMT supplied, 3M would develop the appropriate surface chemistry for the nanoparticles. This allows the nanosilica particles to become an integral part of the polymer system, and thus the desired particle attributes could be realized in the composite structure. This also allows the particles to flow freely with the polymer system thus only minimally increasing the viscosity of the formulated product. The non-agglomerated compatibilized nanosilica can be evenly dispersed throughout the composite structure without filtration by the fiber array.

Figure 2:
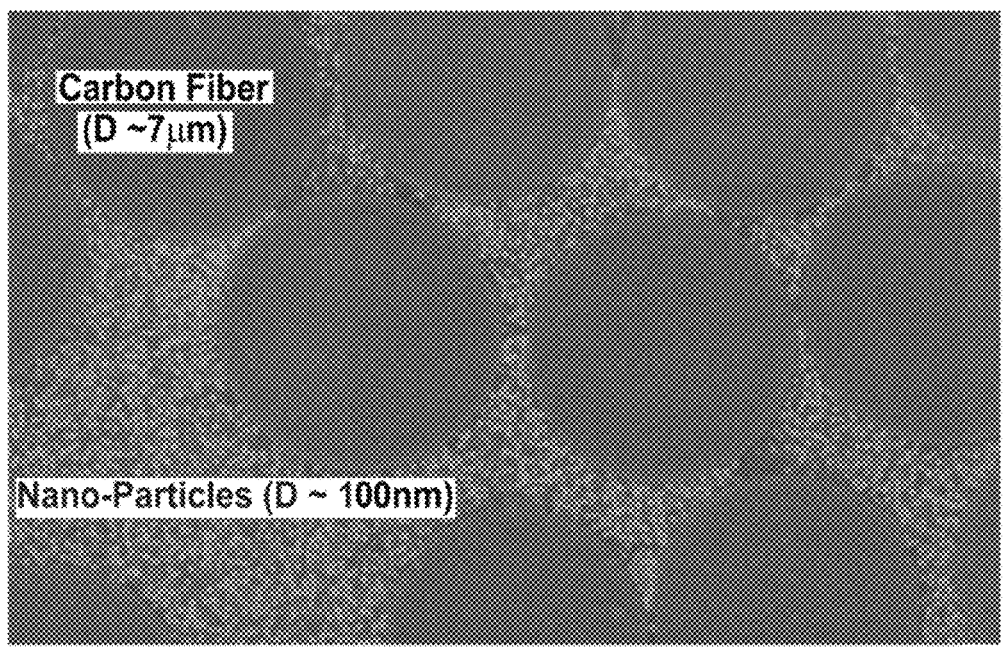
FIG. 2. SEM image of a carbon/epoxy laminate cross section demonstrating even dispersion and lack of conglomeration for the nanosilica particles (Hackett et al., 2010a,b, Makeev et al., 2015).

While dispersion of nanosilica particles in 350° F. curing resins has not always been uniform, results for 250° F. curing PMT resins are consistent. FIG. 2 shows a representative 250° F. cured carbon/epoxy composite laminate with 36% weight content of approximately 100-nm diameter functionalized silica particles evenly dispersed between 7-µm diameter TR50S carbon fibers (Hackett et al., 2010a,b, Makeev et al., 2015). HM and IM carbon fibers studied in this work had 5 micron diameter.

In a recent material characterization effort by Rotorcraft Industry and Academia, IM carbon/epoxy and glass/epoxy composites with 40% nanosilica weight content in the matrix demonstrated as high as 45% increase in fiber-direction compressive strength (Makeev et al., 2015).

PMT made 12 inches (30.48 cm) wide unidirectional prepreg tapes using Hexcel IM7, HM63, and Mitsubishi HS40 carbon fibers (Hexcel, 2018, Hexcel, 2016c, Grafil, 2008). The areal weight of carbon fibers was 145 g/m². The fiber volume fraction was approximately 60%. In addition to control prepregs containing no nanoadditives, prepreg tapes with up to 40% resin weight content of nanosilica (approximately 100-nm diameter) were produced. Densities of the composites with 40% nanosilica, considered in this work, were comparable to the corresponding legacy composites. The 250° F. curing PMT control epoxy resin is denoted as F4A and the corresponding resin with 40% nanosilica weight content as F3G using PMT nomenclature. Some of the best-performing legacy toughened epoxies including 250° F. curing Cytec Solvay 381 (Cytec, 2012, Makeev et al., 2015), Hexcel 913 (Hexcel, 2016b) and a 350° F. curing Hexcel 8552 (Hexcel, 2016a) common in aircraft applications are also included in material characterization. In particular, as IM7/8552 has become a benchmark 350° F. curing prepreg for aircraft structures, it is used in this work to normalize the compressive strength material performance improvement.

Figure 3:
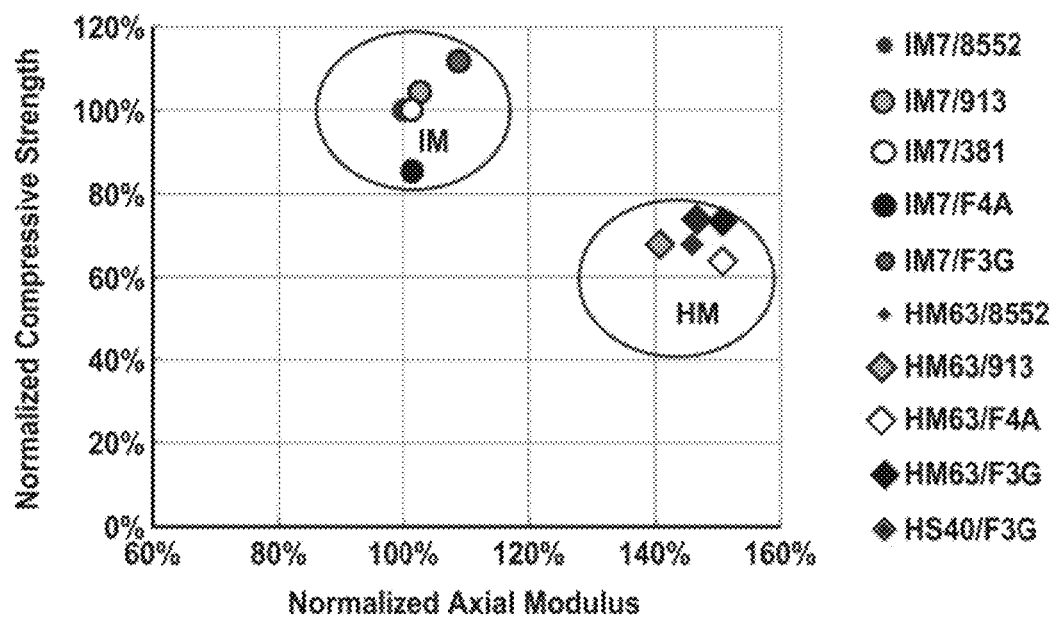
FIG. 3. Axial modulus and fiber-direction compressive strength of high-modulus (HM) and intermediate-modulus (IM) carbon fiber-reinforced epoxy-matrix tape composites. Notes: 8552—350° F. curing toughened legacy epoxy; 913, 381—250° F. curing toughened legacy epoxies; F4A—250° F. curing untoughened low viscosity epoxy (Control); F3G—250° F. curing Nanosilica toughened epoxy (40% Nanosilica by resin weight).

Fiber-direction compressive strength was assessed based on SACMA SRM 1R-94 (1994) testing of tabbed unidirectional laminates. While IM carbon/epoxy composites with nanosilica demonstrated significant increase in fiber-direction compressive strength, replacing IM fibers with HM carbon fibers in otherwise the same composite system was not as beneficial. For example, distributing 40% nanosilica in a low-viscosity epoxy control resin had the following effect on the fiber-direction compressive strength: IM7/F4A (Control)—184 ksi (1.27 GPa); IM7/F3G(40% Nanosilica)—240.5 ksi (1.66 GPa); HM63/F4A(Control)—137 ksi (0.945 GPa); HM63/F3G(40% Nanosilica)—157 ksi (1.08 GPa). Nanosilica alone did not provide enough reinforcement for the material surrounding HM fibers. FIG. 3 shows fiber-direction compressive strength vs average axial modulus for several HM and IM carbon/epoxy unidirectional tape composites. The strength and modulus data are normalized to a 215 ksi (1.48 GPa) and a 22.8 Msi (157 GPa) values, respectively, measured for IM7/8552. All material properties correspond to the room temperature ambient test condition (70-72° F., 40-60% RH).

Figure 4:
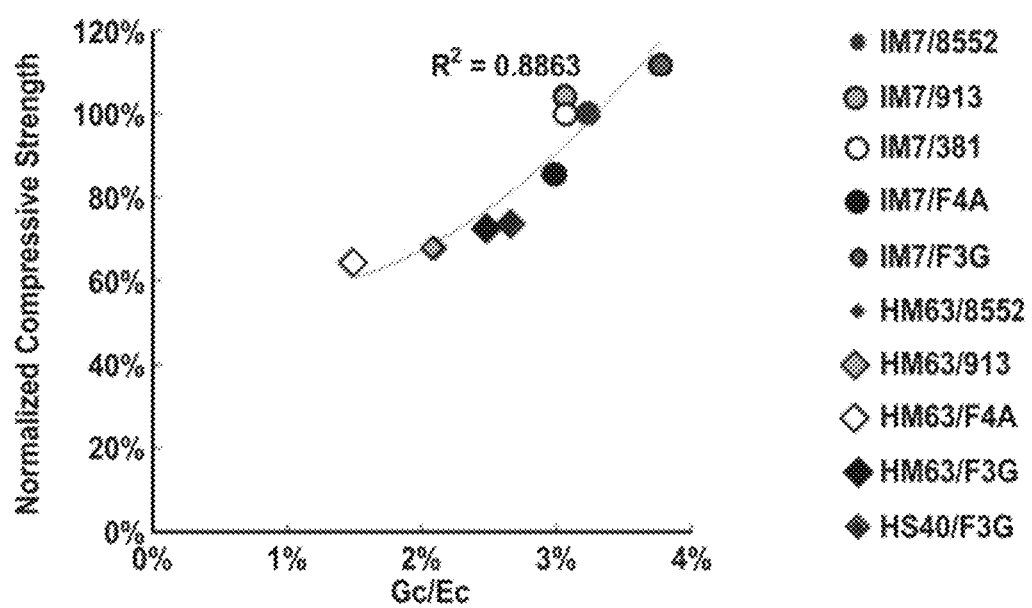
FIG. 4. Strong correlation of compressive strength and ratio of the shear modulus to axial modulus for the tape composite material systems across different fiber and resin combinations.

FIG. 4 plots compressive strength as a function of the shear modulus to axial modulus ratio. FIG. 4 and Table 1 show for the first time a remarkable trend that fiber-direction compressive strength increases with increasing the shear modulus to axial modulus ratio of composites across different fiber and resin combinations. This correlation could be the basis for designing materials with higher fiber-direction compressive strength.

TABLE 1

Modulus and strength data for HM and IM carbon/epoxy 250° F. curing tape composites.

| Material | Ef, Msi | Er, Msi | Ec, Msi | Gc, Msi | Gc/Ec, % | Sc, ksi |
|---|---|---|---|---|---|---|
| IM7/913 | 40 | 0.492 | 23.4 | 0.717 | 3.06 | 223.9 |
| HM63/913 | 64 | 0.492 | 32.2 | 0.674 | 2.09 | 145.9 |
| IM7/F4A | 40 | N/A | 23.1 | 0.69 | 2.99 | 183.9 |
| HM63/F4A | 64 | N/A | 34.4 | 0.514 | 1.49 | 137.3 |
| IM7/F3G | 40 | 0.893 | 24.8 | 0.932 | 3.76 | 240.5 |
| HM63/F3G | 64 | 0.893 | 34.3 | 0.847 | 2.47 | 157.2 |

Ef—fiber modulus, Er—resin modulus, Ec—average axial modulus of composite material, Gc—shear modulus of composite material, Sc—fiber-direction compressive strength.
Conversion factor: 1 psi = 6.895 kPa Test data in Table 1 shows that the shear modulus of IM carbon fiber composites is higher compared to the HM carbon fiber composites with the same epoxy resin. Accordingly, integrating IM fibers into a HM fiber prepreg in addition to the matrix nano-sized structural reinforcement may improve microstructural stability and fiber-direction compression strength. Strain to failure of PAN-based IM carbon fibers such as IM7, IM8 (Hexcel, 2016d), or MR70 (Mitsubishi, 2017) is 2% while strain to failure of PAN-based HM carbon fibers such as HM63 or HS40 is 1%. This indicates that strain to failure capacity of the IM fibers would not be exhausted in a HM/IM hybrid composite.

Fiber Hybridization

Figure 5:
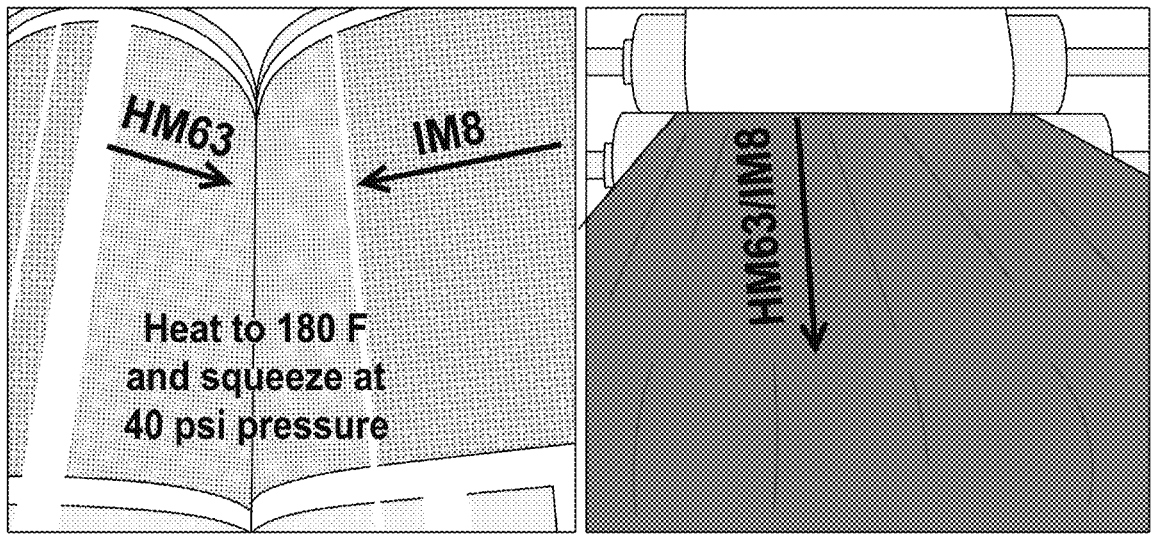
FIG. 5. shows hybridization process in a prepreg machine at PMT: run IM8 fiber first and subsequently squeeze HM63 fiber into IM8 at 40 psi (276 kPa) pressure.

The first industrial attempt to hybridize HM and IM carbon fibers described herein involved PMT prepreg production facility (FIG. 5). Available tools for prepreg production allowing for a 50/50 mix of HM and IM fibers were used. Hexcel HM63 and IM8 12K carbon fiber tows were utilized. IM8 fiber has a slightly higher, 45 Msi (310 GPa), modulus compared to a 40 Msi (276 GPa) modulus IM7 fiber (Hexcel, 2016d, 2018). A 12 inch (30.48 cm) wide unidirectional prepreg tape was produced at PMT using F3G epoxy at target resin content 35% by weight (60% fiber volume fraction). The resulting average axial modulus of the HM63/IM7/F3G hybrid unidirectional tape composite was 28.1 Msi (194 GPa).

Figure 6:
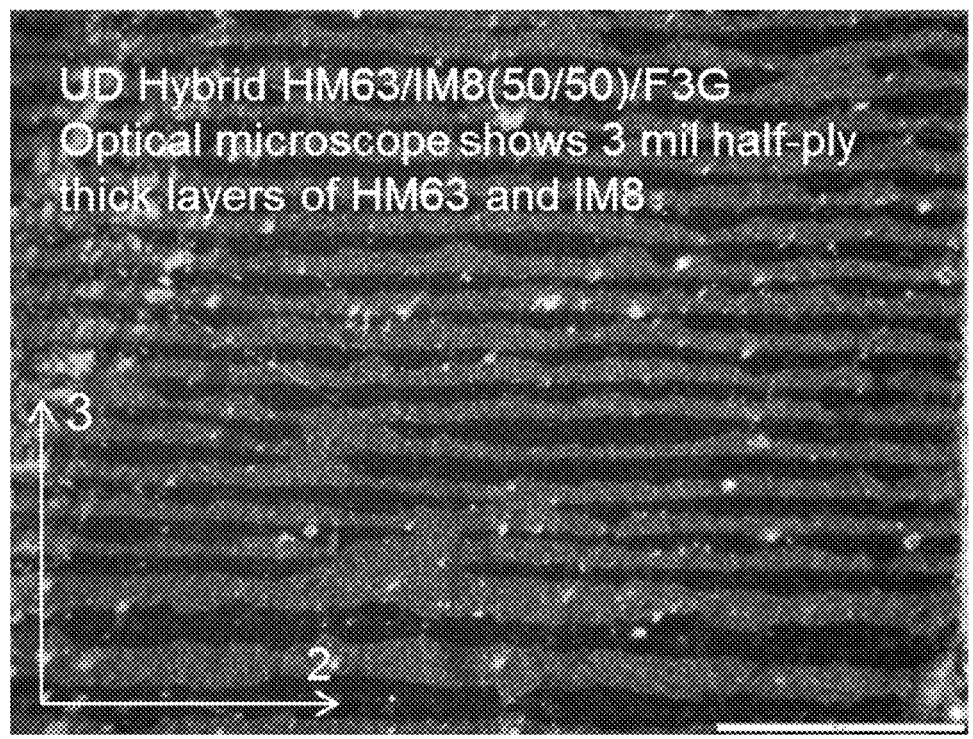
FIG. 6. Hybrid composite with poor comingling of HM and IM fibers.

The resulting hybrid prepreg composite had a 171.3 ksi (1.18 GPa) fiber-direction compressive strength. The coefficient of variation (COV) was 1.91%. The rather lower than expected compressive strength value is attributed to poor hybridization of the HM and IM carbon fibers. FIG. 6 shows a cross section of a cured unidirectional tape with a distinct HM63 and IM8 3 mil (76 μm) thick half-ply layer structure. Poor comingling of HM and IM fibers results in a low compressive strength.

Figure 7:
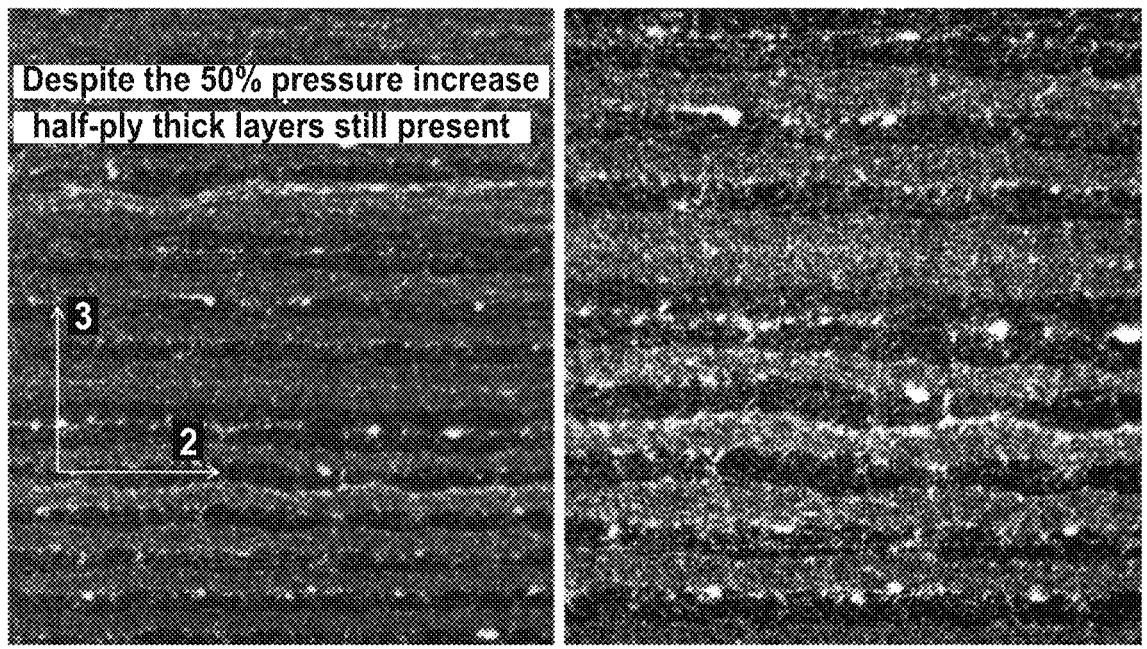
FIG. 7. Hybridization associated with 50% increase in squeeze pressure.

During the second prepreg manufacturing iteration, the squeeze pressure has been increased to 60 psi (414 KPa) to improve the hybridization of HM and IM fibers at the PMT facility. As a result, fiber-direction compressive strength increased from 171 ksi or 1.18 GPa (COV 1.91%) to 177 ksi or 1.22 GPa (COV 3.76%) still not approaching the 200 ksi or 1.38 GPa threshold of IM carbon/epoxy tape composites. FIG. 7 shows that despite the 50% pressure increase, half-ply thick layers of HM and IM fibers are still present contributing to low compressive strength. That is, a 50% increase in squeeze pressure did not significantly affect the hybridization. Adequate reinforcement of the material surrounding HM fibers requires comingling at the filament level which has yet to be demonstrated.

Figure 8:
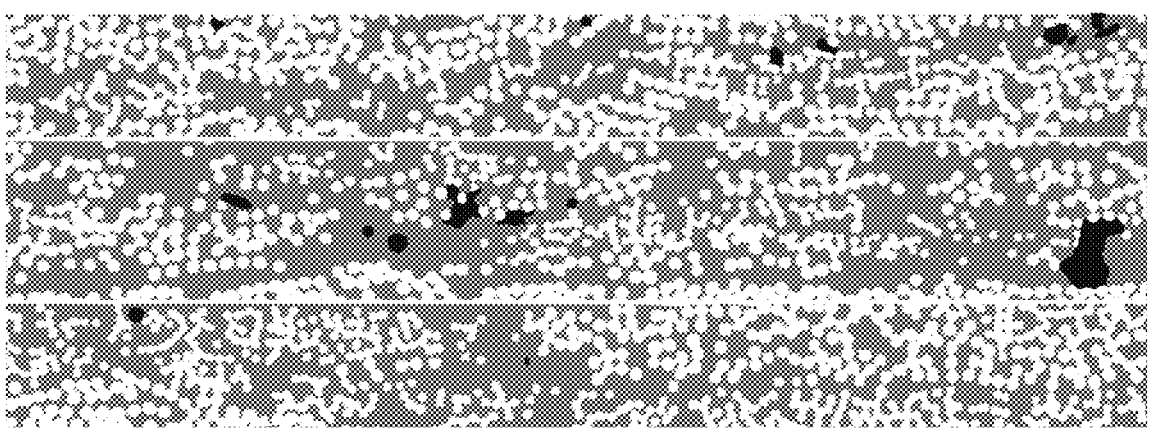
FIG. 8. Micrographs of comingled 5 μm and 7 μm diameter carbon fibers at Sakai Ovex.

Subsequently, relatively successful comingling of fibers was demonstrated using a fiber spreading machine. The micrographs in FIG. 8 demonstrate the initial results of the comingling process using Mitsubishi HS40 5 μm diameter HM carbon fibers and Teijin HTS40 7 μm diameter standard-modulus carbon fibers in a prepreg composite.

The same process was used to comingle Mitsubishi HS40 12K-filament-count-tow 66 Msi (455 GPa) modulus HM fibers and Mitsubishi MR70 12K 47 Msi (324 GPa) IM fibers into a unidirectional 30 mm wide dry fiber tape. Both HM and IM carbon fibers had the same 5 μm diameter.

Figure 9:
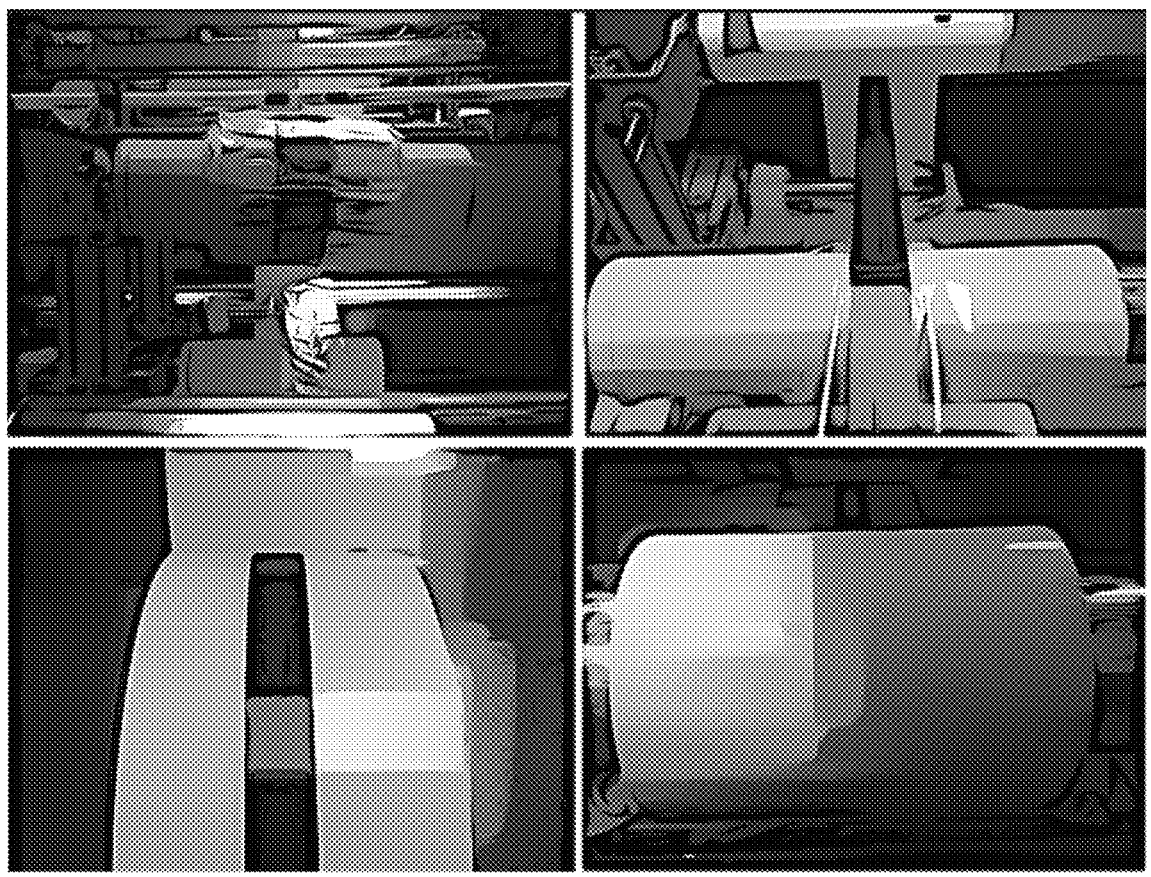
FIG. 9. HS40/MR70/3831 prepreg fabrication at PMT.

The unidirectional prepreg composite has been fabricated at PMT using the HS40/MR70 dry fiber tape and 3M 3831 off-the-shelf 250° F. curing resin similar to F3G. A 35% resin areal weight corresponding to approximately 60% fiber volume fraction was targeted and achieved. FIG. 9 shows the prepreg fabrication process at PMT facility. Table 2 provides a summary of the material design specifications.

TABLE 2

Hybrid prepreg composite design specifications.

Mitsubishi HM and IM fibers comingled at 50/50 into a dry fiber tape by Sakai Ovex
HS40 12K-filament-count-tow 66 Msi (455 GPa) modulus HM carbon fiber TABLE 2-continued Hybrid prepreg composite design specifications.

MR70 12K-filament-count-tow 47 Msi (324 GPa) modulus IM carbon fiber
Tape width 1.18 in. (30 mm)
3M 3831 epoxy resin (40% Nanosilica by resin weight, 250° F. curing)
Unidirectional prepreg tape fabricated at PMT
Target resin content 35% by weight (60% fiber volume fraction)
Cured ply thickness 0.002 in. (51 μm)

Figure 10:
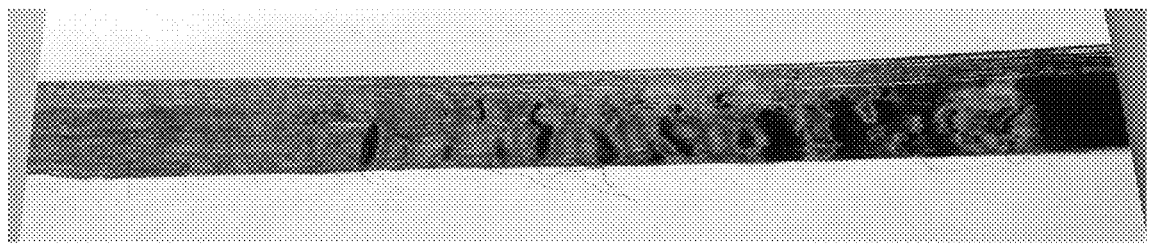
FIG. 10. Fiber misalignment in unidirectional prepreg tape.
Figure 11:
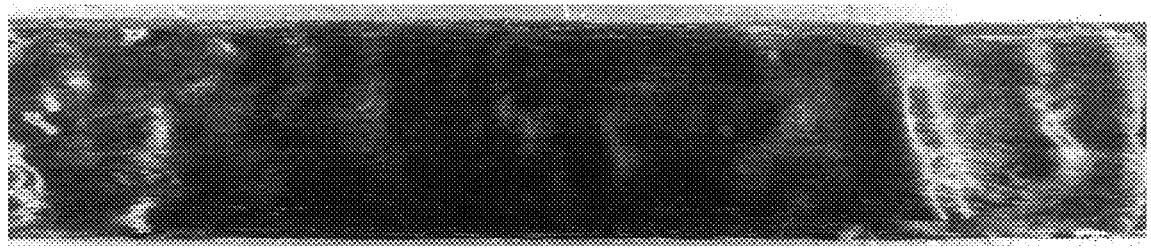
FIG. 11. Excessive fiber misalignment in the first uncured unidirectional composite panel.

The amount of prepreg was enough to cure two 1 foot (30.5 cm) long, 1.2 in. (30.5 mm) wide, and 0.16 in. (4.06 mm) thick unidirectional panels. The unidirectional prepreg tape had significant fiber waviness. FIG. 10 shows manufacturing defects including fiber waviness. Accordingly, the first composite panel had excessive fiber misalignment affecting the layup quality, as shown in FIG. 11.

Figure 12:
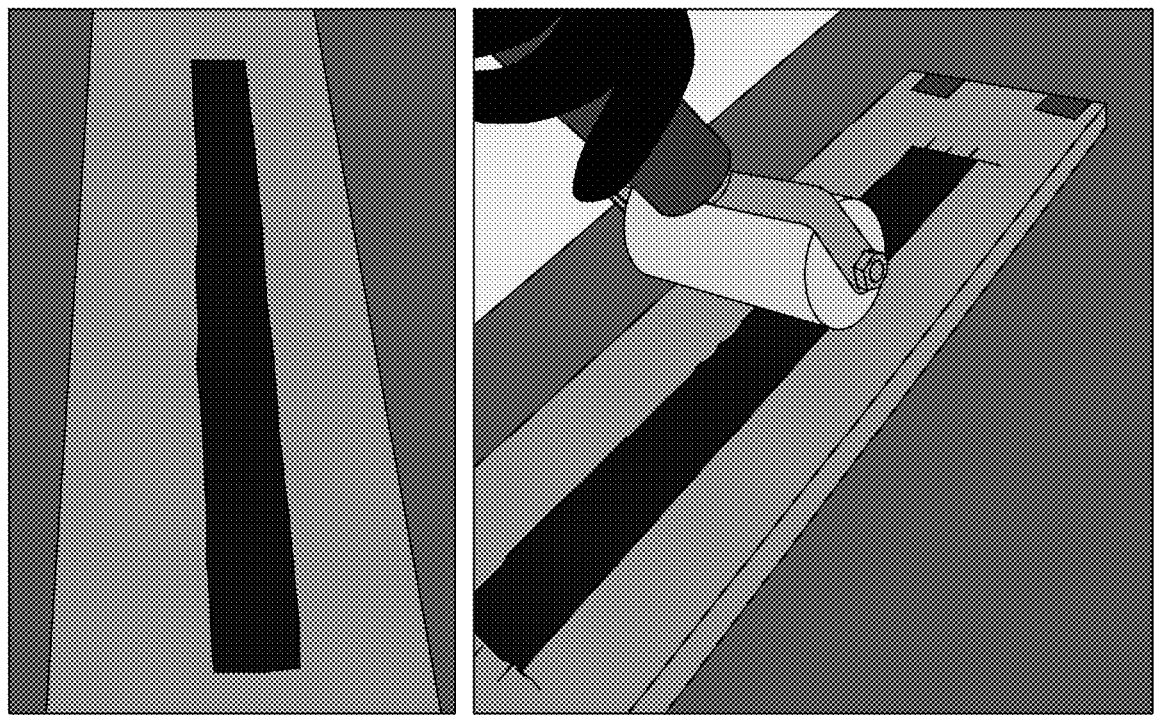
FIG. 12. Improving the layup quality in the second unidirectional composite panel.
Figure 13:
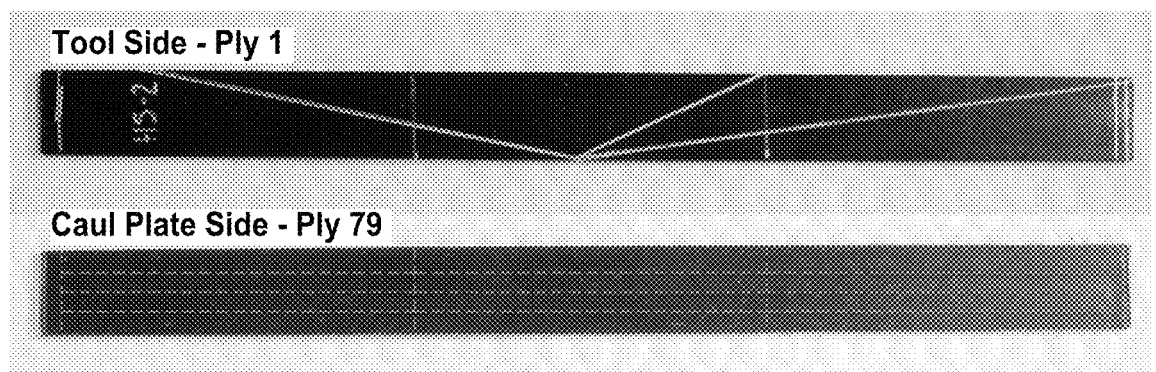
FIG. 13. The cured HS40/MR70/3831 composite panel used for mechanical testing.

To reduce the amount of fiber waviness in the second panel, the tooling was heated to reduce resin viscosity and allow the plies to stretch, and then a roller was applied to reduce the wrinkles during the layup process. FIG. 12 shows the process of improving the layup quality in the second unidirectional prepreg composite panel and FIG. 13 shows the cured panel.

Due to the limited material availability, standard material testing for HS40/MR70/3831 tape composite could not be accomplished to measure the material properties including axial modulus, shear modulus, and fiber-direction compressive strength. These properties were simultaneously measured using a three-point bend test method based on Digital Image Correlation (DIC) (Makeev et al., 2019).

The DIC data-driven methodology to simultaneously assess axial and shear material properties has been well documented in Makeev et al. (2009), Makeev et al. (2012), Makeev et al. (2013), Makeev et al. (2014), Makeev et al. (2019). Furthermore, a previous control test conducted on IM7/F7 carbon/epoxy unidirectional tape material system showed that the three-point bend test can produce similar values of the fiber-direction compressive strength as SACMA SRM 1R-94 when the appropriate test configuration is used. F7 epoxy resin is a 350° F. curing equivalent of the 250° F. curing F4A control resin developed by PMT as a basis for nanosilica reinforcement of the epoxy matrix (Makeev et al., 2019). Due to inconsistencies in achieving a uniform distribution of nanosilica compared to the 250° F. curing composites, this effort did not pursue 350° F. curing composites in the HM carbon/epoxy material development at this stage.

Figure 14:
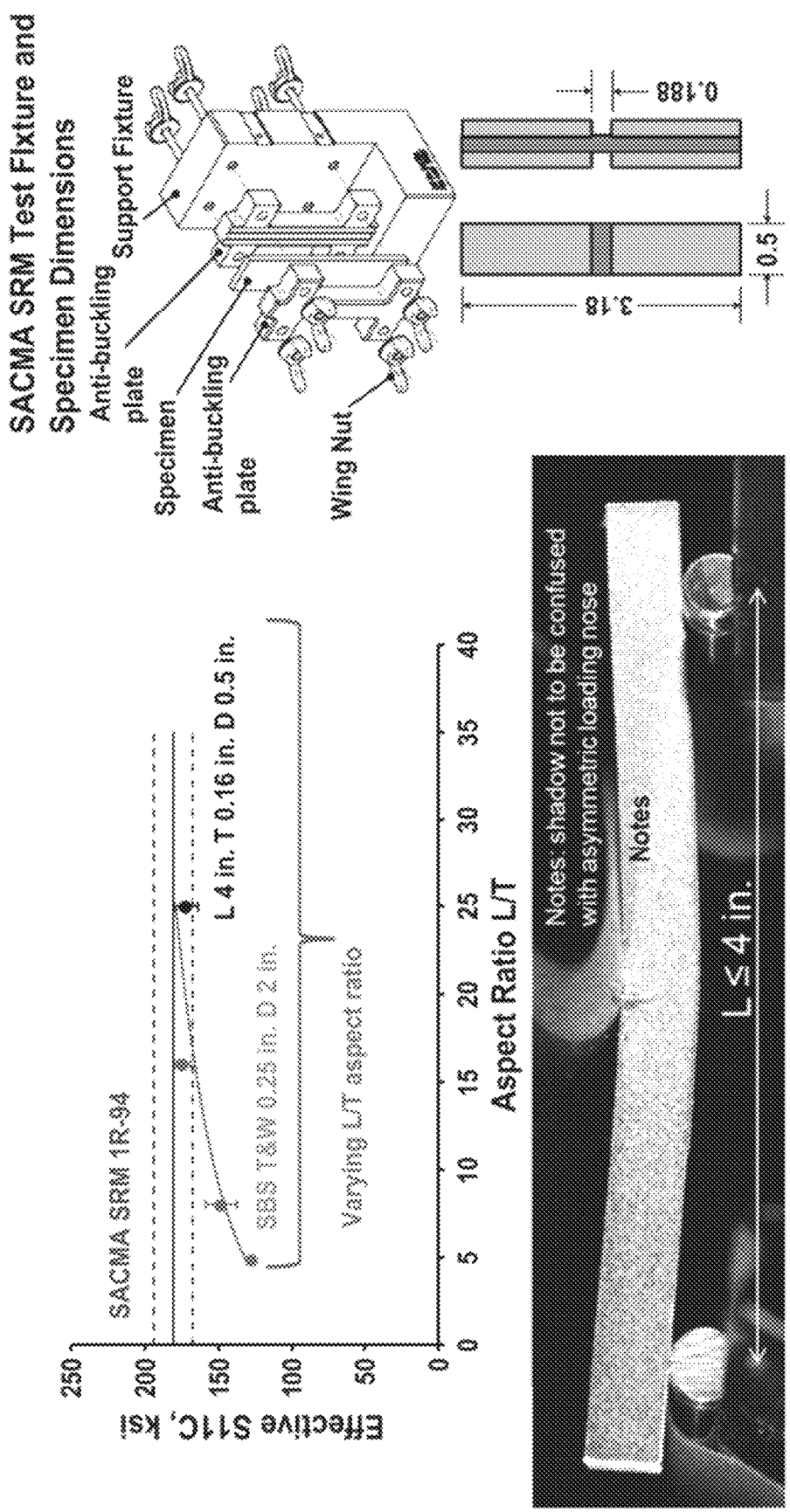
FIG. 14. Fiber-direction compressive strength assessment. Data are shown for IM7/F7 unidirectional tape. The test data show average values and standard errors. Notes: S11C—fiber-direction compressive strength (conversion factors 1 psi=6.895 kPa, 1 in.=25.4 mm). L—support length, T—coupon thickness, D—loading nose diameter.

In three-point bend test assessment, the support length to coupon thickness aspect ratio L/T and loading nose diameter were varied to minimize shear stress in the vicinity of the loading nose so the effective fiber-direction compressive stress corresponding to the onset of the compression failure matched SACMA SRM 1R-94 compressive strength. FIG. 14 shows that L/T between 16 and 25 including (A) a 4 in. (102 mm) support length and 0.25 in. (6.4 mm) coupon thickness and width (L/T 16) with 2 in. (51 mm) loading nose diameter; and (B) a 4 in. (102 mm) support length and 0.16 in. (4.1 mm) coupon thickness and width (L/T 25) with 0.5 in. (12.7 mm) loading nose diameter, are all adequate test configurations.

Figure 15:
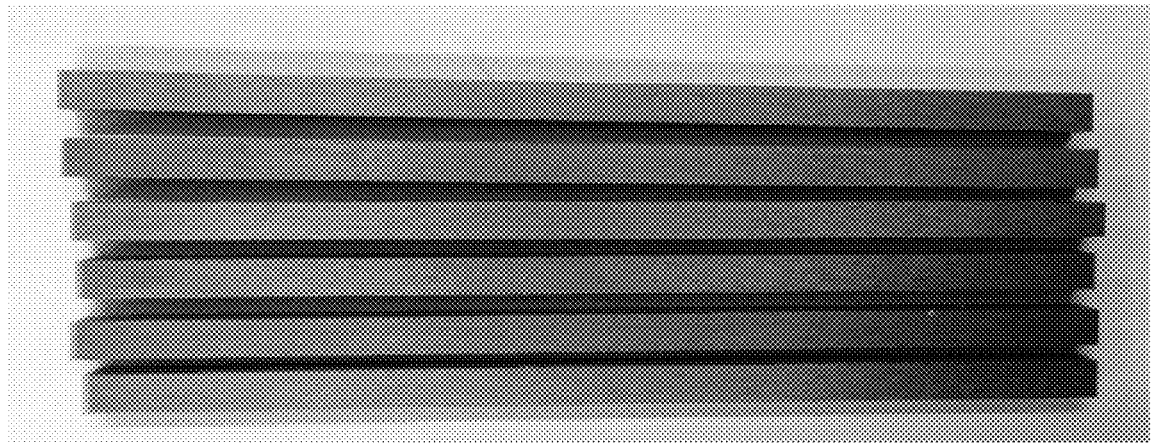
FIG. 15. Unidirectional coupons for mechanical testing. The coupon dimensions are 3.88×0.16×0.16 in. (99×4×4 mm).
Figure 16:
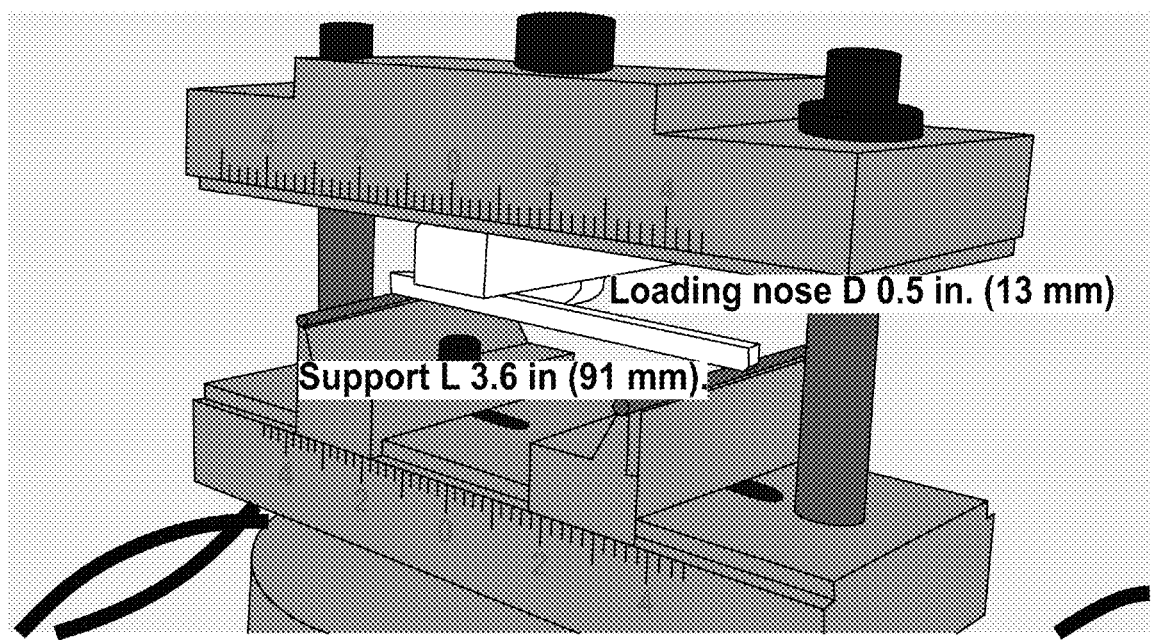
FIG. 16. Three-point bend test setup.

FIG. 15 shows six unidirectional coupons machined from the second HS40/MR70/3831 panel. The coupon dimensions are 3.88×0.16×0.16 in. (99×4.1×4.1 mm). Accordingly, a 3.6 in. (91 mm) support length and 0.5 in. (12.7 mm)

loading nose diameter conservatively approaching three-point bend test configuration (B) were utilized. FIG. 16 shows the test setup.

The six unidirectional three-point bend specimens were placed in an ASTM D 2344 (2006) test fixture with a custom 0.5-in. (12.7 mm) diameter loading nose and 0.125-in. (3.2 mm) diameter supports; and loaded in a 2,100 N (472 lbf) capacity Instron E3000 electric load frame at a constant 0.05 in./min (1.3 mm/min) crosshead displacement rate till failure. Fiber-direction compressive damage initiated in the middle of the specimen and immediately propagated to ultimate failure in all specimens. The tests were conducted at 72° F. room-temperature ambient conditions. All coupons exhibited similar behavior. The measured average axial modulus value for the unidirectional HS40/MR70/3831 tape composite is 30.1 Msi or 208 GPa (COV 2%); the average shear modulus value is 1.02 Msi or 7.03 GPa (COV 4%); and the average fiber-direction compressive strength value is 204 ksi or 1.41 GPa (COV 5%). Despite significant manufacturing defects including in-plane fiber misalignment, the hybrid HM composite approached the fiber-direction compressive strength of IM carbon/epoxy legacy composites at more than 30% higher axial modulus. Table 3 summarizes material properties for the unidirectional carbon/epoxy tape composite material systems used in this effort including the hybrid composite.

TABLE 3

Material data for the unidirectional carbon/epoxy 250° F. curing tape composite systems.

| Material | Ef, Msi | Er, Msi | Ec, Msi | Gc, Msi | Gc/Ec, % | Sc, ksi |
|---|---|---|---|---|---|---|
| IM7/913 | 40 | 0.492 | 23.4 | 0.717 | 3.06 | 223.9 |
| HM63/913 | 64 | 0.492 | 32.2 | 0.674 | 2.09 | 145.9 |
| IM7/F4A | 40 | N/A | 23.1 | 0.69 | 2.99 | 183.9 |
| HM63/F4A | 64 | N/A | 34.4 | 0.514 | 1.49 | 137.3 |
| IM7/F3G | 40 | 0.893 | 24.8 | 0.932 | 3.76 | 240.5 |
| HM63/F3G | 64 | 0.893 | 34.3 | 0.847 | 2.47 | 157.2 |
| HM/IM/3831[a] | 56.5 Avg | 0.893 | 30.1 | 1.02 | 3.39 | 204 [b] |

Figure 17:
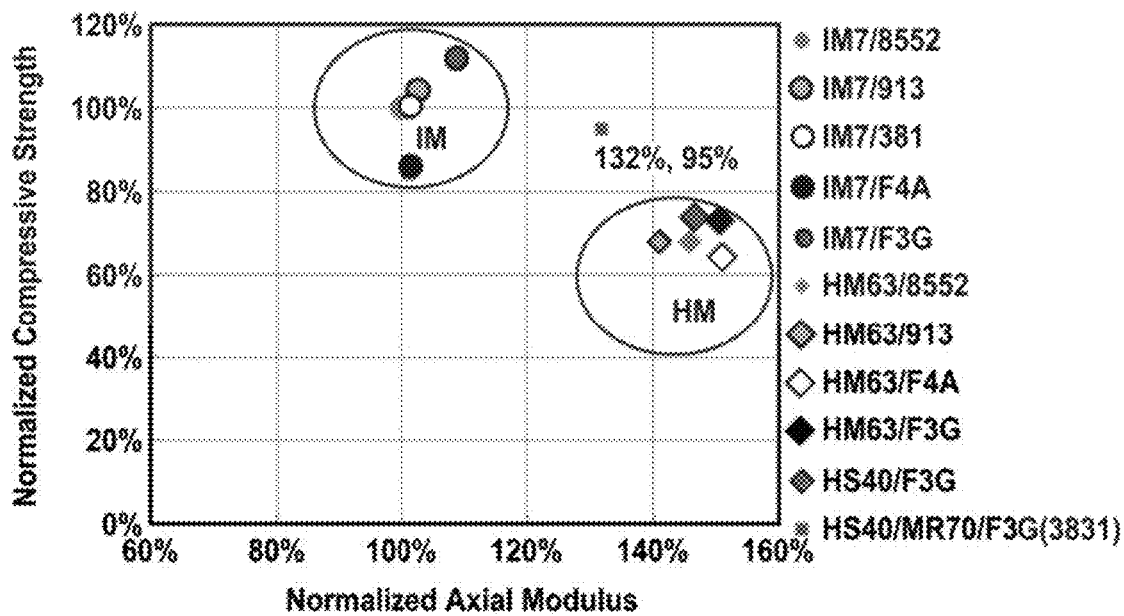
FIG. 17. Compressive performance of tape composites. Hybrid HM carbon/epoxy material is approaching fiber-direction compressive strength of IM carbon legacy composites at more than 30% higher modulus.
Figure 18:
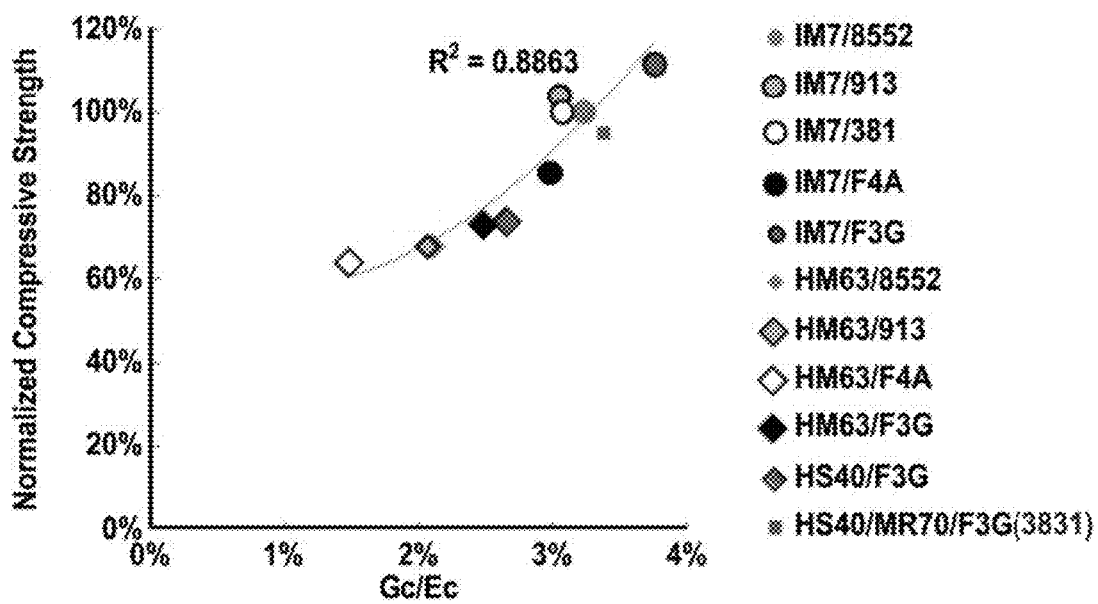
FIG. 18. Relation between the shear modulus to axial modulus ratio and the fiber-direction compressive strength for the composite material is consistent with the general trend. The material data point was not used in regression analysis to establish the trend line.

Ef—fiber modulus, Er—resin modulus, Ec—average axial modulus of composite material, Gc—shear modulus of composite material, Sc—fiber-direction compressive strength.
[a] HM/IM/3831 represents an abbreviation for HS40/MR70/F3G(3831).
[b] To be further increased with prepreg quality improvement, i.e. reducing in-plane fiber waviness.
Conversion factor: 1 psi = 6.895 kPa FIG. 17 compares the compressive performance of the HM and IM tape composite systems. The hybrid HM carbon/epoxy material is approaching fiber-direction compressive strength of IM carbon legacy composites at more than 30% higher modulus. FIG. 18 shows that the relation between the shear modulus to axial modulus ratio and the fiber-direction compressive strength for the material is consistent with the trend established in this effort, i.e. fiber-direction compressive strength increases with increasing shear modulus to axial modulus ratio of composites. This relation has been useful in the design of the material system. In particular, hybridizing IM and HM carbon fibers at the filament level in addition to the matrix nano-sized structural reinforcement throughout the composite, provides additional reinforcement of the material surrounding the HM fibers, increasing shear modulus to axial modulus ratio of the composite material and improving microstructural stability likely governing the fiber-direction compressive strength behavior.

Conclusions

In the absence of accurate models to predict fiber-direction compressive strength of HM carbon-fiber polymeric composites, and driven by the industry demands for developing a continuous HM CFRP approaching fiber-direction compressive strength of IM carbon legacy composites at 30% (or greater) higher Young's modulus, this effort presented an experimental approach of reinforcing material surrounding HM fibers, thus improving microstructural stability likely governing the fiber-direction compressive strength behavior. The effort started from experiments with various IM and HM carbon-fiber/epoxy-matrix composites including those toughened with nanosilica. Observation of the compressive strength behavior across different fiber and resin combinations showed a remarkable trend that fiber-direction compressive strength increases with increasing the shear modulus to axial modulus ratio of composite material systems. This observation inspired attempts of hybridizing carbon fibers with varying moduli for the desired improvement of compressive strength. Comingling IM and HM fibers at the filament level has been required to achieve the target improvement. The fiber hybridization, in addition to the matrix nano-sized structural reinforcement throughout the composite, increased shear modulus to axial modulus ratio of the composite material, thus increasing compressive strength. The results demonstrate that the hybrid HM carbon composite fiber-direction compressive strength achieves that of IM composites but with more than 30% higher axial modulus.

REFERENCES

American Society for Testing and Materials (2006). Standard Test Method for Short-Beam Strength of Polymer Matrix Composite Materials and Their Laminates. ASTM Standard D 2344/D 2344M, ASTM International, West Conshohocken, Pa.

Argon, A. (2013). Fracture of composites. *Treatise on materials science and technology*, 22 (1), 79-114.

Budiansky, et al. (1993). Compressive failure of fibre composites. *Journal of the Mechanics and Physics of Solids*, 44 (1), 183-211.

Cytec (2012). CYCOM 381 Epoxy Prepreg. Technical Data Sheet.

Dow, et al. (1960). Determination of most-needed, potentially possible improvements in materials for ballistic and space vehicles, T.I.S. R60SD389. Missile and Space Vehicle Department, General Electric Company. 4 (647), 269.

Grafil, Inc. (2008). PYROFIL™ HS40 12K Typical Fiber Properties.

Godara, et al. (2010). Interfacial shear strength of a glass fiber/epoxy bonding in composites modified with carbon nanotubes. *Composites Science and Technology*, 70 (9), 1346-1352.

Hackett, et al. (2010a). Improved Carbon Fiber Composite Compression Strength and Shear Stiffness through Matrix Modification with Nanosilica. *American Society for Composites 25th Technical Conference*.

Hackett, et al. (2010b). The Effect of Nanosilica Concentration on the Enhancement of Epoxy Matrix Resins for Prepreg Composites. SAMPE.

Hexcel Corporation. (2016a). HexPly™ 8552 Mid-Toughened, High Strength, Damage-Resistant, Structural Epoxy Matrix. Product Data Sheet.

Hexcel Corporation. (2016b). HexPly™ 913 257° F. (125° C.) Curing Epoxy Matrix. Product Data Sheet.

Hexcel Corporation. (2016c). HexTow™ HM63 Carbon Fiber. Product Data Sheet.

Hexcel Corporation. (2016d). HexTow™ IM8 Carbon Fiber. Product Data Sheet.

Hexcel Corporation. (2018). HexTow™ IM7 Carbon Fiber. Product Data Sheet.

Kinloch, et al. (1983). *Fracture Behaviour of Polymers.* Elsevier Applied Science Publishers Ltd.

Kumar, et al. (1988). Compressive strength of high performance fibers. *MRS online Proceedings library archive,* 134.

Kyriakides, et al. (1995). On the compressive failure of fiber reinforced composites. *International Journal of Solids and Structures,* 32 (6-7), 689-738.

Lo, et al. (1992). Compressive strength of unidirectional composites. *Journal of Reinforced Plastics and Composites,* 11 (8), 838-896.

Makeev, et al. (2013). Short-Beam Shear Method for Assessment of Stress-Strain Curves for Fiber-Reinforced Polymer-Matrix Composite Materials. *Strain,* 49 (5), 440-450.

Makeev, et al. (2015). Advanced Composite Materials Technology for Rotorcraft through the Use of Nanoadditives. *Journal of the American Helicopter Society,* 60 (3), 1-10.

Makeev, et al. (2012). A Method for Measurement of Multiple Constitutive Properties for Composite Materials. *Composites Part A: Applied Science and Manufacturing,* 43 (12), 2199-2210.

Makeev, et al. (2009). A Test Method for Assessment of Shear Properties of Thick Composites. *Journal of Composite Materials,* 43 (25), 3091-3105.

Makeev, et al. (2014). In Quest of Methods for Measuring 3D Mechanical Properties of Composites. *Composites Science and Technology,* 100 (2014), 105-112.

Makeev, et al. (2019). Analysis Methods for Improving Confidence in Material Qualification for Laminated Composites. *Journal of the American Helicopter Society,* 64 (1), 1-13.

Mitsubishi Chemical Corporation. (2017). PYROFIL™ MR 70 12P Intermediate Modulus Carbon Fiber with Super High Strength. Product Data Sheet.

Naya, et al. (2017). Computational micromechanics of fiber kinking in unidirectional FRP under different environmental conditions. *Composites Science and Technology,* 144 (2017), 26-35.

Rosen, et al. (1965). Mechanics of Composite Strengthening. *Fibre Composite Materials* (pp. 37-75). American Society of Metals.

SACMA SRM 1R-94. (1994). Test Method for Compressive Properties of Orientated Fiber-Resin Composites. Suppliers of Advanced Composite Materials Association. Arlington, Va.

Sun, et al. (2018). Experimental and computational analysis of failure mechanisms in unidirectional carbon fiber reinforced polymer laminates under longitudinal compression loading. *Composite Structures,* 203, 335-348.

Toray. (2018). *M55J High Modulus Carbon Fiber.*

Waas, et al. (1996). Compressive failure of composites, part II: Experimental studies. *Progress in Aerospace Sciences,* 32 (1), 43-78.

Example 2

Abstract

Described herein is the development of microstructural methods for developing high-performance composite materials. For example, integrated structural methods and prognostics capabilities were expanded into the development of new material systems. In particular, a strong demand in high-modulus (HM) CFRPs enabling attractive lightweight rotary-wing systems and fixed-wing airframe structures has been addressed. Current status of the microstructural methods is presented and placed in the perspective of advancing the following three elements and their effective integration: First, high-resolution NDI and microstructural diagnostics enabled accurate 3D measurement of material microstructure including manufacturing irregularities with automated transition to microstructural models. Second, in-situ methods, driven by SEM and CT data captured essential material properties to meet the input data requirements for comprehensive material strength microstructural models. Third, the physical observations and material properties were combined in computational analysis to capture the failure modes governing compressive strength material behavior.

Introduction

There has been a strong demand in high-modulus (HM) CFRPs enabling attractive lightweight rotary-wing systems and fixed-wing airframe structures. However, extremely low fiber-direction compressive strength has been a well-recognized weakness of HM carbon-fiber composites, prohibiting their implementation in aircraft platforms. Strong decrease in fiber-direction compressive strength of HM carbon-fiber composites, compared to their intermediate modulus (IM) counterparts, contradicts more than five decades of micromechanics-based (microstructural buckling) model development based on ad hoc assumptions, predicting increase in the fiber-direction compressive strength due to higher-modulus fibers [1-5].

Promising experimental results enabling high-modulus carbon fiber reinforced polymeric composites with adequate fiber-direction compressive strength were achieved. Through hybridization of fibers with varying moduli and nanosilica toughening of an epoxy matrix, a hybrid material solution approaching fiber-direction compressive strength of IM legacy composites but with more than 30% increase in axial modulus was demonstrated [5]. Hybridizing IM and HM fibers at the filament level [5], in addition to the matrix nano-sized structural reinforcement throughout the composite material [6], increases shear modulus to axial modulus ratio thus improving microstructural stability which can govern the fiber-direction compressive strength behavior. The basis for this hybrid material design stems from the fact that fiber-direction compressive strength increases with the shear modulus to axial modulus ratio of composites across different fiber and resin combinations [5].

Figure 19:
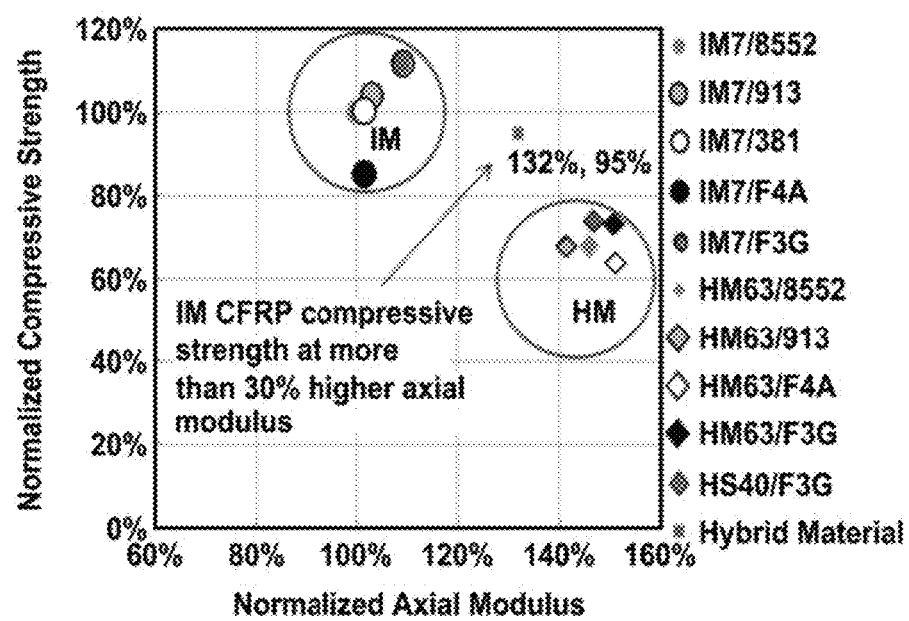
FIG. 19. Axial modulus and fiber-direction compressive strength of HM and IM 12K-filament-count-tow carbon fiber-reinforced epoxy-matrix tape composites. Notes: IM7 (Hexcel)—IM carbon fibers; HM63 (Hexcel)—HM carbon fibers. Hybrid Material has been reinforced by HS40 (Mitsubishi) HM carbon fibers and MR70 (Mitsubishi) IM carbon fibers at 50/50 ratio. 8552—350° F. curing toughened legacy epoxy (Hexcel); 913—250° F. curing toughened legacy epoxy (Hexcel); Hybrid Material has 3831 (3M) 250° F. curing Nanosilica toughened epoxy matrix (40% Nanosilica by resin weight). Target resin content 35% by weight (60% fiber volume fraction) [5, 6, 7].

FIG. 19 compares the fiber-direction compressive strength and modulus of the hybrid material to legacy composite systems. The material performance in FIG. 19 has been normalized to Hexcel IM7/8552—a benchmark 350° F. curing prepreg tape composite material system for aircraft structures that has been well characterized in open literature [5].

All the ingredients of the new composite material system are commercially available off-the-shelf products scalable for production. However, there are no accurate physics-based models available to capture fiber-direction compressive strength behavior of HM CFRPs. Such models would provide the most effective way to explore diverse material design options enabling the optimum microstructural configurations. The absence of accurate models has been attributed to complexity and potential multiplicity of the governing failure modes and their interaction. Indeed, composite materials represent very complex systems including many components, e.g. carbon fiber, polymer matrix, fiber sizing, matrix toughening nanoparticles, etc. These components and their interactions add to the complexity and the associated challenge of understanding the failure phenomena. Fiber-direction failure in HM CFRPs is not well-documented, which raises the question whether the fiber-direction compressive strength of PAN-based continuous HM CFRPs and HM/IM hybrids is indeed governed by microstructural stability (fiber kinking), as it is most commonly accepted and observed in IM CFRPs.

Figure 20:
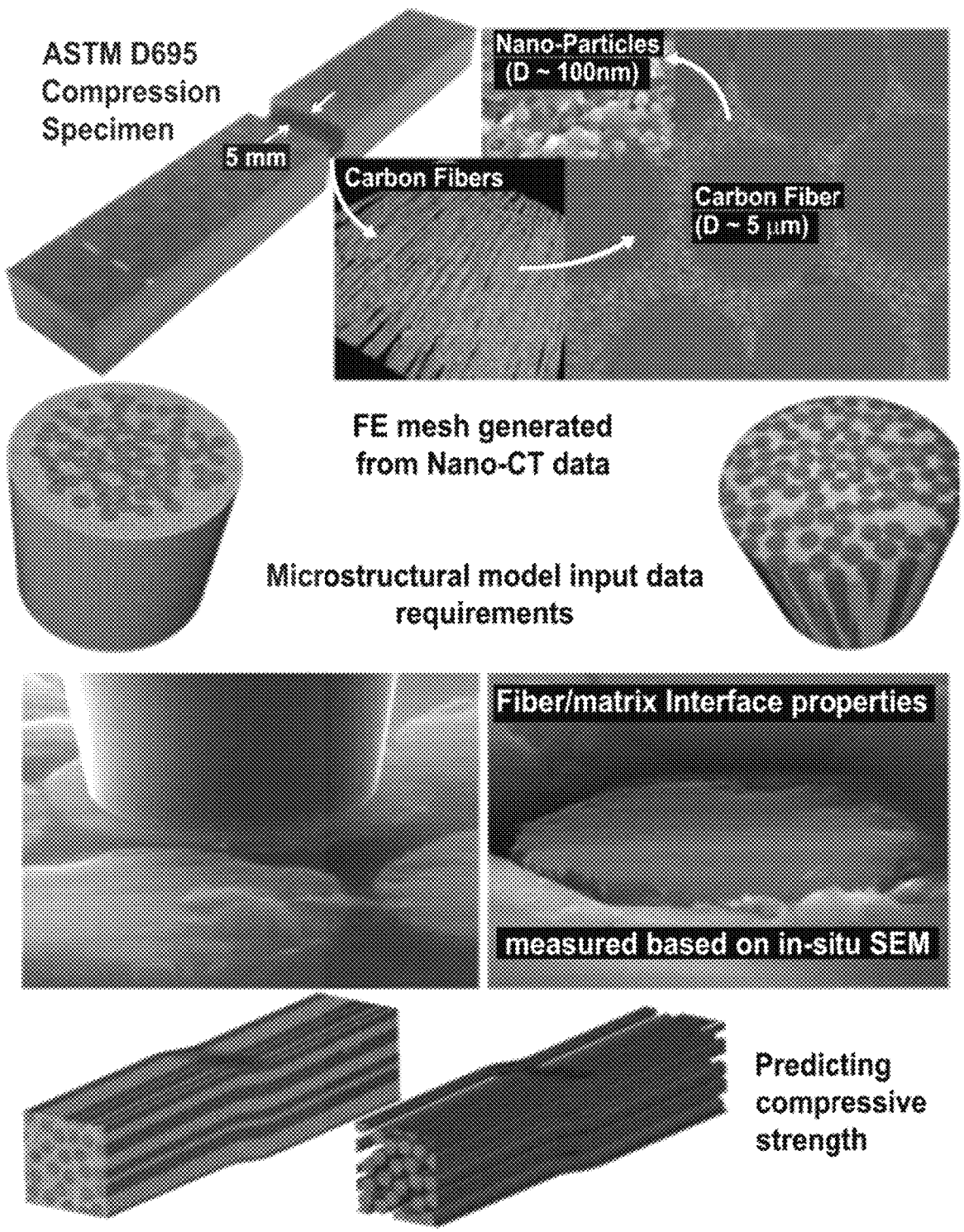
FIG. 20. Integrated microstructural methods and prognostics.
Figures 21A, 21B, 21C, 21D:
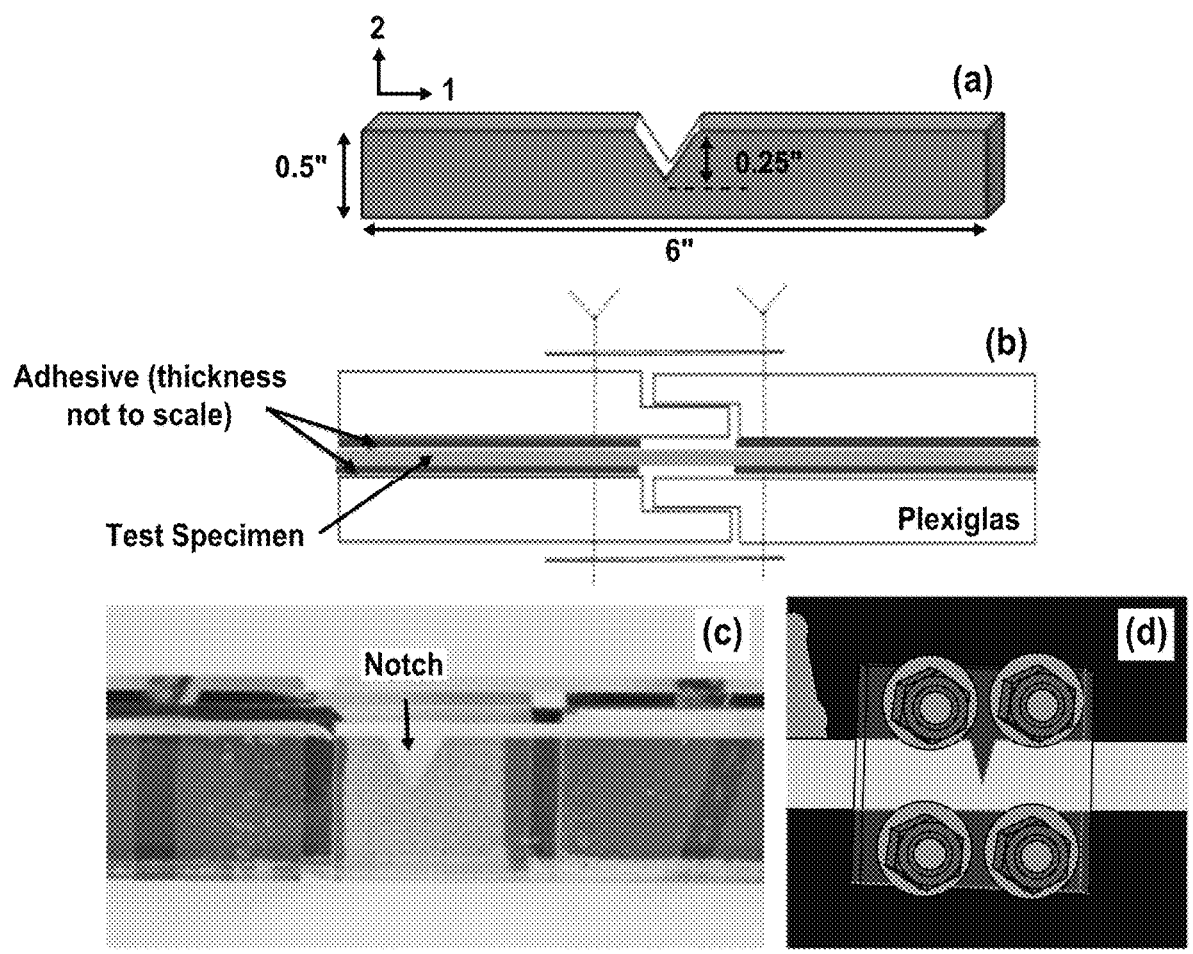
FIG. 21a-FIG. 21d.
Figure 22:
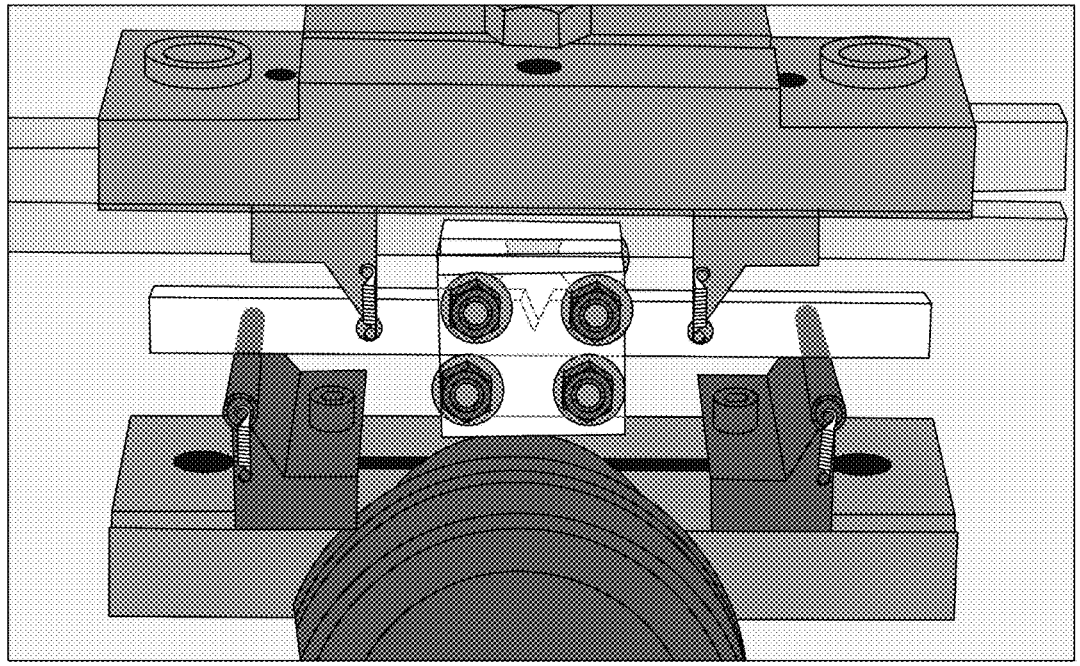
FIG. 22. Four point bend notched test configuration

To address some of the standing challenges towards enabling high-fidelity models, integrated structural methods [8-11] were expanded into the microstructural world to allow for the development of new material systems, based on the development, and effective integration, of the following elements (summarized in FIG. 20): First, high-resolution NDI and microstructural diagnostics enabled accurate 3D measurement of material microstructure including manufacturing irregularities with automated transition to microstructural models. The automated data transition can ensure the objectivity or independence upon the operator's level of expertise or interpretation, providing consistent results. Second, in-situ methods, driven by SEM and CT data, captured essential material properties to meet the input data requirements for comprehensive material strength microstructural models. Third, the physical observations and material properties were combined in a computational analysis to capture the governing failure modes and predict material performance.

Observing the fiber-direction compressive failure presumably governed by microstructural stability has been a major prerequisite to developing a rigorous modeling strategy. The next section presents results assuring the pertinence of microbuckling in HM CFRPs. Furthermore, some of the major challenges in developing models capturing the microstructural stability governing fiber-direction compression strength include meeting their input data requirements. Methods to generate such data based on high-resolution X-ray Computed Tomography (CT) measuring material topology including fiber misalignment, and through in-situ Scanning Electron Microscopy (SEM) measuring the microstructural material properties, e.g. fiber-to-matrix interface shear strength, were advanced.

Fiber Microbuckling

Kink-band formation has been widely assumed to drive fiber-direction compressive strength of IM tape CFRPs [12-19]. On the other hand, fiber-direction failure in HM CFRPs has received much less attention.

Many previous experimental investigations focused on kink-band formation in IM CFRPs have used notched unidirectional (UD) laminates with relatively large width to thickness ratio [20-22]. Herein, a notched UD four-point-bend (FPB) specimen developed by Laffan et al. [22] was used. However, a large 0.25 in. thickness of the original FPB specimen entails large energies of damage progression, which results in two-piece fracture of the specimens before a stable damage progression can be observed. HM CFRPs exhibit brittle fiber-direction compressive strength behavior with much lower strain to failure compared to IM CFRPs, which makes observing the failure mode in HM CFRPs even more challenging. Accordingly, the FPB specimen width was reduced to approximately 0.02 in., which allowed for a stable failure progression in the HM and IM CFRPs considered herein.

FIG. 21a-FIG. 21d and FIG. 22 show a representative thin notched FPB specimen and the test configuration. The specimen is bonded to Plexiglas antibuckling guides on both sides, except in the gage section. The guides have step joints (hinges) in the gage section to avoid load sharing by the guides. Additional Plexiglas antibuckling supports were clamped to the specimen for stability. The bolts in these supports are hand-tight to minimize any clamping effect on the specimen compressive strength behavior.

Figures 23A, 23B, 23C:
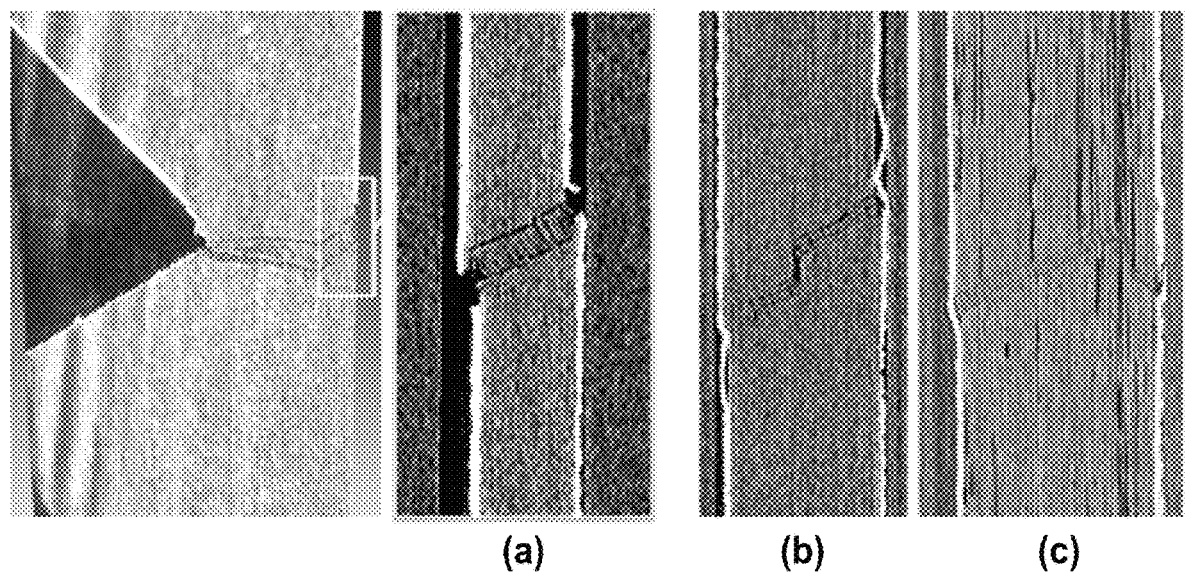
FIG. 23a-FIG. 23c A CT volume slice showing out-of-plane kink-band, FIG. 23a) Kink band formation in a 0.015 in. thick IM CFRP FPB specimen, FIG. 23b) Kink band in a 0.019 in. thick HM CFRP FPB specimen, FIG. 23c) Kink band in a 0.028 in. thick hybrid HM/IM CFRP (Hybrid Material) FPB specimen. Manufacturing defects (gaps) due to poor prepreg quality are evident in the hybrid material.

FPB specimens were tested using a Shimadzu AGS-X Series electromechanical load frame with a 2 Kip load cell. Each specimen was loaded under displacement control at a rate of 0.01 in/min. load and crosshead displacement were continuously recorded during the test. One 16-megapixel stereo camera system was used to monitor a highly magnified image of the notch tip. The magnified images were used to determine the failure progression. A μ-CT inspection clearly demonstrates fiber-direction compression failure due to microbuckling. CT volume slices of IM, HM, and HM/IM hybrid (Hybrid Material) CFRPs in FIG. 23a-FIG. 23c show out-of-plane kink bands across the thickness of the specimens.

Observing the kink-band formation across the different fiber types confirms that fiber-direction compressive strength is indeed governed by microstructural stability, which can be used as a basis for developing a rigorous modeling strategy and meeting the material input data requirements.

X-ray CT Based Microstructural Measurements

The highest attainable resolution CT data, at micron scale and below, is needed to capture topology of the material structure useful for the microstructural model development. Herein, nano-CT facilities were utilized to capture material structure. In particular, ZEISS Xradia 810 Ultra was used, which may be highest-resolution CT system to this date. It can theoretically achieve 64 nanometer voxel size, although a 64 micron-diameter or smaller inspection article would be required for such resolution. However, the smallest diameter achieved herein was 200 μm, which resulted in 200 nm minimum voxel size.

Figure 24:
FIG. 24. A 200 µm diameter composite specimen machined for ultra-high resolution CT scanning to measure material structure.
Figure 25:
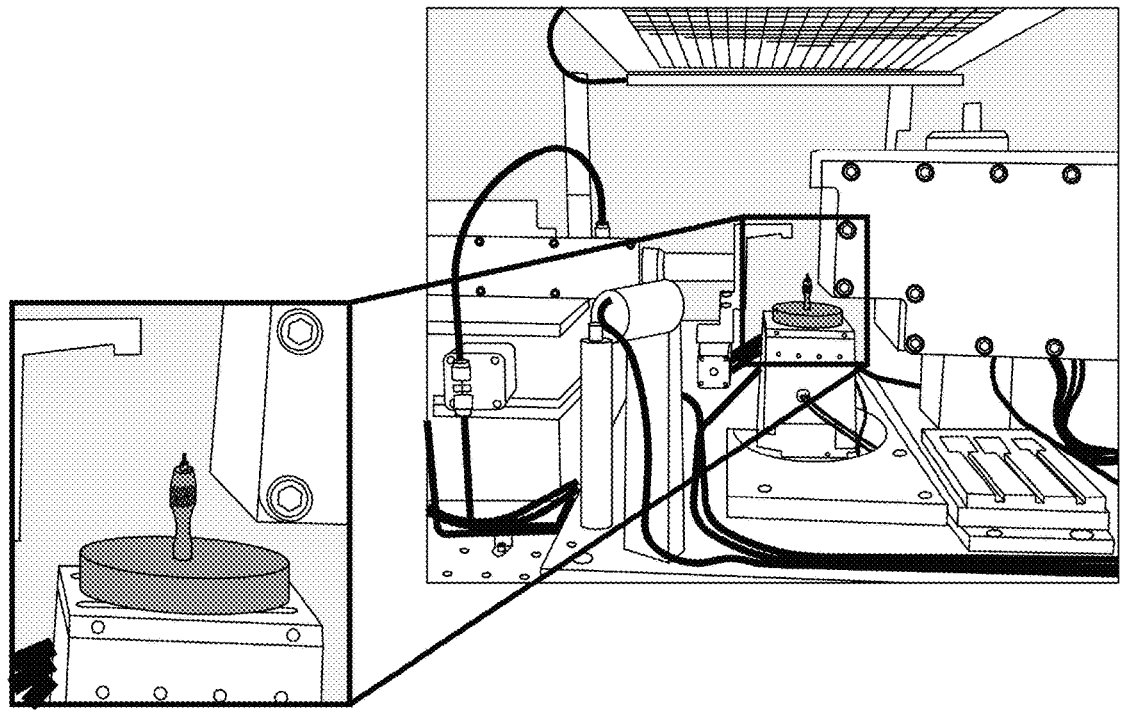
FIG. 25. ZEISS Xradia 810 Ultra CT setup.

FIG. 24 shows a representative machined composite specimen. The composite specimen was mounted in the appropriately sized hypodermic needle. FIG. 25 shows the inspection setup.

Figure 26:
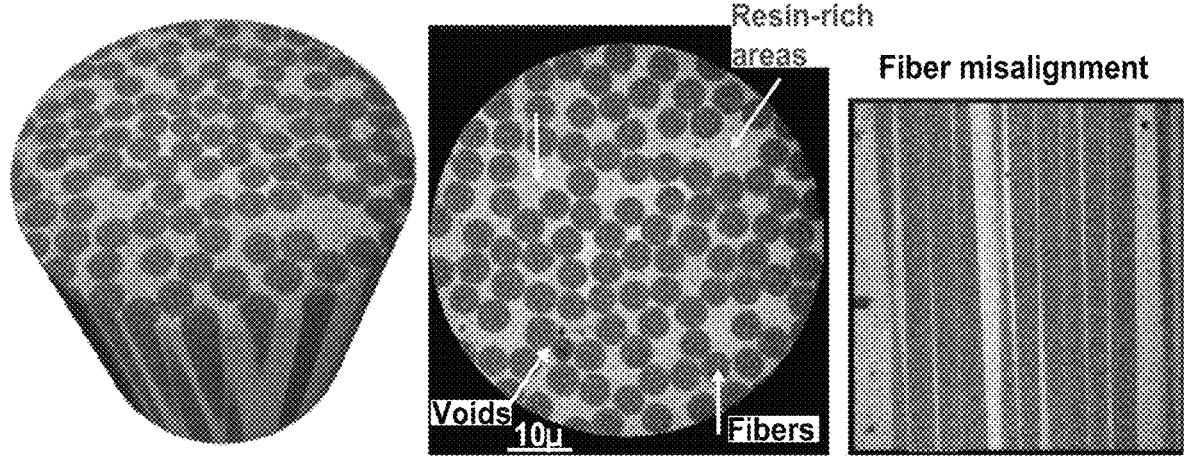
FIG. 26. Details of the CT based microstructural measurements for composite specimens.

FIG. 26 shows details of the microstructural measurements after CT reconstruction. Among such details, fiber distribution and the initial fiber misalignment are among the most critical geometric input properties for microbuckling model development. Specifically, 1 to 3 degree initial misalignment angles are evident in the new HM CFRP material system developed herein.

In-Situ SEM Based Microstructural Measurements

Major challenges in developing models capturing the microstructural stability governing fiber-direction compression strength include meeting their input data requirements. Methods to generate such data have been advanced through in-situ SEM measuring the essential microstructural material properties. Among such methods, in-situ scanning electron microscopy (SEM) based fiber push-out experiments were introduced to measure fiber-matrix interface shear strength and characterize other properties of the micro-constituents.

Figures 27A, 27B, 27C:
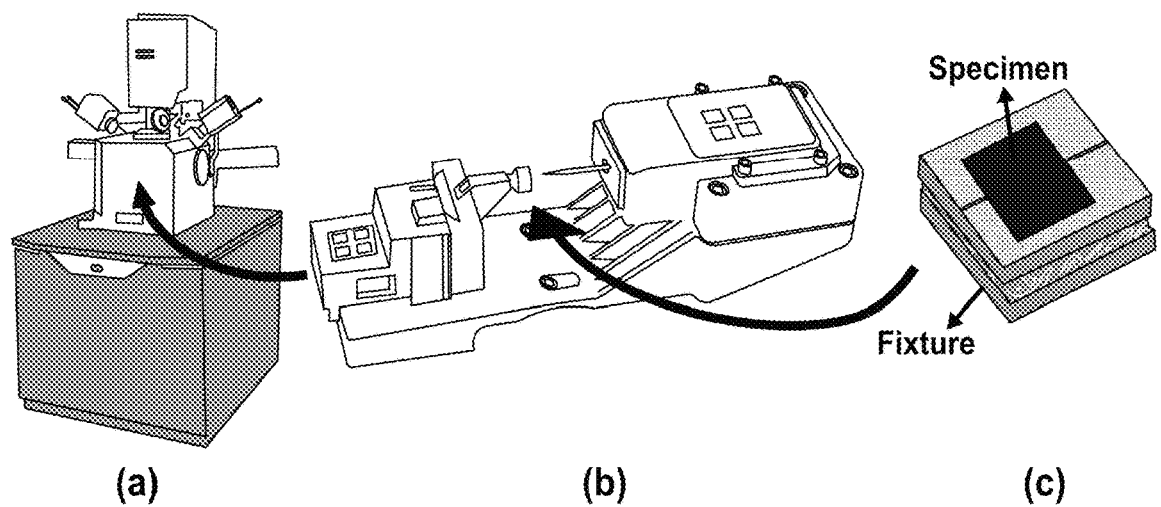
FIG. 27a-FIG. 27c.
Figures 28A, 28B, 28C, 28D, 28E, 28F:
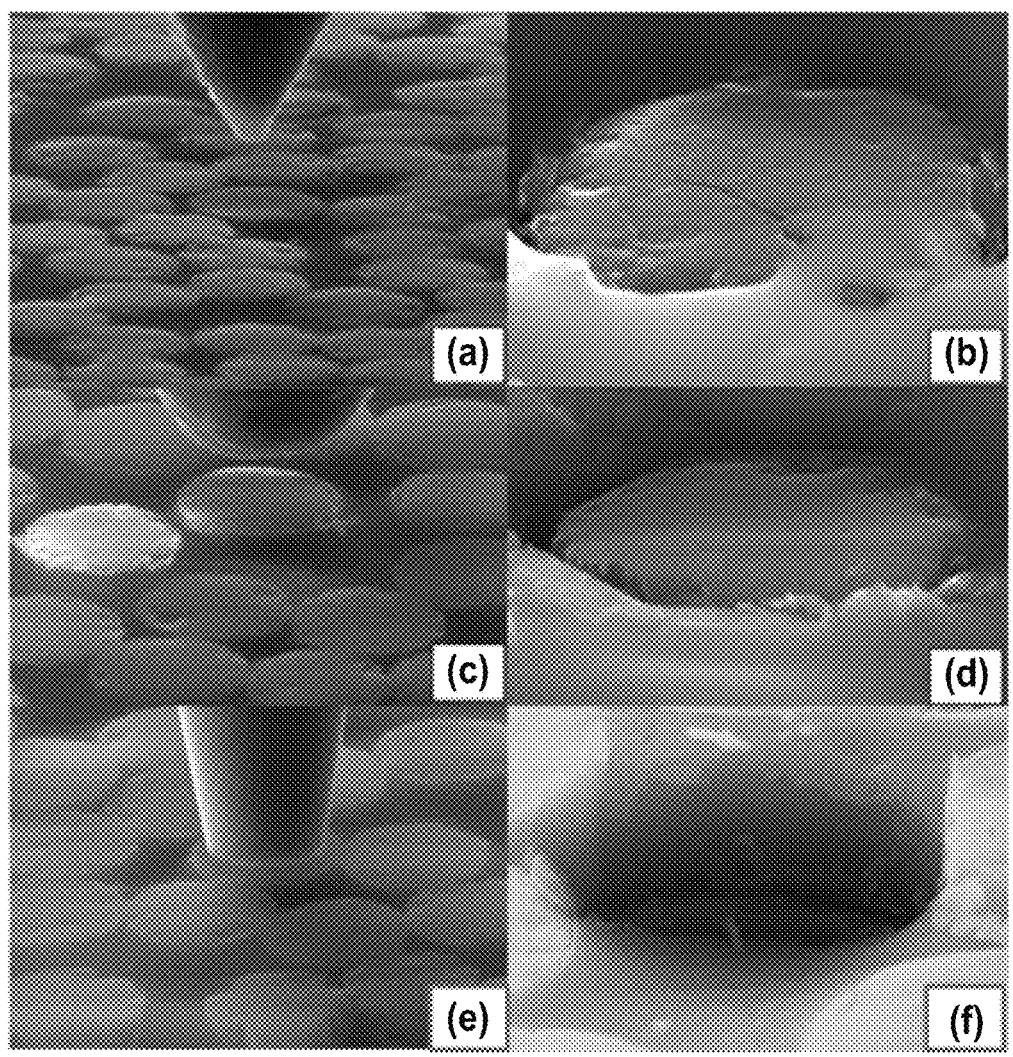
FIG. 28a-FIG. 28f. SEM micrographs of fiber push-out experiments using indenters of different sizes, FIG. 28a and FIG. 28b) flat ended diamond tip with a 1 µm diameter, FIG. 28c and FIG. 28d) a diamond tip with a 5 µm diameter, FIG. 28e and FIG. 28f) fiber push-out test with a 4 µm diameter probe.
Figures 29A, 29B, 29C, 29D:
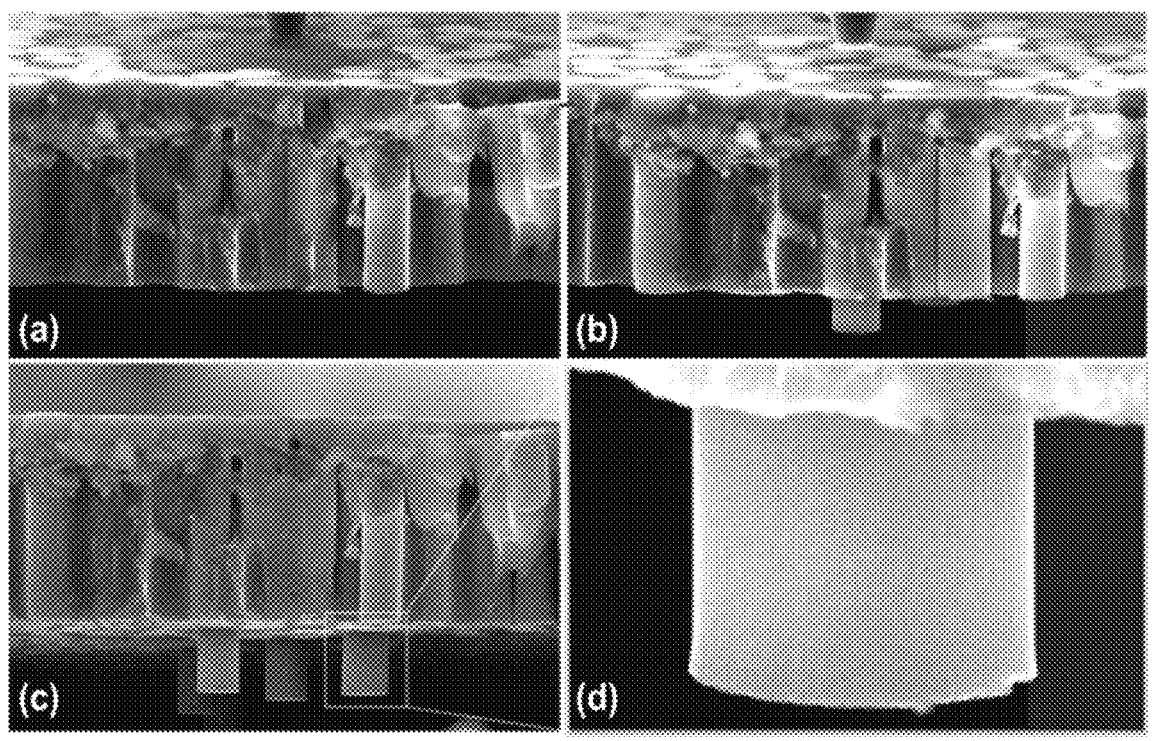
FIG. 29a-FIG. 29d. Typical post-test SEM images showing pushed out fibers.
Figures 30A, 30B, 30C, 30D:
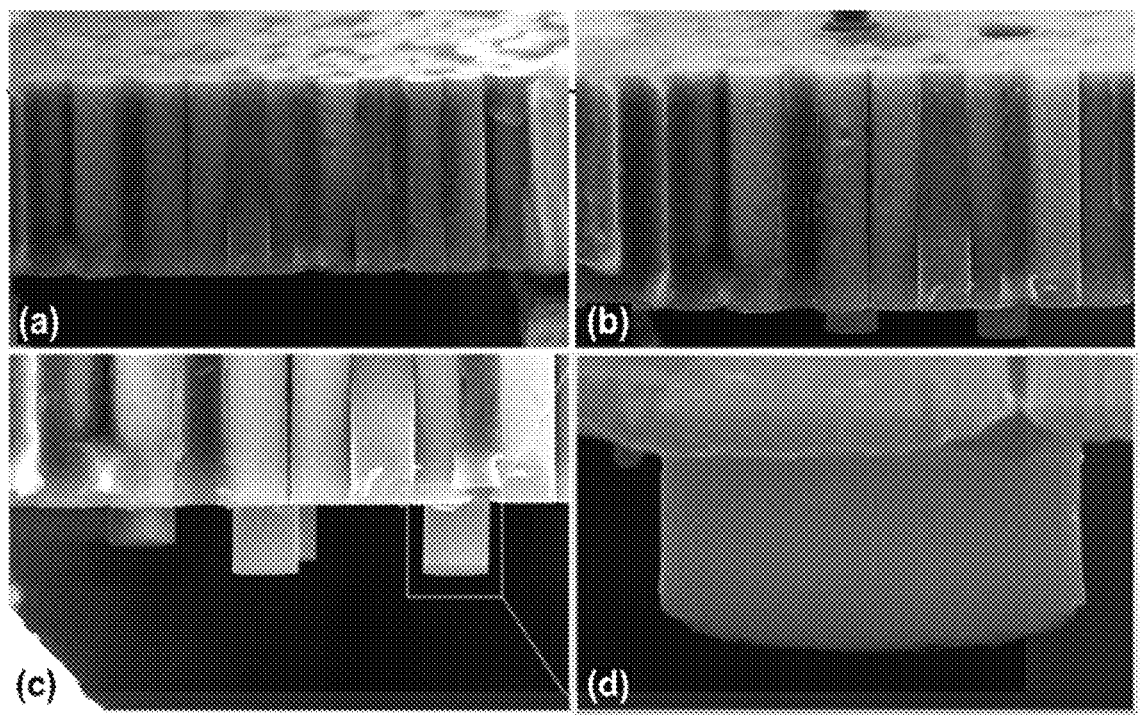
FIG. 30a-FIG. 30d. Typical post-test SEM images showing pushed out fibers.

Fiber push-out tests on individual fibers were performed using a FEI Versa 3D SEM equipped with a Bruker PI-88 PicoIndenter micromechanical load frame (FIG. 27a-FIG.

27c). The Environmental SEM (ESEM) technology, in conjunction with low vacuum modes, allows for a range of samples to be worked with, including non-conductive samples [23] without sputtering.

A fiber push-out test requires fabrication of a thin, polished, defect-free specimen. The specimen has to be thin enough to allow for the fiber-matrix interface decohesion without the presence of the competing failure modes [24-28]. On the other hand, the thickness-to-width aspect ratio cannot be too small as it could result in excessive bending of the specimen affecting characterization. It was found that 20-30 µm thickness and 50 µm width meet both the failure mode and the specimen rigidity requirements. FIG. 27(c) shows a representative composite specimen with a thickness of 20-30 µm mounted on the supporting fixture with the groove of 50 µm in width. The purpose of the groove is to provide room for fiber extraction. To perform a push-out test, the fixture with a mounted specimen is placed on a sample stage holder of the PI-88 system which will be loaded into the SEM. A cone-shape diamond indenter tip with a flat tip is brought into contact with the fiber on the top surface. An indenter tip is used to apply force to a single fiber. The indentation is performed until fiber-matrix interface is completely broken and the fiber is pushed out of the specimen. During the test, the load and depth of indentation are continuously recorded. Then, by measuring the maximum applied load Pmax, at which decohesion occurs, fiber length (the thickness of the specimen) h, and fiber radius r, the interface shear strength (IFSS) can be calculated using Equation (1).

$$IFSS = \frac{P\max}{2\pi rh} \quad (1)$$

FIG. 28a-FIG. 28f shows examples of in-situ SEM imaging while pushing out 5 µm diameter carbon fibers. Fiber push-out based experimental techniques within SEM, using flat-tip nano-indenters of different sizes (FIG. 28a-FIG. 28f) are well suited for measuring and comparing matrix-to-fiber interface strength and fiber breakage in PAN-based HM and IM composites with the same resin system, and evaluating the possibility of early debonding and splitting in HM composites [7].

FIG. 29a-FIG. 29d and FIG. 30a-FIG. 30d show typical SEM images after fiber push-out tests providing evidence of the fiber-matrix interface failure for the new hybrid HM CFRP material.

The preliminary experimental results listed in Table 4 show approximately 30% decrease in the average values of the fiber-to-matrix interface shear strength for HM carbon fibers compared to IM carbon fibers in the same matrix system. Such a strong reduction correlates with decreasing the fiber-direction compression strength prediction by a microstructural buckling model which properly accounts for the fiber-to-matrix interface shear strength behavior [7].

TABLE 4

Experimental results obtained from fiber push-out tests on IM and HM carbon finer in the new hybrid CFRP.

| Carbon fibers in hybrid material | Average Maximum Load | Average Measured IFSS | Coefficient of Variation (COV) |
|---|---|---|---|
| IM carbon fibers (MR70) | 15 × 10⁻³ lbf (67 mN) | 22.3 Ksi (109 MPa) | 7% |
| HM carbon fibers (HS40) | 12 × 10⁻³ lbf (53 mN) | 15.8 Ksi (154 MPa) | 10% |

Microstructural Modeling

Two approaches were envisioned for the modeling effort, both within the framework of computational micromechanics. In the first approach, a representative volume element (RVE) of the composite material microstructure is used for prediction of ply-scale strength and constitutive properties of the unidirectional ply material based on volumetric homogenization. In the second approach, an embedded cell model is used to simulate crack progression within a confined region in which the full details of the microstructure are resolved, while the remaining ply material is represented using ply-scale homogenized properties. RVE modeling uses periodic boundary conditions to eliminate border effects and provide with the best approximation of the homogenized strength and constitutive properties. In the embedded cell model, the interaction between the fracture process at the micro-scale and the global response at the coupon-scale is captured, and the load-displacement curve can be used for determination of ply-level toughness properties.

Figure 31:
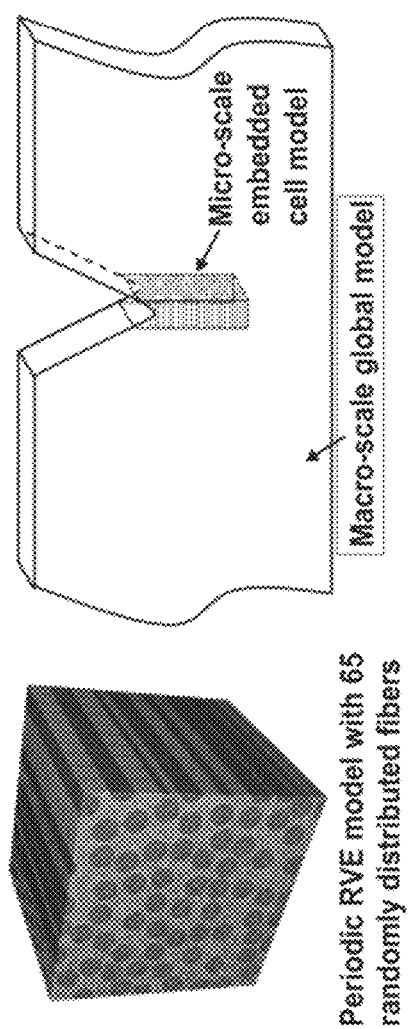
FIG. 31. A Periodic RVE model with 65 randomly distributed fibers (left) and embedded cell model concept for simulation of fiber-direction failure in a notched test specimen (right).

FIG. 31 shows an example of periodic RVE finite element model with 65 randomly distributed fibers and an embedded cell model concept for simulation of progression of fiber-direction compressive failure in the notched test specimen described above.

Both the RVE and embedded cell approaches rely on the discrete representation of the fibers, the surrounding matrix and the fiber-matrix interface. Accordingly, model inputs can be classified in four categories: 1) Matrix constitutive properties, 2) Single fiber properties, 3) Interface cohesive properties, and 4) Geometry of the microstructure.

The preliminary modeling efforts include RVE analysis with integration of CT data for recovery of the macro-scale nonlinear shear properties and a sensitivity study on the effects of input parameters on the fiber-direction compressive strength using RVE models subjected to compressive loading.

Nonlinear Shear Behavior

Figure 32:
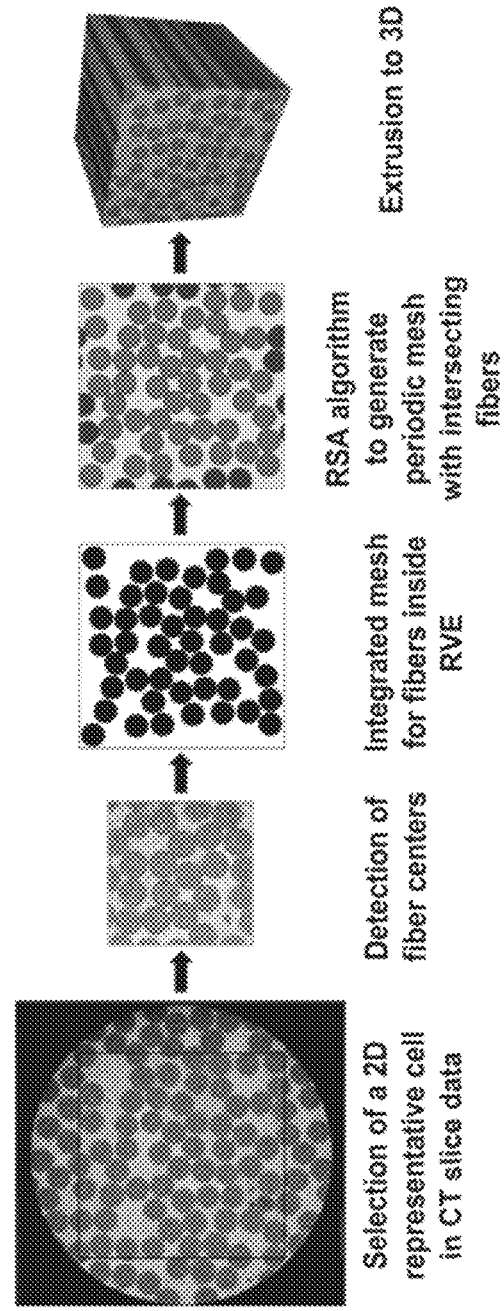
FIG. 32. Transfer of CT information in a periodic RVE mesh for micromechanical FEM analysis.

A high-fidelity RVE model representative of the material fiber distribution is used for recovery of the nonlinear shear stress-strain response of the unidirectional composite material. The RVE is generated from transfer of the CT data obtained at the nano-CT facilities (FIG. 25 and FIG. 26). FIG. 32 illustrates the process of transferring of the CT information into a periodic RVE mesh for micromechanical FEM analysis.

First, a rectangular region of interest is selected in a 2D CT slice image. The locations of fibers centers in the selected region of interest is then automatically extracted using segmentation software. This information is used to generate a 2D segmented mesh for all the fibers entirely contained within the representative cell. The fiber volume fraction in the RVE mesh is typically lower than the material fiber fraction because intersecting fibers have not been accounted for. In the next step, a random search algorithm (RSA) is used to add intersecting fibers such as a geometrically periodic mesh with the desired fiber volume fraction is generated. Finally, the 2D periodic RVE mesh might be extruded into a 3D periodic RVE.

The 2D RVE model is used for recovery of the shear stress-strain curve in the 2-3 material plane using micromechanical FEM analysis.

The matrix material is represented as an isotropic material with a Drucker-Prager damage-plasticity model similar to the model used in Ref. [10]. The fiber material is modeled using linear-elastic orthotropic constitutive properties. The cohesive behavior of the fiber-matrix interface is implemented using a bilinear traction-separation law and Abaqus cohesive contact model. Periodic boundary conditions are imposed on the faces of the RVE through dummy nodes for direct application of macroscopic strains.

Figure 33:
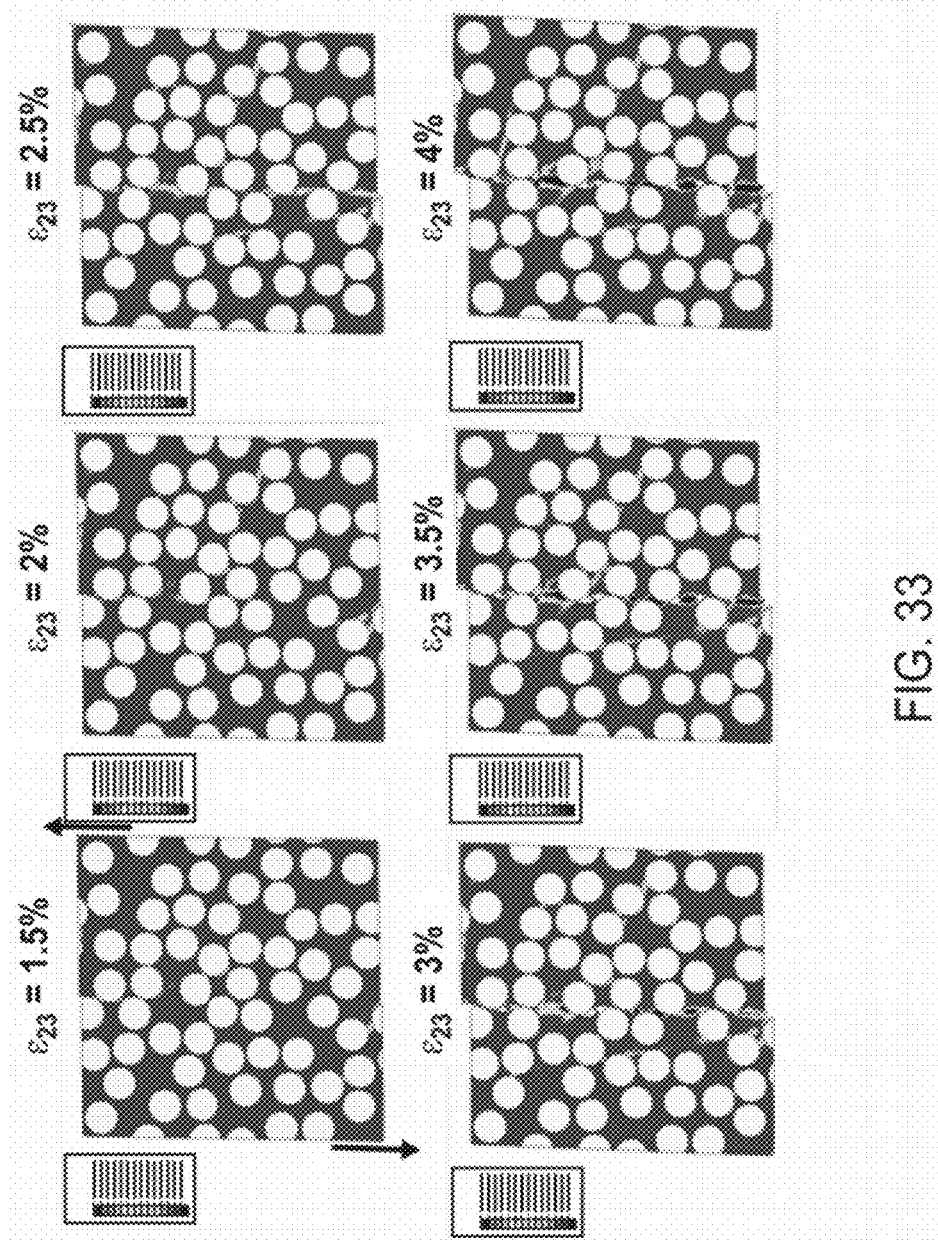
FIG. 33. Deformed shape and contour plots of the plastic strain in the RVE model subjected to 2-3 macroscopic shear strain loading.

FIG. 33 shows the evolution of the deformed shape and contour plots of the local plastic strain in the RVE model subjected to 2-3 plane macroscopic shear strain loading. Interfacial shear debondings and formation of plasticity shear bands in the confined matrix regions between fibers are observed.

Figure 34:
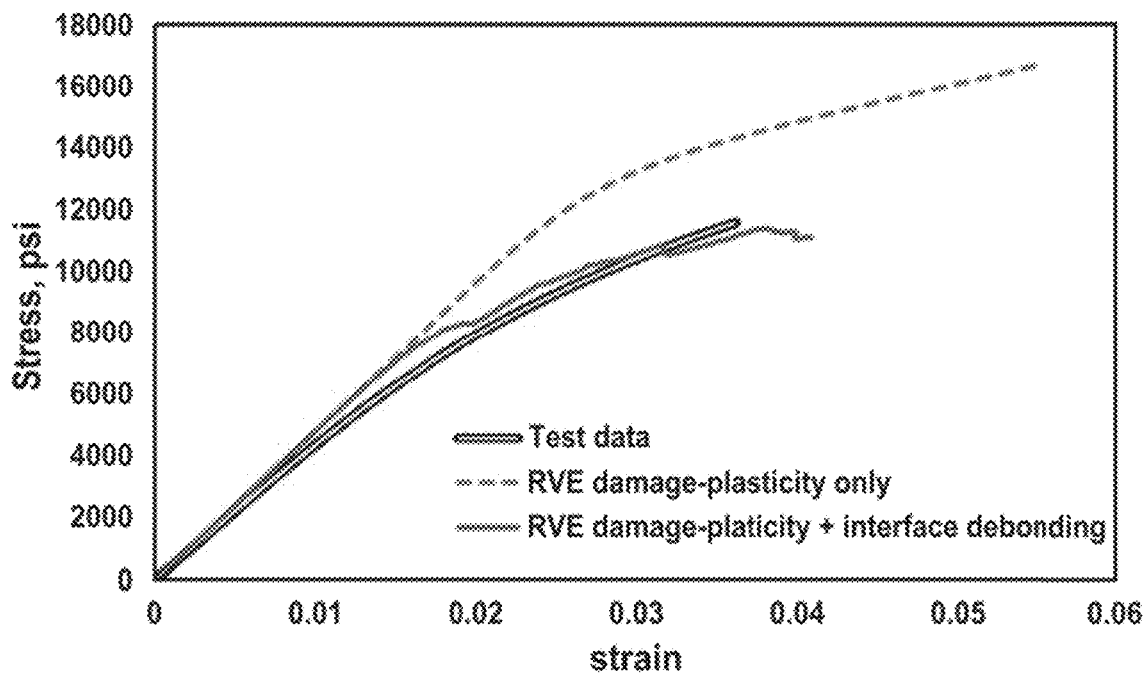
FIG. 34. Homogenized 2-3 shear stress-strain curves obtained from RVE analysis and comparison with test data for IM7/8552 carbon/epoxy composite material.

The shear stress-strain curves obtained from homogenization of the RVE results are shown in FIG. 34 and compared with test data for IM7/8552 carbon/epoxy material. IM7/8552 input properties for the RVE model are taken from the literature [8] and the nonlinear shear stress-strain curve obtained from small-plate twist testing in Ref. [9] is used as test data reference. Numerical results in FIG. 34 are provided for a RVE model using perfectly bonded interface and damage-plasticity only and for a RVE with damage-plasticity combined with interface cohesive damage.

As illustrated in FIG. 34, both the matrix plasticity and interface debonding process contribute to the macro-scale nonlinear shear behavior. The inclusion of interfacial cohesive damage in the model allows better correlation with test data.

Fiber-Direction Compressive Strength

Figure 35:
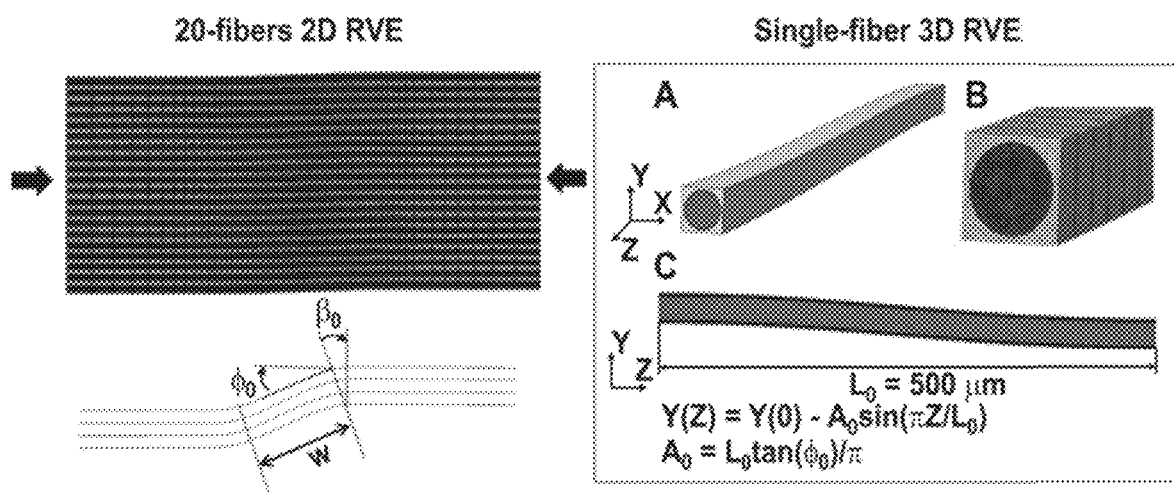
FIG. 35. 20-fiber 2D RVE FE model (left) and single-fiber 3D RVE model (right).

FIG. 35 shows an example of a 20-fiber 2D RVE FE model and a single-fiber 3D RVE used for prediction of the composite material fiber-direction compressive strength. Both the 2D and 3D models include a simplified representation of the initial fiber misalignment, as illustrated.

Figure 36:
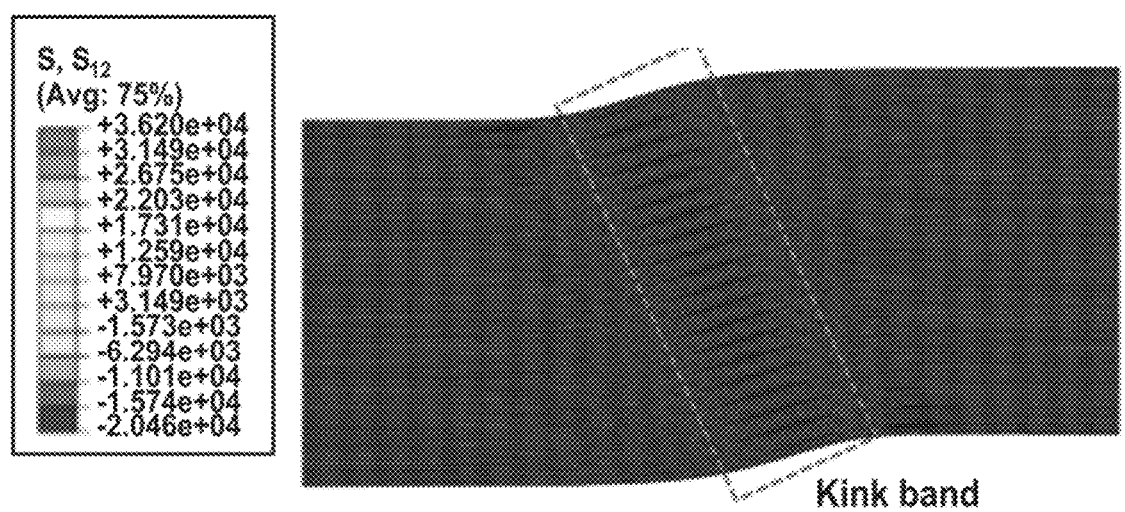
FIG. 36. Example of kink-band formation in the 2D RVE model.
Figure 37A:
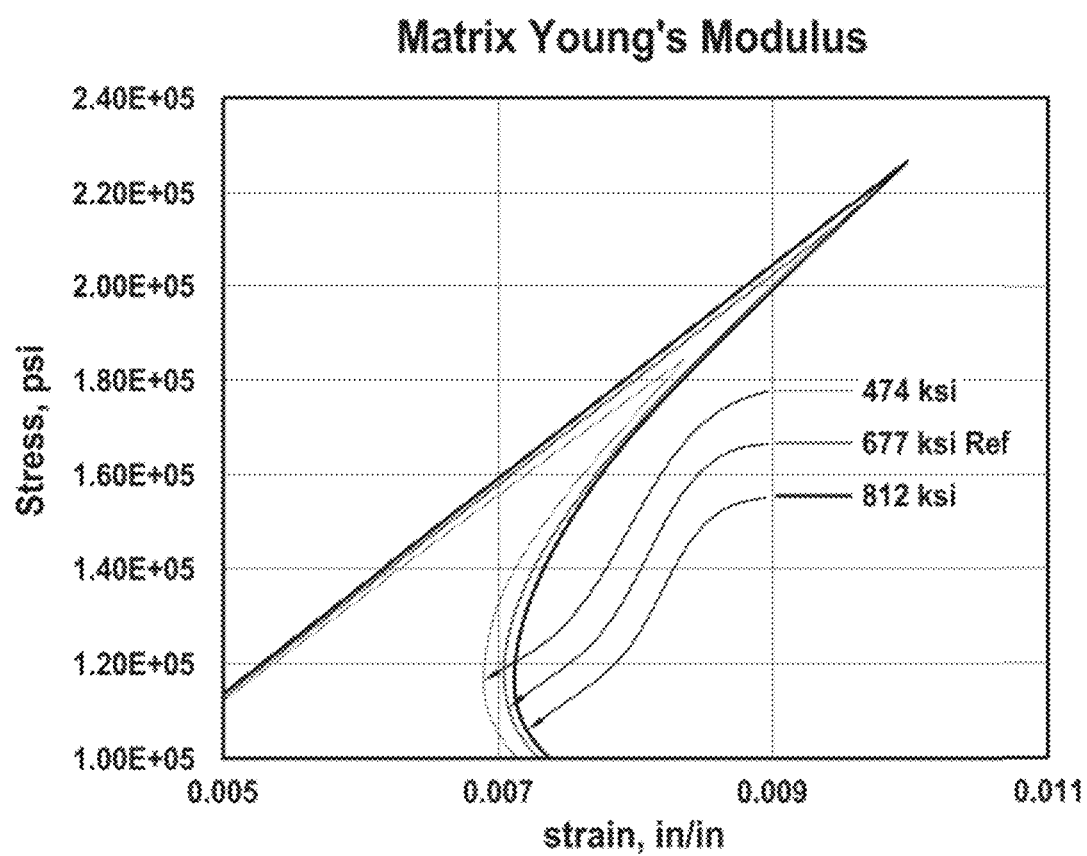
FIG. 37A-FIG. 37D. Fiber-direction compressive stress-strain curves obtained from RVE analysis and sensitivity to four critical input parameters.
Figure 37B:
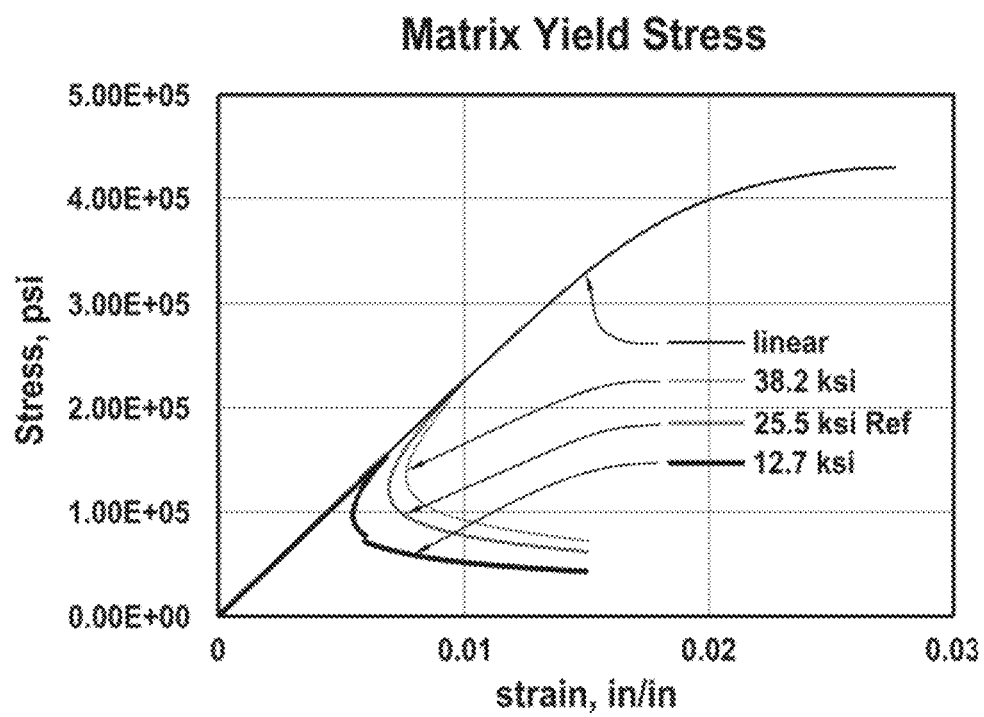
Figure 37C:
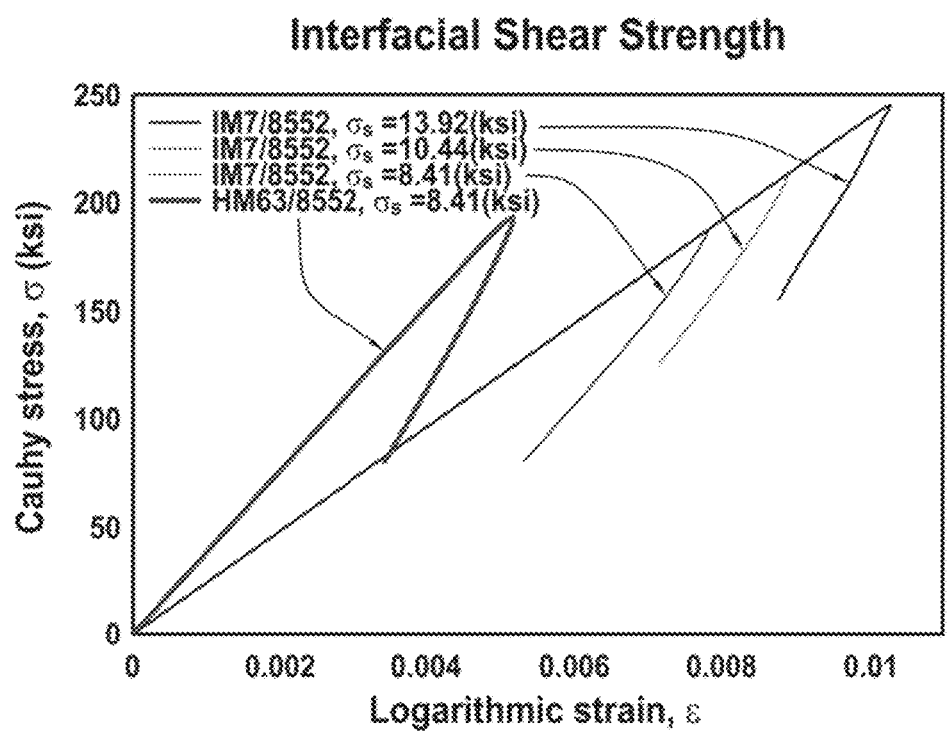
Figure 37D:
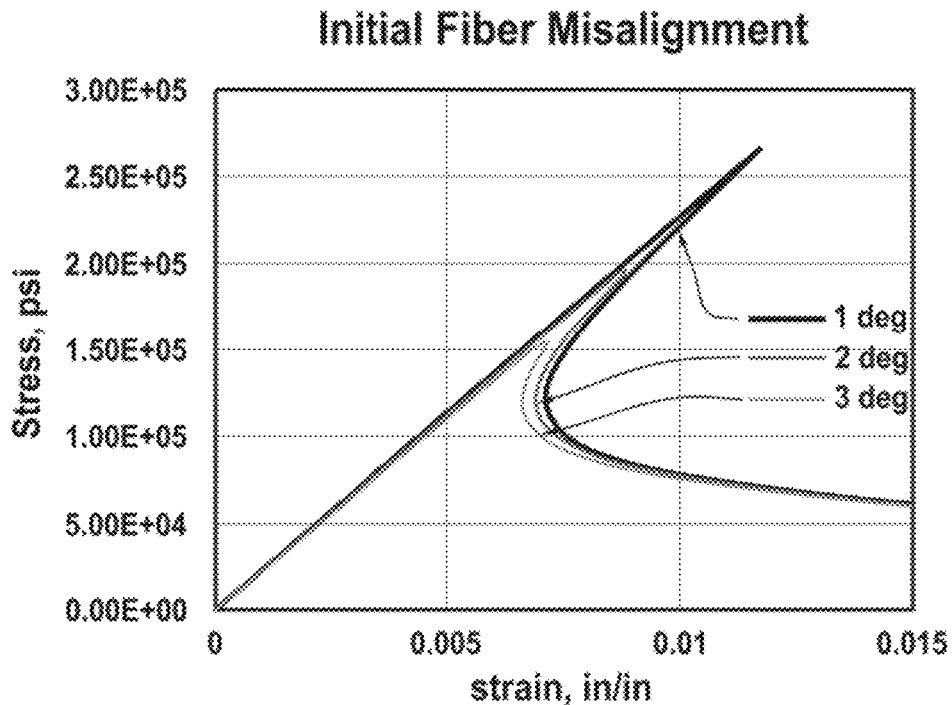

Upon compressive loading, shear stresses develop in the region of fiber misalignment resulting in local rotation of the fibers and further increase in shear stresses. Further increase in compressive loading leads to matrix shear yielding and/or interfacial debonding and the formation of a "kink band", as illustrated in FIG. 36 for the 2D RVE model.

As the kink band reaches a critical size, an instability occurs due to the absence of lateral support for the fibers. The instability may be associated with the release of the strain energy accumulated in the fibers and exhibit a "snap-back" behavior. To capture such instability and obtain the post-buckling response, the FE analysis is carried out in Abaqus/Standard using the Riks method. The macro-scale compressive longitudinal stress-strain is obtained from RVE homogenization and used for identification of critical input parameters.

In particular, FIG. 37A-FIG. 37D shows the stress-strain curves and sensitivity to four critical input parameters, which are the matrix Young's modulus, the matrix yield shear stress, the interfacial shear strength, and the initial fiber misalignment.

Concluding Remarks

This work presented a brief overview of the development of microstructural methods for developing high-performance composite materials. Currents status of the microstructural methods has been placed in the perspective of advancing the following three elements and their effective integration: First, high-resolution NDI and microstructural diagnostics enabled accurate 3D measurement of material microstructure including manufacturing irregularities with automated transition to microstructural models. Second, in-situ methods, driven by SEM and CT data captured essential material properties to meet the input data requirements for comprehensive material strength microstructural models. Third, the physical observations and material properties were combined in a computational analysis to capture the failure modes governing compressive strength material behavior.

The major focus of this work has been understanding and improving fiber-direction compressive strength of HM CFRPs. Kink-band formation in HM CFRPs was observed for the first time. Demonstrating the evidence of the fiber-direction compressive failure governed by microstructural stability has been a major prerequisite to developing a rigorous modeling strategy. In addition, this work addressed some of the major challenges in developing models capturing the microstructural stability governing fiber-direction compression strength such as meeting their input data requirements. Methods have been advanced to generate such data based on high-resolution X-ray Computed Tomography (CT) measuring material topology including fiber misalignment; and through in-situ Scanning Electron Microscopy (SEM) measuring the essential microstructural material properties, including fiber-to-matrix interface shear strength which has a major effect on fiber-direction compressive strength.

Microstructural modeling was also discussed. Such models were used in the sensitivity studies to identify the key material properties to be characterized. With the increased model fidelity, confidence can be increased for relying on analysis in explaining the effect of the material composition on the compressive strength behavior. This can expand the material design options and reduce time-consuming and costly experimental iterations. Verification has been always very difficult for the microstructural models due to the challenges associated with bridging the scales to a meaningful experiment directly verifying the model, without ad hoc assumptions. The thin notched FPB specimens gave a chance to predict the material fiber-direction compressive strength behavior using a microstructural model directly embedded into a larger scale model of the FPB test specimen.

The experimental and modeling efforts allow for additional flexibility accelerating the development of high-performing materials enabling lightweight aircraft structures. Accordingly, the integrated structural methods and prognostics capabilities developed herein are being expanded into the microstructural world to allow for the development of new material systems.

REFERENCES

[1] B. W. Rosen, "in Fiber Composite Materials," in Mechanics of Composite Strengthening, 1965, pp. 37-75.

[2] A. M. Waas and C. R. Schultheisz, "Compressive failure of composites, part II: Experimental studies," Progress in Aerospace Sciences, vol. 32, no. 1, pp. 43-78, 1996.

[3] F. Naya, M. Herráez, C. S. Lopes, C. González, S. Van der Veen and F. Pons, "Computational micromechanics of fiber kinking in unidirectional FRP under different environmental conditions," Composites Science and Technology, vol. 144, pp. 26-35, 2017.

[4] Q. Sun, H. Guo, G. Zhou, Z. Meng, Z. Chen, H. Kang, S. Keten and X. Su, "Experimental and computational analysis of failure mechanisms in unidirectional carbon fiber reinforced polymer laminates under longitudinal compression loading," Composite Structures, vol. 203, pp. 335-348, 2018.

[5] A. Makeev, S. Ghaffari and G. Seon, "Improving compressive strength of high modulus carbon-fiber reinforced polymeric composites through fiber hybridization," International Journal of Engineering Science, vol. 142, pp. 145-157, 2019.

[6] A. Makeev, C. E. Bakis, E. Strauch, M. Chris, P. Holemans, G. Miller, D. Nguy and N. Patz, "Advanced composite materials technology for rotorcraft through the use of nanoadditives," Journal of the American Helicopter Society, vol. 60, no. 3, 2015.

[7] S. Ghaffari, A. Makeev, D. Kuksenko and G. Seon, "Understanding High-Modulus CFRP Compressive Strength Improvement," in ASC 34th Technical Conference, Atlanta, 2019.

[8] A. Makeev and Y. Nikishkov, "Fatigue life assessment for composite structures," in 26th ICAF Symposium, Montréal, June 2011.

[9] G. Seon, Y. Nikishkov and A. Makeev, "Structures Perspective for Strength and Fatigue Prognosis in Composites with Manufacturing Irregularities," Journal of the American Helicopter Society, vol. 60, no. 1, pp. 1-10, 2015.

[10] A. Makeev, G. Seon, Y. Nikishkov, D. Nguyen, P. Mathews and M. Robeson, "Analysis Methods Improving Confidence in Material Qualification for Laminated Composites," Journal of the American Helicopter Society, vol. 64, no. 1, pp. 1-13, 2019.

[11] G. Seon, Y. Nikishkov, A. Makeev and B. Shonkwiler, "Mesh Morphing Methodology for Strength Predictions in Composites, Composite Structures," Composite Structures, vol. 140, p. 612-620, 2016.

[12] C. R. Schultheisz and A. M. Waas, "Compressive failure of composites, part I: testing and micromechanical theories," Progress Aerospace Science, vol. 32, 1996.

[13] N. Fleck, "Compressive failure of fiber composites," Advances in applied mechanics, vol. 33, pp. 43-117, 1997.

[14] N. F. Dow and B. W. Rosen, "Evaluations of filament-reinforced composites for aerospace structural application," NASA CR-207, 1965.

[15] B. Budiansky and N. A. Fleck, "Compressive failure of fibre composites," Journal of the Mechanics and Physics of Solids, vol. 41, no. 1, pp. 183-211, 1993.

[16] C. Soutis and N. A. Fleck, "Static Compression Failure of Carbon Fibre T800/924C Composite Plate with a Single Hole," Journal of Composite Materials, vol. 24, no. 5, p. 536-558, 1990.

[17] A. S. ARGON, "Fracture of Composites," Treatise on Materials Science & Technology, vol. 1, pp. 79-114, 1972.

[18] Y. Wang, C. Soutis and P. J. Withers, "X-RAY MICROTOMOGRAPHIC IMAGING OF KINK BANDS IN CARBON FIBRE-EPOXY COMPOSITES," in 16TH EUROPEAN CONFERENCE ON COMPOSITE MATERIALS, Seville, Spain, 2014.

[19] J. Hapke, F. Gehrig, N. Huber, K. Schulte and E. T. Lilleodden, "Compressive failure of UD-CFRP containing void defects: In situ SEM microanalysis," Composites Science and Technology, vol. 71, no. 9, pp. 1242-1249, 2011.

[20] S. Sivashanker, N. A. Fleck and M. P. F. Sutcliffe, "Microbuckle propagation in a unidirectional carbon fibre-epoxy matrix composite," Acta Materialia, vol. 44, no. 7, pp. 2581-2590, 1996.

[21] M. F. Sutcliffe and N. A. Fleck, "Microbuckle propagation in carbon fibre-epoxy composites," Acta metallurgica et materialia, vol. 42, no. 7, pp. 2219-2231, 1994.

[22] M. J. Laffan, S. T. Pinho, P. Robinson, L. Iannucci and A. J. McMillan, "Measurement of the fracture toughness associated with the longitudinal fibre compressive failure mode of laminated composites," Composites: Part A, vol. 43, no. 11, pp. 1930-1938, 2012.

[23] F. V. 3. datasheet, "product data," FEI.

[24] D. B. Marshall, "An Indentation Method for Measuring Matrix-Fiber Frictional Stresses in Ceramic Composites," The American Ceramic Society, vol. 67, no. 12, pp. 259-C-260, 1984.

[25] F. Naya, J. Molina-Aldareguia, C. Lopes, C. Gonzalez and J. LLorca, "Interface Characterization in Fiber-Reinforced Polymer-Matrix Composites," The minerals, Metals & Materials Society, 2016.

[26] L. P. Canal, C. Gonzalez, J. Segurado and J. Llorca, "Intraply fracture of fiber-reinforced composites: Microscopic mechanisms and modeling," Composites Science and Technology, pp. 1223-1232, 2012.

[27] R. J. Kerans and T. A. Parthasarathy, "Theoretical Analysis of the Fiber Pullout and Pushout Tests," Journal Of the American Ceramic Society, 1991.

[28] X. Zhou, H. Wagner and S. Nutt, "Interfacial Properties of polymer composites measured by push-out fragmentation test," Composites: Part A, pp. 1543-1551, 2001.

Example 3

Abstract

Low fiber-direction compressive strength of high-modulus (HM) carbon fiber-reinforced polymers (CFRPs) has been their major weakness prohibiting implementation of such materials in aircraft primary structures despite improving mechanical stiffness at a lower weight. A HM CFRP achieving fiber-direction compressive strength of legacy intermediate-modulus (IM) CFRPs but with more than 30% higher axial modulus has been recently developed. Fiber-matrix interface shear strength is investigated herein as a potential mechanism driving the compression strength improvement of this hybrid material system. In-situ scanning electron microscopy (SEM) based single fiber push-out experiments addressing standing challenges associated with manufacturing high-quality samples as well as distinguishing same-diameter HM and IM carbon fibers in the hybrid composite system are used to measure fiber-matrix interface shear strength. The experiments show approximately 30% lower average values of the fiber-matrix interface shear strength for the HM carbon fibers compared to the IM carbon fibers in the hybrid material system. Such a strong reduction corresponds to a 22% lower fiber-direction compressive strength of the HM CFRP without the integrated IM fibers. The results support the idea of integrating off-the-shelf IM carbon fibers with a stronger fiber-matrix interface and a higher shear modulus into HM CFRPs to improve compressive strength.

Introduction

Figure 38:
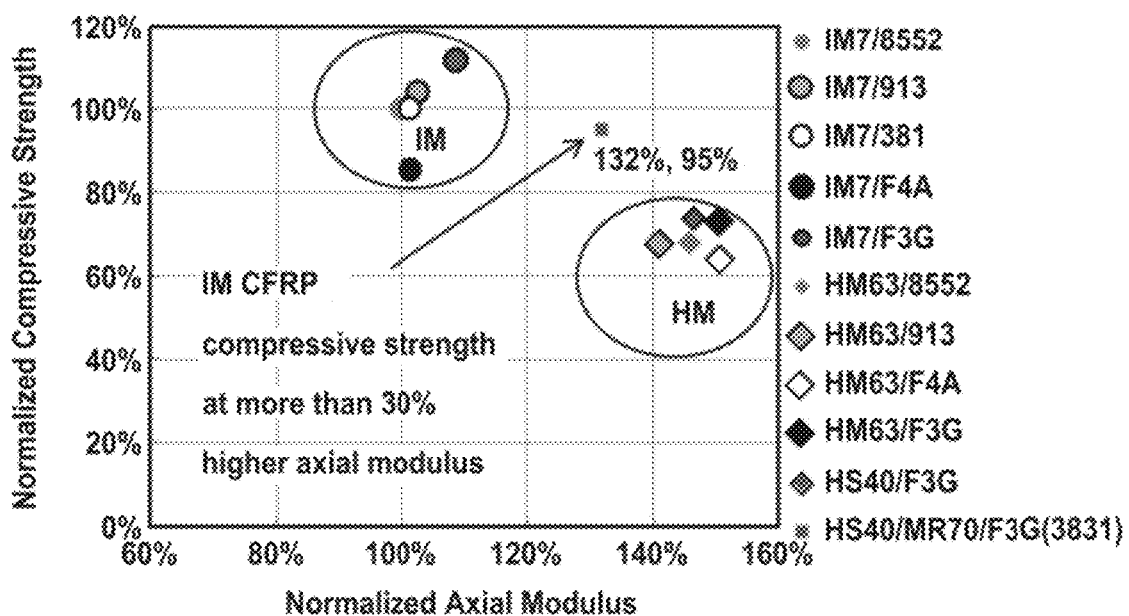
FIG. 38. Axial modulus and fiber-direction compressive strength of HM and IM carbon fiber-reinforced epoxy-matrix tape composites.

Low fiber-direction compressive strength of high-modulus (HM) carbon-fiber composites has been their major weakness prohibiting implementation of such materials in aircraft primary structures despite a strong demand in such materials to reduce structural weight. Driven by the industry demands for developing a continuous HM CFRP with fiber-direction compressive strength approaching that of intermediate-modulus (IM) carbon legacy composites at 30% (or greater) higher Young's modulus, Makeev et al. [29] demonstrated that significant improvement in the fiber-direction compressive strength of HM carbon-fiber composites can be achieved by hybridizing intermediate-modulus (IM) and HM carbon fibers in HM carbon fiber-reinforced polymer (CFRP) toughened with nano-silica. In particular, a HM material solution achieving fiber-direction compressive strength of IM legacy composites but with more than 30% higher axial modulus has been developed [29]. FIG. 38 compares axial modulus and fiber-direction compressive strength of the hybrid HM CFRP with various HM and IM carbon fiber-reinforced epoxy-matrix tape composites.

The hybrid material system is denoted as HS40/MR70/F3G(3831) in FIG. 38. This prepreg composite had Mitsubishi HS40 and MR70 fibers hybridized at 50/50 ratio; and Patz Materials and Technologies (PMT) F3G 250° F. curing epoxy resin toughened with Nanosilica (40% Nanosilica by resin weight). F3G is equivalent to 3M 3831 Nanosilica-toughened epoxy. The resin content was approximately 35% by weight (60% fiber volume fraction) [29]. HS40 is a 12K-filament-count-tow 66 Msi (455 GPa) modulus HM carbon fiber; and MR70 is a 12K-filament-count-tow 47 Msi (324 GPa) modulus IM carbon fiber [29]. In addition, FIG. 38 lists tape composites with Hexcel IM7 12K-filament-count-tow IM carbon fibers and HM63 12K-filament-count-tow HM carbon fibers. The resin systems include Hexcel 8552-350° F. curing toughened legacy epoxy; Hexcel 913, Solvay 381-250° F. curing toughened legacy epoxies; and PMT F4A-250° F. curing untoughened low viscosity epoxy that forms F3G after Nanosilica dispersion. All CFRPs listed in FIG. 38 had similar fiber volume fraction [29].

The material performance in FIG. 38 has been normalized to Hexcel IM7/8552—a benchmark 350° F. curing prepreg tape composite material system for aircraft structures. All HM carbon fibers, as well as IM carbon fibers considered in Ref. [29] are Polyacrylonitrile-based or PAN-based. Accordingly, fiber-direction compressive strength of PAN-based continuous carbon fiber-reinforced polymeric tape composites is presumably governed by microstructural stability, unlike that of pitch-based HM carbon fibers exhibiting longitudinal splitting failure mode [30]. References [31-45] demonstrate fiber microbuckling (kink-band formation) for IM CFRPs; and Ref. [46] for PAN-based HM CFRPs.

Perhaps the first question to answer is, what major property may be responsible for the fiber-direction compression strength reduction of the HM CFRPs compared to their IM counterparts? Fiber-matrix interface strength has been among strong candidates. Experimental investigations [47] and analytical microbuckling models [48, 49] of IM CFRPs, as well as micromechanics numerical analyses [50, 51] indicate sensitivity of the fiber-direction compressive strength to fiber-matrix interface shear strength. Also, interlaminar shear strength (ILSS) results generated from macro-scale shear tests reported in Ref. [51] show almost 20% ILSS reduction for HM63/8552 (HM CFRP) compared to IM7/8552 (IM CFRP). A similar reduction was observed by Totry et al. [52] who compared the in-plane shear strength of T700S/MTM57 (IM) and M40J/MTM57 (HM) carbon/epoxy composites obtained using American Society for Testing and Materials (ASTM) standard D7078 V-notched tests and used micromechanics-based numerical models in a sensitivity study to show that the shear strength reduction could potentially be attributed to a weaker fiber-matrix interface in the HM material. However, fiber-matrix interface strength has not been directly measured.

If the weak fiber-matrix interface is indeed responsible for low fiber-direction compressive strength of HM CFRPs, one can look into improving the interface strength, which might be challenging. However, if off-the-shelf IM fiber-matrix interfaces are stronger in shear and such fibers have higher shear modulus compared to HM fibers, a viable solution could be integrating off-the-shelf IM carbon fibers into a HM carbon-fiber composite in order to offload the HM fibers and thus improve shear microbuckling driven fiber-direction compressive strength of the HM composite system. HM carbon fibers have approximately 10% to 15% lower shear modulus compared to IM carbon fibers [51, 53].

Figures 39A, 39B, 39C:
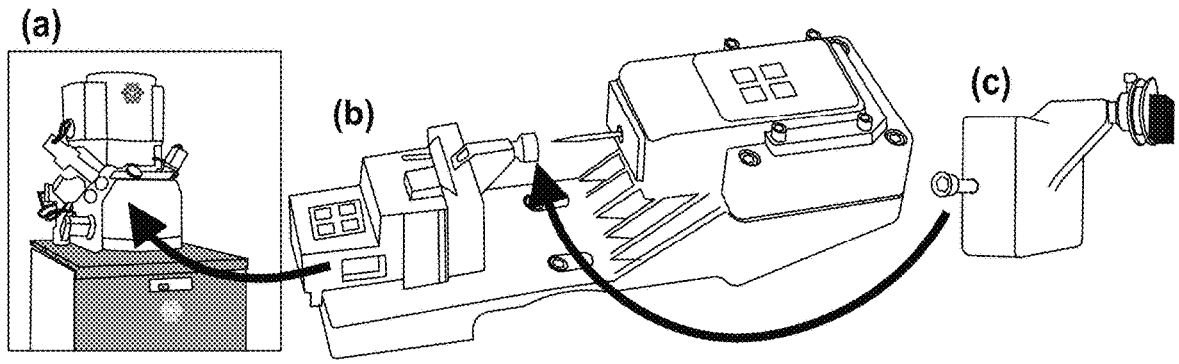
FIG. 39a-FIG. 39c.

The fiber-matrix interface strength is investigated herein as a potential mechanism driving the compression strength improvement of the hybrid material system. In-situ scanning electron microscopy (SEM) based experiments can measure fiber-matrix interface shear strength of the HM and IM carbon fiber ingredients of the high-performing hybrid material system. A micromechanical load frame integrated with SEM can capture fiber-matrix interface strength behavior. FIG. 39a-FIG. 39c shows the instrumentation used herein.

In-Situ SEM Experiments to Measure Fiber-Matrix Interface Shear Strength

Figure 40:
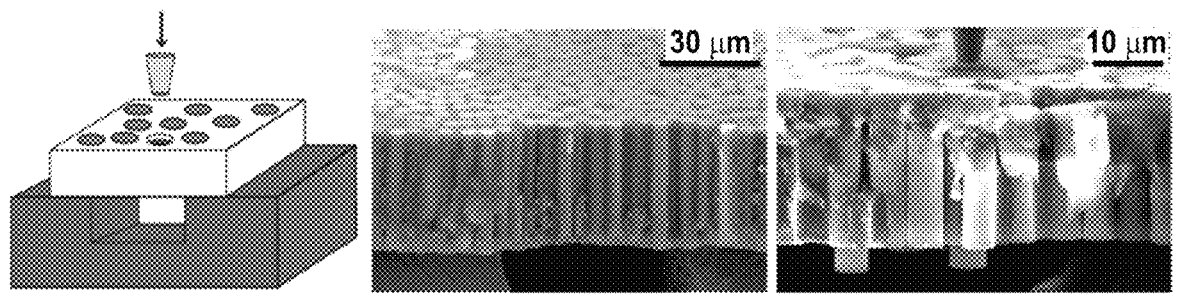
FIG. 40. Left to right, schematic of a carbon fiber push-out sample and SEM images of the sample before and after the test. Fiber diameter approximately 5 µm.

There are currently no standard test methods available to characterize fiber-matrix interface mechanical behavior. However, a number of different experimental techniques, including fragmentation tests [54-56], fiber pull-out tests [57], fiber push-in tests [58, 59], and fiber push-out tests [60, 61] have been developed. Among such methods, fiber push-out has been the most widely used in the in-situ characterization of interfaces in composites [62]. The advantage of the fiber push-out compared to the other methods is the relative simplicity of the testing process, in addition to the capability of making more direct measurement of the interface strength [63]. However, specimen fabrication for the fiber push-out experiment has been challenging [62]. The specimen must be thin enough to allow decohesion over the entire fiber-matrix interface and ensure complete push out of the fibers [55, 61, 62, 64, 65]. Following historical methods to obtain the thin specimens, a slice perpendicular to the fibers is cut from the composite panel which is further thinned by lapping and polishing up to the thickness of 20-60 µm. Then the specimen is mounted on a fixture, as shown in FIG. 40.

Figure 41:
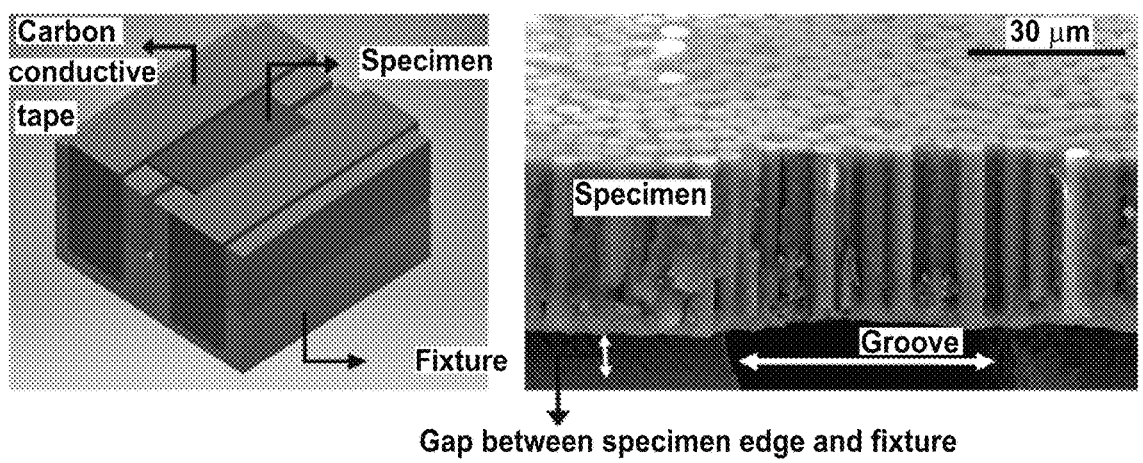
FIG. 41. SEM image of a fiber push-out specimen prepared via a polishing process. A gap between the specimen edge and the fixture is evident despite taping down/adhesively bonding the specimen to the fixture.

Preparing such thin samples has been challenging as they tend to fracture during polishing, and it is very difficult to achieve uniform thickness. Furthermore, the samples are typically not perfectly flat especially at the edges, and they are not in full contact with the fixture before the test, as shown in FIG. 40 and FIG. 41, creating compliance artifacts [66].

To address these challenges and improve the consistency of the samples, sample machining by femtosecond (fs) laser ablation was investigated to create high-quality membranes for the fiber push-out tests. When a laser beam hits the surface of the sample, part of the beam will be absorbed by material which potentially leads to heat generation and material removal by various mechanisms including melting, vaporizing, etc. [67]. A major challenge in material laser processing is reduction or elimination of the heat affected zone (HAZ). The extent of HAZ depends in part upon the laser-material interaction time. Ultra-short pulse lasers, such as fs-lasers, interact with materials over very short time scales, thereby changing the dominant material removal mechanism from a thermal process (i.e. evaporation) to an athermal one (ablation). Hence the laser energy can be used for directly removing (ablating) the target material with minimal collateral damage to surroundings. In other words, fs-laser machining reduces the heat diffusion into the adjacent material, resulting in high-quality machining with negligible HAZ or microstructural disruption [68-74].

Figure 42:
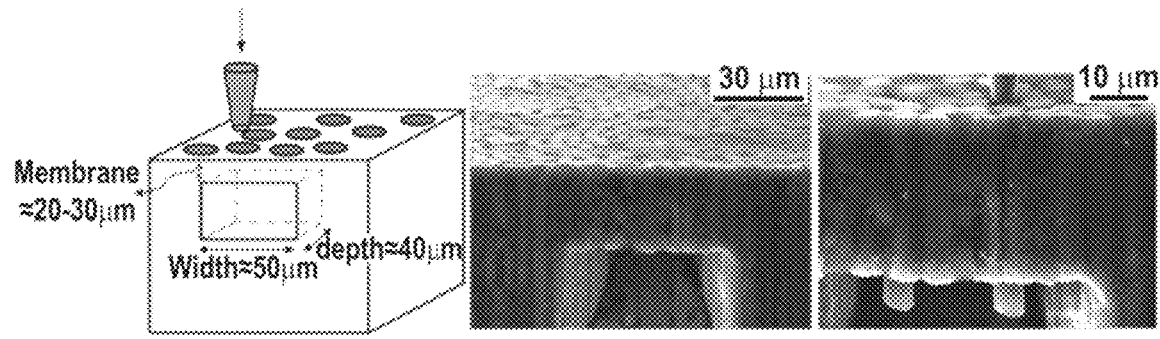
FIG. 42. Left to right, schematic of a fs-laser machined specimen, and SEM images of the specimen before and after test.
Figures 43A, 43B, 43C, 43D:
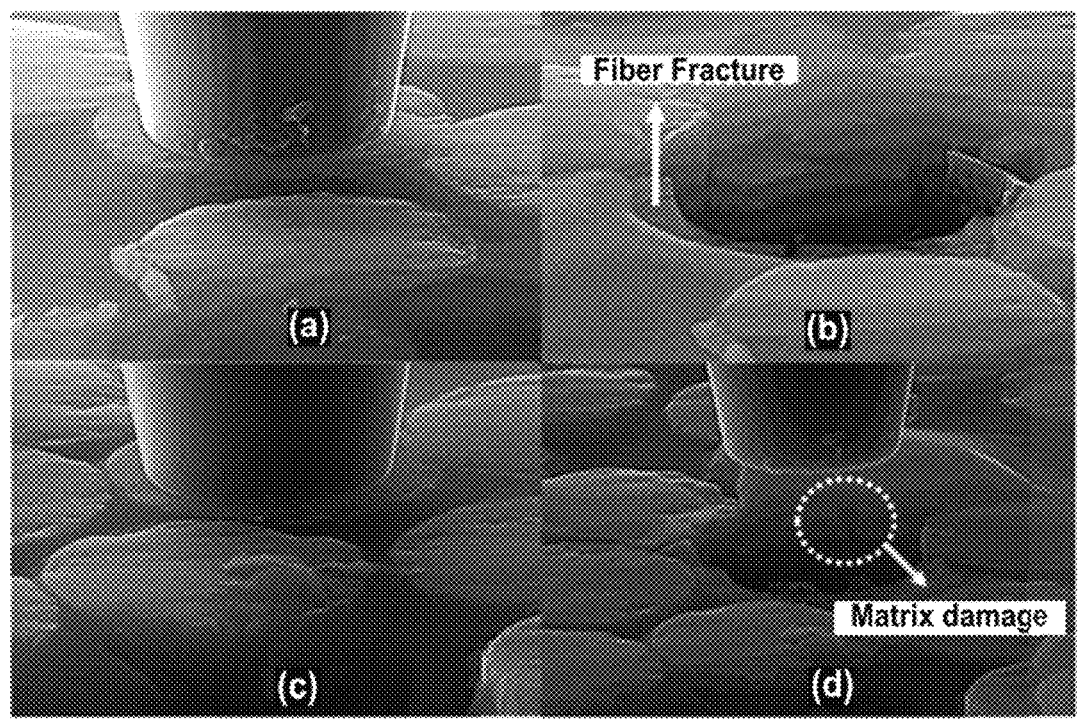
FIG. 43a-FIG. 43d. SEM images of carbon fiber push-out in approximately 40 µm thick membrane.
Figures 44A, 44B, 44C, 44D, 44E, 44F:
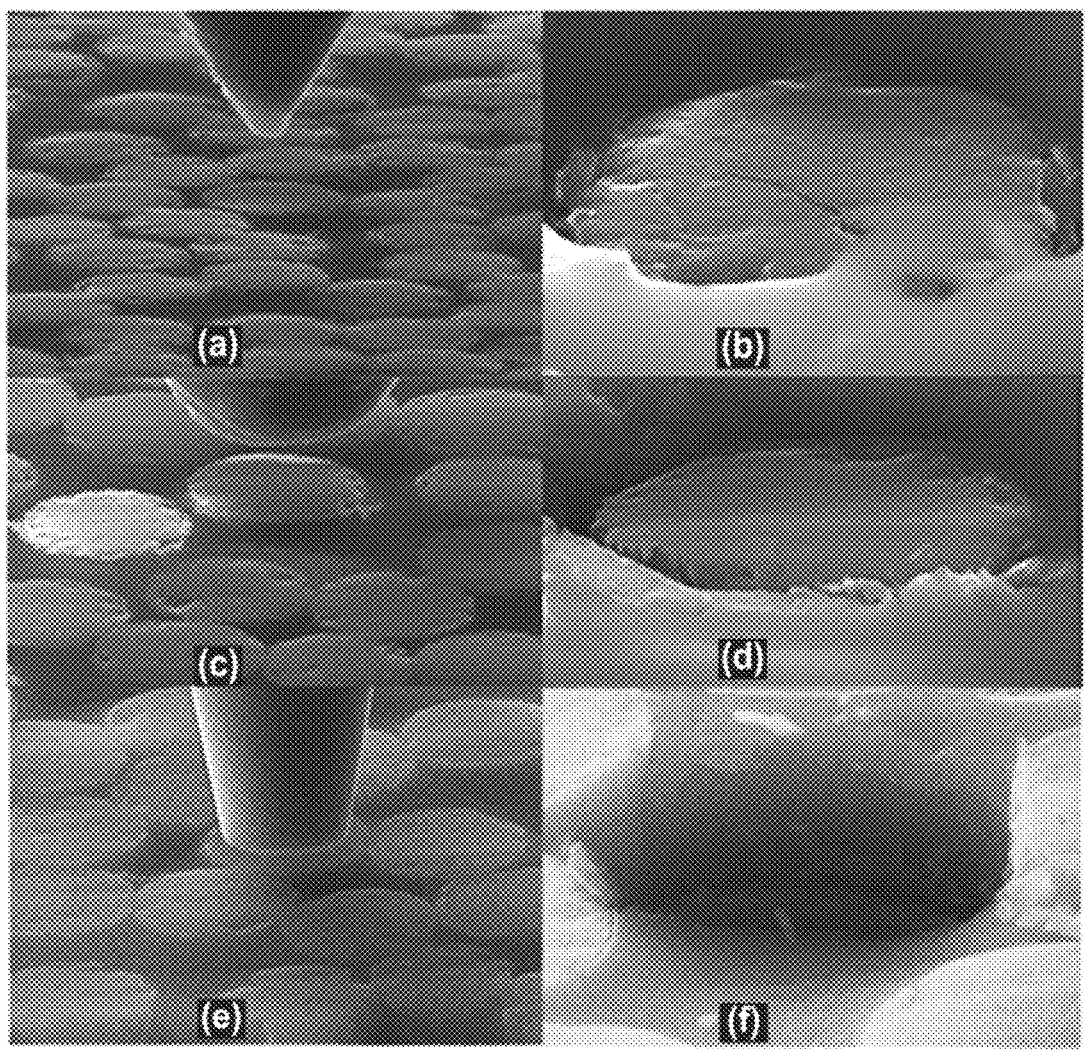
FIG. 44a-FIG. 44f. Fiber push-out experiments using indenters of different sizes.

Herein, fs-laser machining was used to prepare samples. After polishing the top surface of the specimen, perpendicular to the fibers, the fs-laser was used to remove material, creating a milled out section underneath the polished surface, with the intention of constructing a thin membrane with 20-30 μm thickness, 50 μm width, and cutting depth of 40 μm. This thin membrane forms a fiber push-out specimen as shown in FIG. 42.

Sample Preparation

The carbon fiber push-out samples were obtained by cutting about 6×6×6 mm pieces (FIG. 39c) from unidirectional CFRP panels by a precision low speed diamond saw. The cutting was followed by polishing the top surface of the samples perpendicular to the fibers with diamond papers of 15, 9, 3, and 1-μm grain size. Subsequently, fs-laser machining was performed using a custom laser machining apparatus.

The apparatus included a fs-laser source, focusing optics, and computer controlled micro-positioning stages. The fs-laser generator used was a chirped pulse amplifier Ti:sapphire laser emitting at 775 nm and a 1 kHz repetition rate. The laser was directed to the focusing optics through a series of mirrors and was passed through a 1 mm aperture, which transmitted ~5% of the laser intensity, to produce a well-defined laser spot. The laser was then focused using an infinity corrected microscope objective optimized for near infrared wavelengths. The resulting spot size was approximately 15 μm in diameter. Finally, 3 degrees-of-freedom (DOF) micro-positioning stages were used to execute the desired sample geometry. The micro-positioning stages provided better than 1 μm accuracy in the horizontal plane and 1.5 μm accuracy in the vertical direction. In conjunction with the focusing optics, features as small as 10 μm could be machined with this laser machining apparatus.

Using the fs-laser machining system, the samples were machined as follows. The specimen was mounted on the micro-positioning stages at a 10 degree pre-tilt. The pre-tilt was used to compensate for the taper inherent to the laser cuts such that the bottom surface of the membrane was parallel with the specimen surface. During machining, the laser was operated at 20-30 mW continuous power. As a result, each pulse delivered 1-20 to the sample surface; the resulting fluence was on the order of 1 J/cm². The laser was rastered along lines parallel to the sample edge; the lines were spaced 1 μm apart and covered an area 50 μm wide and 40 μm high. This area was located such that the resulting membrane had a final thickness of 20-30 μm. This process was repeated until the desired depth was achieved. After reaching the final depth, the last line closest to the edge was repeated until the taper was minimized. All laser machining was performed using a feed rate of 0.6 mm/s. As can be seen in FIG. 42, the cutting edges induced by femtosecond laser processing are very straight and smooth and there is no noticeable evidence of the thermal damage in the surroundings of membranes. The target membrane thickness was 20-30 μm. Based on test evidence, thicker membranes may entail multiple failure modes competing with the fiber-matrix interface shear decohesion, e.g. fiber fracture and matrix damage.

FIG. 43a-FIG. 43d shows examples of unintended failure modes in a 40 μm thick membrane. On the other hand, thickness below 20 μm result in excessive bending of the membrane in the current test configuration, creating additional challenges in the fiber-matrix interface shear strength assessment.

Failure mode is affected by the tip diameter. FIG. 44a-FIG. 44f shows that a 1 μm diameter tip entails fiber fracture and a 5 μm diameter tip naturally creates damage around a 5 μm diameter carbon fiber. A 4 μm diameter tip has been used herein and it provided the most consistent test data. In fact, all fiber push-out test data presented herein exhibited the same fiber-matrix shear decohesion failure mode based on SEM imaging.

Carbon Fiber Push-Out Test

Indentation (fiber push-out) tests on individual fibers were performed using a FEI Versa 3D SEM equipped with a Bruker PI-88 PicoIndenter micromechanical load frame (FIG. 39b). In-situ SEM enables the possibility of imaging in real time during the experiment. A sample was mounted on a PI-88 sample stage holder. Then, the load frame was placed inside the SEM and a cone-shape diamond indenter tip with a flat tip was brought into contact with the fiber upper surface. Fibers imaged on top of the membrane were selected at random to be pushed-out. All the tests were run under load control mode at rate of 1.67 mN/s up to a never-exceed load of 200 mN, followed by unloading to the initial position. The speed of the tests was slow enough to disregard any appreciable strain rate effects on the matrix, but fast enough to avoid thermal drift during the test. A spacing of more than one fiber between the pushed-out fibers has been maintained to avoid interference from previous tests. Real-time video was recorded from the SEM monitor during the experiments which aided further analysis. If the indenter tip was determined to be not centered on the fiber during the experiment resulting in load eccentricity, the data were rejected.

The indentation tests were performed until the fibers completely lost the load carrying capacity as they were pushed out of the specimen. During the test, the load and depth of indentation (displacement) were continuously recorded. Consequently, by measuring the maximum applied load $P_{max}$, fiber length (the thickness of the membrane) h, and fiber radius r, the (average) interface shear strength (IFSS) has been calculated according to Equation (1).

$$IFSS = \frac{P_{max}}{2\pi r h} \quad (1)$$

Materials

Figure 45:
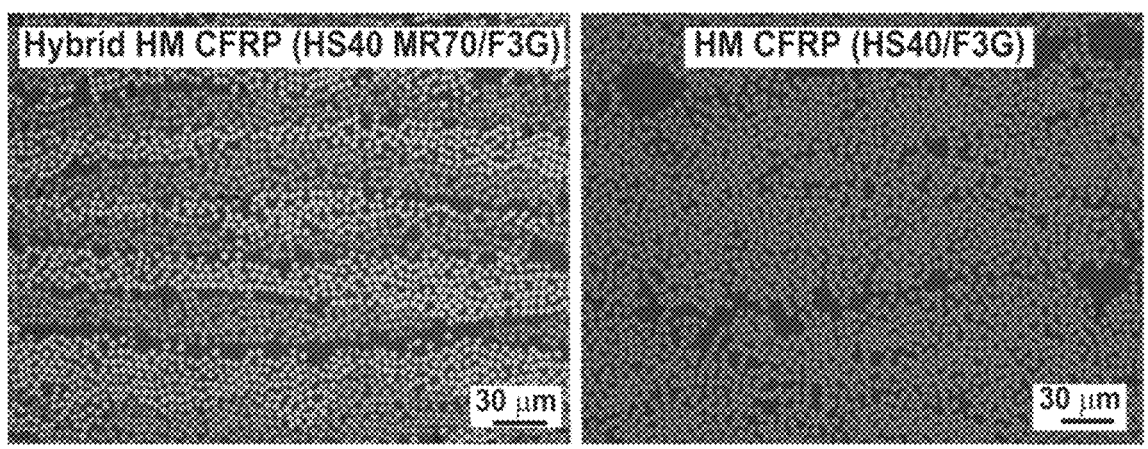
FIG. 45. Optical microscope observation of CFRP showing the carbon fibers uniformly distributed in the resin matrix.

The materials considered herein were (1) the hybrid HM CFRP (HS40 MR70/F3G) and (2) the corresponding HM CFRP (HS40/F3G). FIG. 45 shows optical micrographs of the polished membrane surfaces, perpendicular to the fibers, for both materials. The micrographs are obtained using a Keyence VHX-950F white light optical microscope at a 1,000× magnification. Remarkably, the light reflection/absorption difference results in dissimilar colors of the HM and IM fibers as evident in the micrographs. This observation has been useful for distinguishing the HM and IM fibers, as they are otherwise identical in diameter and the surface morphology; other means of differentiating the fibers, including computed tomography, did not work as the fibers had similar densities. Also, SEM imaging could not distinguish the HM and IM carbon fibers. Based on comparing the optical micrographs of the hybrid CFRP and the HM CFRP generated using the same light conditions, the darker color in the hybrid CFRP represents the HM fibers. Fiber push-out test results presented in the next section verify this.

Figure 46:
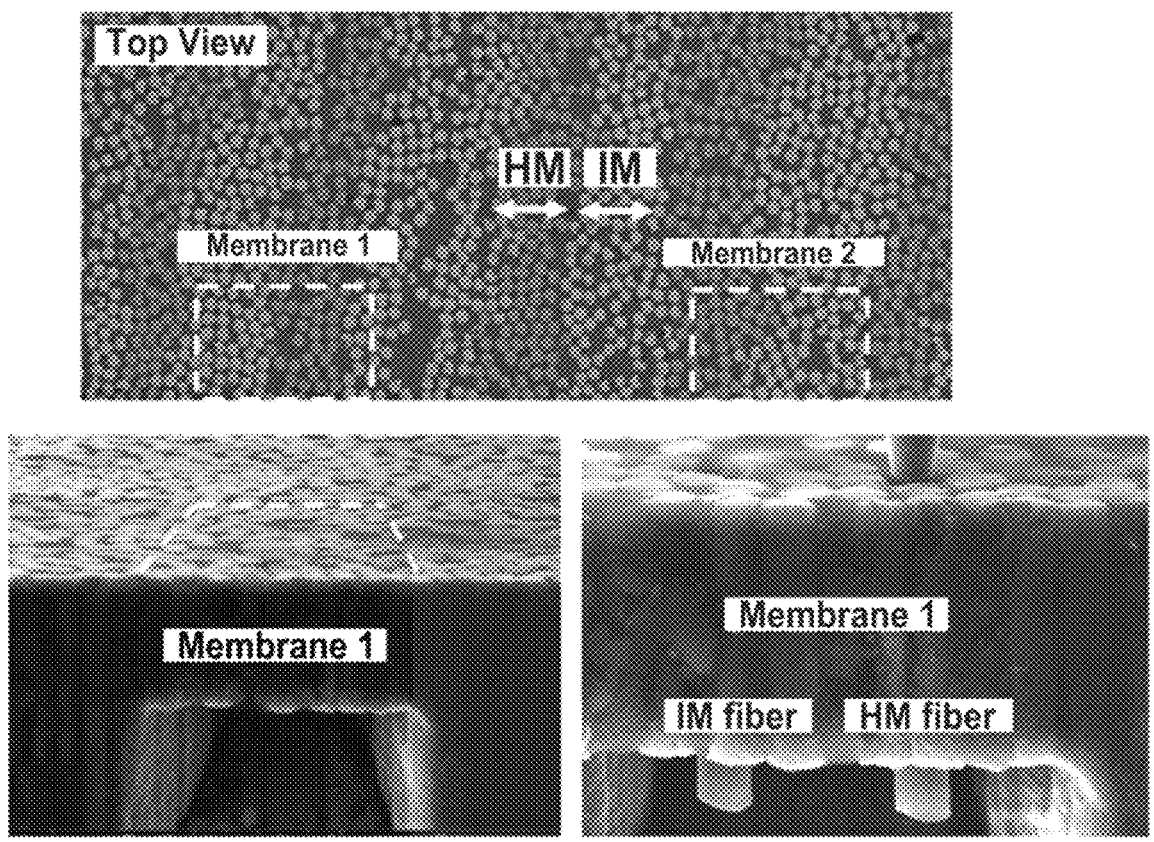
FIG. 46. Optical microscopy has been used to identify different fiber types and map them for in-situ SEM testing.

The color difference in optical micrographs allowed the different types of carbon fibers to be distinguished in the fiber push-out test specimens. The optical microscopy was used to identify different fiber types in the membranes and map them for the in-situ SEM testing. FIG. 46 shows that specific fibers could be strategically selected for the push-out experiments.

Results and Verification

Figure 47:
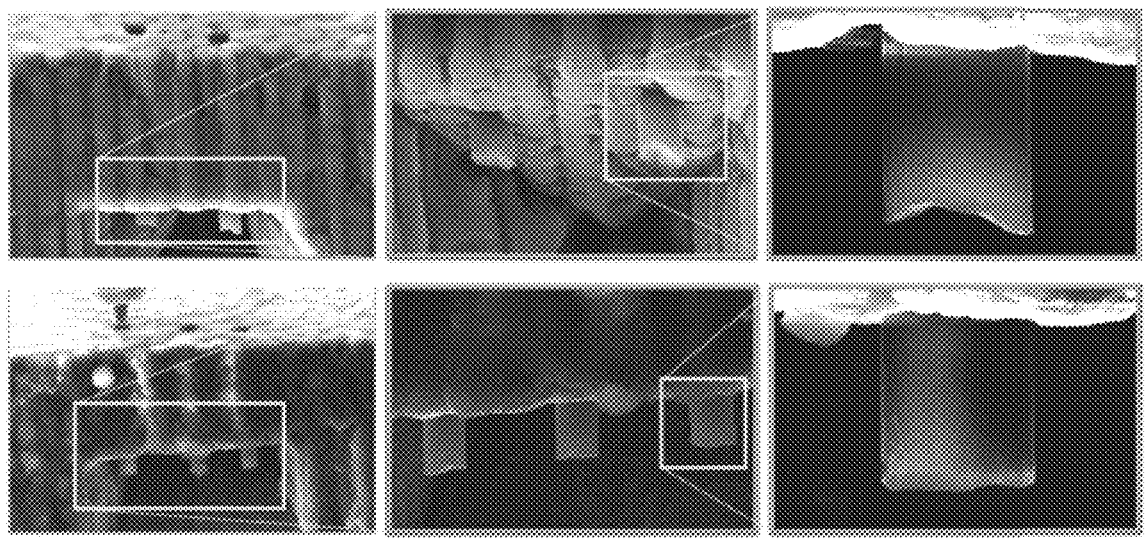
FIG. 47. Typical post-test SEM images showing pushed out fibers.

This section lists the fiber push-out test results for the hybrid HM CFRP (HS40 MR70/F3G) and for the corresponding HM CFRP (HS40/F3G). All the tests exhibited fiber-matrix shear interface failure mode based on SEM imaging FIG. 47 shows typical SEM images after tests providing evidence of the fiber-matrix interface failure.

Figure 48:
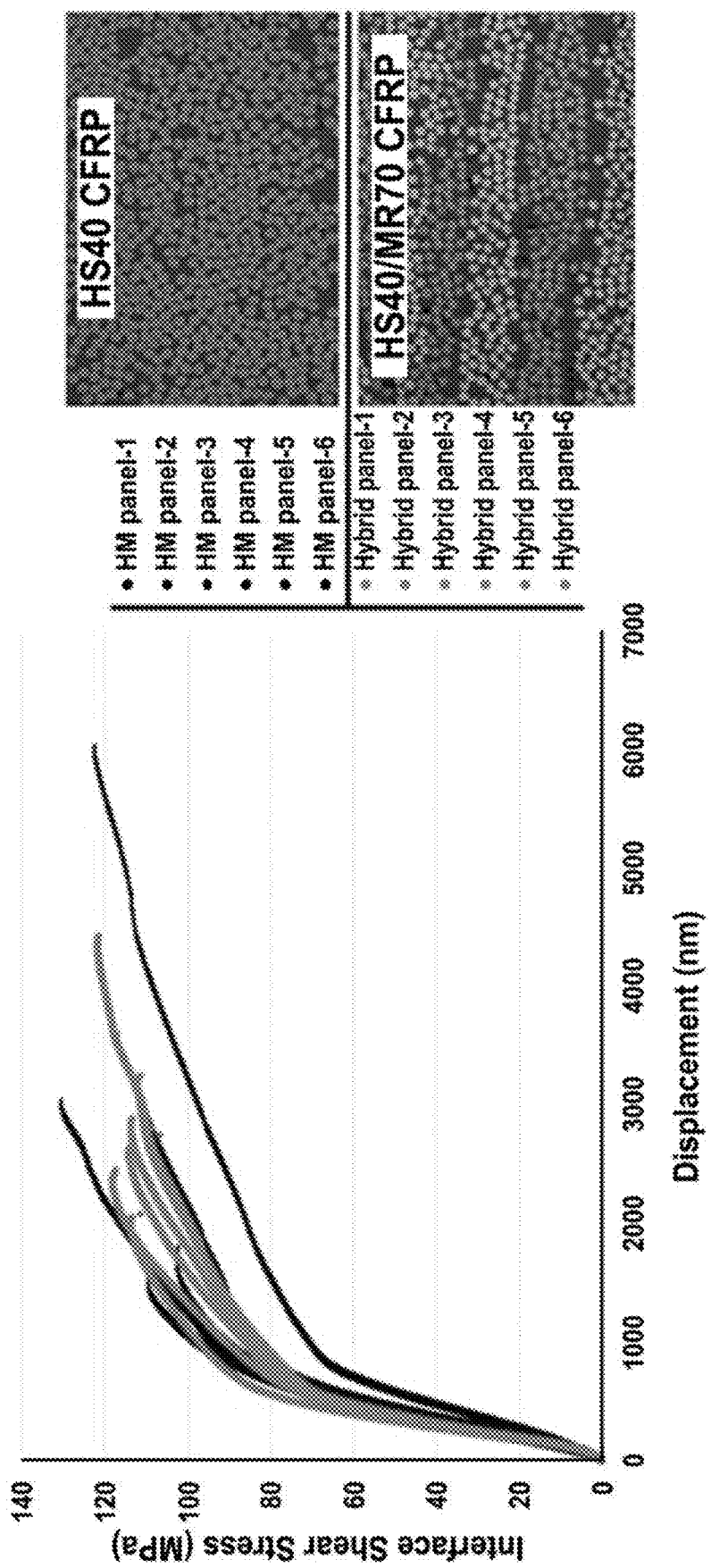
FIG. 48. Fiber-matrix interface shear stress vs. indentation depth (displacement) obtained from fiber push-out tests on HM carbon fibers in hybrid and HM CFRPs.

To verify that darker fibers in the optical micrographs are indeed the HM carbon fibers, such fibers, mapped in the hybrid CFRP membranes, as well as randomly selected fibers in the HM CFRP on membranes were pushed out. FIG. 48 shows interface shear stress-displacement (indentation depth) test data. A 15.8 ksi (109 Mpa) average fiber-matrix IFSS value and a 10% coefficient of variation (COV) were obtained in the hybrid CFRP panel while the HM CFRP panel without the integrated IM carbon fibers provided a 15.9 ksi (110 Mpa) average IFSS value and a 9% COV. Such test results also demonstrate a consistent HM fiber-matrix interface shear strength across different material configurations including the hybrid HM CFRP as well as another CFRP with HM fibers only.

Figure 49:
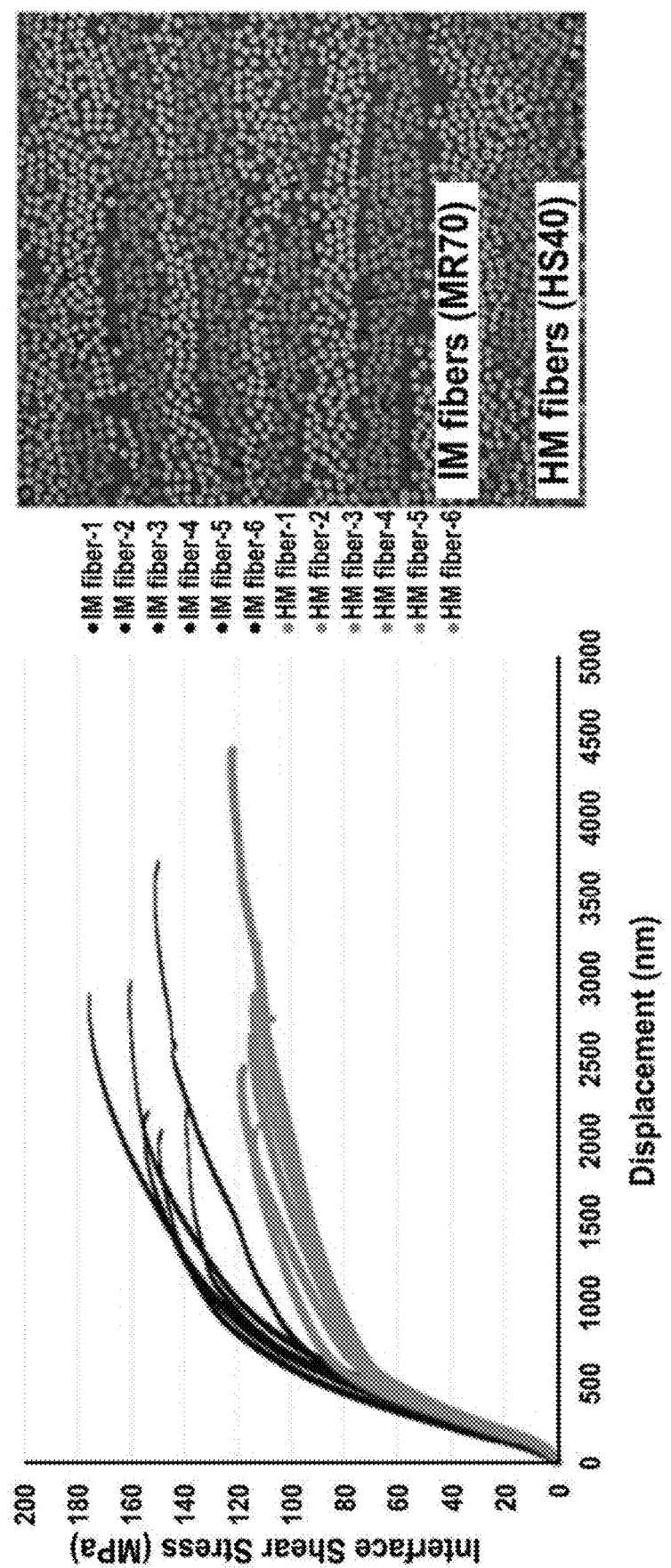
FIG. 49. Fiber-matrix interface shear stress vs. indentation depth (displacement) obtained from fiber push-out tests on IM and HM carbon fiber in hybrid CFRP.

FIG. 49 shows interface shear stress-displacement results for the different fiber types in the hybrid HM CFRP material system. The IM (MR70) carbon fibers exhibited a 22.3 ksi (154 MPa) average IFSS value and a 7% COV while the HM (HS40) fibers had a 15.8 ksi (109 MPa) average IFSS value—a 30% reduction indicating a much weaker HM fiber-matrix interface compared to the IM carbon fibers.

The fiber-matrix interface shear strength reduction has been verified on the HM CFRP without the integrated IM fibers (FIG. 48). Such a strong IFSS reduction corresponds to a much lower fiber-direction compressive strength of the HM CFRP. Indeed, the hybrid HM CFRP has a 204 ksi (1.41 GPa) fiber-direction compressive strength [29, 51] while the HM CFRP without the integrated IM fibers exhibits a 22% lower 158 ksi (1.09 GPa) fiber-direction compressive strength [51].

Conclusions

This work improved the understanding of fiber-direction compressive strength improvement of HM CFRPs with varying modulus fibers. Weaker HM fiber-matrix interfaces than with IM fibers can correspond to lower fiber-direction compressive strength of the HM CFRP compared to their hybrid HM/IM composite material system. In-situ scanning electron microscopy (SEM) based experiments measured fiber-matrix interface shear strength. Standing challenges associated with manufacturing high-quality samples as well as distinguishing same-diameter HM and IM carbon fibers in the hybrid composite material system were addressed. The experiments show a decrease in the average values of the fiber-matrix interface shear strength for the HM carbon fibers as compared to the IM carbon fibers in the hybrid material system. The fiber-matrix interface shear strength reduction was verified on the HM CFRP without the integrated IM fibers. Such a reduction corresponds to a lower fiber-direction compressive strength of the HM CFRP. The results support the idea of integrating off-the-shelf IM carbon fibers with stronger fiber-matrix interface and higher shear modulus into a HM CFRP to improve fiber-direction compressive strength of the HM composite material system. As off-the-shelf IM fiber-matrix interface is stronger in shear, and such fibers have higher shear modulus compared to HM fibers (which has been confirmed), integrating the appropriate off-the-shelf IM carbon fibers into a HM carbon-fiber composite may offload the HM fibers thus improving shear-driven fiber-direction compressive strength of the HM composite material system.

REFERENCES

[29] A. Makeev, S. Ghaffari and G. Seon, "Improving compressive strength of high modulus carbon-fiber reinforced polymeric composites through fiber hybridization," International Journal of Engineering Science, vol. 142, pp. 145-157, 2019.

[30] A. M. Waas and C. R. Schultheisz, "Compressive failure of composites, part II: Experimental studies," Progress in Aerospace Sciences, vol. 32, no. 1, pp. 43-78, 1996.

[31] P. M. Moran and C. F. Shih, "Kink band propagation and broadening in ductile matrix fiber composites: Experiments and analysis," International Journal of Solids and Structures, vol. 35, no. 15, pp. 1709-1722, 1998.

[32] P. M. Moran, X. H. Liu and C. F. Shih, "Kink band formation and band broadening in fiber composites under compressive loading," Acta Metallurgica et Materialia, vol. 43, no. 8, pp. 2943-2958, 1995.

[33] Y. Wang, Y. Chai, C. Soutis and P. J. Withers, "Evolution of kink bands in a notched unidirectional carbon fibre-epoxy composite under four-point bending," Composites Science and Technology, vol. 172, pp. 143-152, 2019.

[34] J. Hapke, F. Gehrig, N. Huber, K. Schulte and E. T. Lilleodden, "Compressive failure of UD-CFRP containing void defects: In situ SEM microanalysis," Composites Science and Technology, vol. 71, no. 9, pp. 1242-1249, 2011.

[35] S. Pimenta, R. Gutkin, S. T. Pinho and P. Robinson, "A micromechanical model for kink-band formation: Part I—Experimental study and numerical modelling," Composites Science and Technology, vol. 69, no. 7-8, pp. 948-955, 2009.

[36] M. F. Sutcliffe and N. A. Fleck, "Microbuckle propagation in carbon fibre-epoxy composites," Acta metallurgica et materialia, vol. 42, no. 7, pp. 2219-2231, 1994.

[37] Y. Wang, T. L. Burnett, Y. Chai, C. Soutis, P. J. Hogg and P. J. Withers, "X-ray computed tomography study of kink bands in unidirectional composites," Composite Structures, vol. 160, pp. 917-924, 2017.

[38] C. R. Schultheisz and A. M. Waas, "Compressive failure of composites, part I: testing and micromechanical theories," Progress Aerospace Science, vol. 32, 1996.

[39] J. L. Wind, A. M. Waas and H. M. Jensen, "Initiation of failure at notches in unidirectional fiber composites," Composite Structures, vol. 122, pp. 51-56, 2015.

[40] N. F. Dow and B. W. Rosen, "Evaluations of filament-reinforced composites for aerospace structural application," NASA CR-207, 1965.

[41] M. J. Laffan, S. T. Pinho, P. Robinson, L Iannucci and A. J. McMillan, "Measurement of the fracture toughness associated with the longitudinal fibre compressive failure mode of laminated composites," Composites: Part A, vol. 43, no. 11, pp. 1930-1938, 2012.

[42] C. Soutis and N. A. Fleck, "Static Compression Failure of Carbon Fibre T800/924C Composite Plate with a Single Hole," Journal of Composite Materials, vol. 24, no. 5, p. 536-558, 1990.

[43] S. Sivashanker, N. A. Fleck and M. P. F. Sutcliffe, "Microbuckle propagation in a unidirectional carbon fibre-epoxy matrix composite," Acta Materialia, vol. 44, no. 7, pp. 2581-2590, 1996.

[44] Y. Wang, C. Soutis and P. J. Withers, "X-RAY MICROTOMOGRAPHIC IMAGING OF KINK BANDS IN CARBON FIBRE-EPDXY COMPOSITES," in 16TH EUROPEAN CONFERENCE ON COMPOSITE MATERIALS, Seville, Spain, 2014.

[45] M. F. Sutcliffe and N. A. Fleck, "Microbuckle propagation in carbon fiber-epoxy composites," Acta Metallurgica et Materialia, vol. 42, no. 7, pp. 2219-2231, 1994.

[46] S. Ghaffari, G. Seon, A. Makeev, E. Iarve and D. Mollenhauer, "Microstructural Methods for Developing High-Performance Composite Materials," in AIAA SciTech Forum, Orlando, 2020.

[47] M. S. Madhukar and L. T. Drzal, "Fiber-Matrix Adhesion and Its Effect on Composite Mechanical Properties. III. Longitudinal (0°) Compressive Properties of Graphite/Epoxy Composites," Journal of Composite Materials, vol. 26, no. 3, p. 310-333, 1992.

[48] N. F. Dow and I. J. Gruntfest, "Determination of Most-Needed, Potentially Possible Improvements in Materials for Ballistic and Space Vehicles," T. I. S. R60SD389, General Electric Company AirForce Contract AF 04 (6471-269, 1960.

[49] C. K. H. Dharan and L. Chun-Liang, "Longitudinal Compressive Strength of Continuous Fiber Composites," Journal of COMPOSITE MATERIALS, vol. 41, no. 11, 2007.

[50] F. Naya, M. Herráez, C. S. Lopes, C. González, S. Van der Veen and F. Pons, "Computational micromechanics of fiber kinking in unidirectional FRP under different environmental conditions," Composites Science and Technology, vol. 144, pp. 26-35, 2017.

[51] S. Ghaffari, A. Makeev, D. Kuksenko and G. Seon, "Understanding High-Modulus CFRP Compressive Strength Improvement," in ASC 34th Technical Conference, Atlanta, 2019.

[52] E. Totry, J. M. Molina-Aldareguía, C. González and J. LLorca, "Effect of fiber, matrix and interface properties on the in-plane shear deformation of carbon-fiber reinforced composites," Composites Science and Technology, p. 970-980, 2010.

[53] D. D. Chung, Carbon Fiber Composites, Elsevier, 2012.

[54] J. A. Nairn and Y. C. Liu, "STRESS TRANSFER INTO A FRAGMENTED, ANISOTROPIC FIBER THROUGH AN IMPERFECT INTERFACE," International Journal of Solids Structures, vol. 34, no. 10, pp. 1255-1281, 1996.

[55] X.-F. Zhou, H. D. Wagner and S. R. Nutt, "Interfacial properties of polymer composites measured by push-out and fragmentation tests," Composites Part A: Applied Science and Manufacturing, vol. 32, no. 11, pp. 1543-1551, 2001.

[56] R. Young, C. Thongpin, J. Stanford and P. Lovell, "Fragmentation analysis of glass fibres in model composites through the use of Raman spectroscopy," Composites Part A: Applied Science and Manufacturing, vol. 32, no. 2, pp. 253-269, 2001.

[57] S. Zhandarov and E. Mäder, "Characterization of fiber/matrix interface strength: applicability of different tests, approaches and parameters," Composites Science and Technology, vol. 65, no. 1, pp. 149-160, 2005.

[58] D. B. Marshall, "An Indentation Method for Measuring Matrix-Fiber Frictional Stresses in Ceramic Composites," The American Ceramic Society, vol. 67, no. 12, pp. C-259-C-260, 1984.

[59] D. B. Marshall and W. C. Oliver, "Measurement of Interfacial Mechanical Properties in Fiber-Reinforced Ceramic Composites," American Ceramic Society, vol. 70, no. 8, pp. 542-548, 1987.

[60] N. Chandra and H. Ghonem, "Interfacial mechanics of push-out tests: theory and experiments," Composites: Part A, vol. 32, pp. 575-584, 2001.

[61] L. P. Canal, C. Gonzalez, J. Segurado and J. Llorca, "Intraply fracture of fiber-reinforced composites: Microscopic mechanisms and modeling," Composites Science and Technology, pp. 1223-1232, 2012.

[62] J. Sha, J. Dai, J. Li, Z. Wei, J.-M. Hausherr and W. Krenkel, "Measurement and analysis of fiber-matrix interface strength of carbon fiber-reinforced phenolic resin matrix composites," Journal of Composite Materials, vol. 48, no. 11, pp. 1303-1311, 2014.

[63] A. Godara, L. Gorbatikh, G. Kalinka, A. Warrier, O. Rochez, L. Mezzo, L. Luizi, A. van Vuure, S. Lomov and I. Verpoest, "Interfacial shear strength of a glass fiber/epoxy bonding in composites modified with carbon nanotubes," Composites Science and Technology, pp. 1346-1352, 2010.

[64] F. Naya, J. Molina-Aldareguia, C. Lopes, C. Gonzalez and J. LLorca, "Interface Characterization in Fiber-Reinforced Polymer-Matrix Composites," The minerals, Metals & Materials Society, 2016.

[65] R. J. Kerans and T. A. Parthasarathy, "Theoretical Analysis of the Fiber Pullout and Pushout Tests," Jornal Of the American Ceramic Society, 1991.

[66] P. J. Herrera-Franco and L. T. Drzal, "Comparison of methods for the measurement of fibre/matrix adhesion in composites," Composites, vol. 23, no. 1, pp. 2-27, 1992.

[67] A. Salama, L. Li, P. Mativenga and A. Sabli, "High-power picosecond laser drilling/machining of carbon fibre-reinforced polymer (CFRP) composites," Applied physics A, vol. 73, no. 122, 2016.

[68] X. Liu, D. Du and G. Mourou, "Laser ablation and micromachining with ultrashort laser pulses," IEEE Journal of Quantum Electronics, vol. 33, no. 10, pp. 1706-1716, 1997.

[69] C. Loumena, M. Nguyen, J. Lopez and R. Kling, "Potentials for lasers in CFRP production," International Congress on Applications of Lasers & Electro-Optics, no. 1, pp. 1026-1034, 2012.

[70] H. Niino, Y. Harada, K. Anzai, M. Matsushita, K. Furukawa, M. Nishino, A. Fujisaki and T. Miyato, "Laser Cutting of Carbon Fiber Reinforced Plastics (CFRP and CFRTP) by IR Fiber Laser Irradiation," JLMN-Journal of Laser Micro/Nanoengineering, vol. 11, no. 1, pp. 104-110, 2016.

[71] R. S. Patel and J. M. Bovatsek, "LASER MACHINING OF CFRP," in 21st International Conference on Composite Materials, Xi'an, 2017.

[72] M. H. El-Hofy and H. El-Hofy, "Laser beam machining of carbon fiber reinforced composites: a review," The International Journal of Advanced Manufacturing Technology, vol. 101, p. 2965-2975, 2019.

[73] R. Suriano, A. Kuznetsov, S. M. Eaton, R. Kiyan, G. Cerullo, R. Osellame, B. N. Chichkov, M. Levi and S. Turri, "Femtosecond laser ablation of polymeric substrates for the fabrication of microfluidic channels," Applied Surface Science, vol. 257, no. 14, pp. 6243-6250, 2011.

[74] R. Weber, T. Graf, P. Berger, V. Onuseit, M. Wiedenmann, C. Freitag and A. Feuer, "Heat accumulation during pulsed laser materials processing," Optics Express, vol. 22, no. 9, pp. 11312-11324, 2014.

The compositions, devices, and methods of the appended claims are not limited in scope by the specific devices and methods described herein, which are intended as illustrations of a few aspects of the claims and any devices and methods that are functionally equivalent are within the scope of this disclosure. Various modifications of the compositions, devices, and methods in addition to those shown and described herein are intended to fall within the scope of the appended claims. Further, while only certain representative compositions, devices, and methods, and aspects of these compositions, devices, and methods are specifically described, other compositions, devices, and methods and combinations of various features of the compositions, devices, and methods are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A composite material comprising:
   a polymer and a hybrid layer substantially encapsulated by the polymer,
   wherein the polymer comprises an epoxy resin,
   wherein the hybrid layer comprises:
      a plurality of intermediate-modulus (IM) carbon fibers;
      a plurality of high-modulus (HM) carbon fibers; and
      a toughening agent comprising a plurality of particles;
      wherein the plurality of IM carbon fibers and the plurality of HM carbon fibers are entangled on a fiber level within the hybrid layer; and
      wherein the toughening agent is dispersed throughout the hybrid layer; and
   wherein the composite material has a higher axial modulus than the corresponding material in the absence of the plurality of HM carbon fibers;
   wherein the composite material has a higher fiber-direction compressive strength than the corresponding material in the absence of the plurality of IM carbon fibers; and
   wherein the composite material has a higher fiber-direction compressive strength than the corresponding material in the absence of the toughening agent.

2. The composite material of claim 1, wherein the composite material has an axial modulus that is higher than the axial modulus of the corresponding material in the absence of the plurality of HM carbon fibers by 30% or more.

3. The composite material of claim 1, wherein the composite material has an improved microstructural stability and fiber-direction compression strength than the corresponding material in the absence of the plurality of IM carbon fibers, the plurality of HM carbon fibers, the toughening agent, or a combination thereof.

4. The composite material of claim 1, wherein the composite material has an axial modulus of from 20 Megapounds per square inch (Msi) to 50 Msi.

5. The composite material of claim 1, wherein the composite material has a fiber-direction compressive strength of from 120 kilo-pounds per square inch (ksi) to 300 ksi.

6. The composite material of claim 1, wherein the composite material has a shear modulus of from 0.6 Msi to 2 Msi.

7. The composite material of claim 1, wherein the composite material has a shear modulus and an axial modulus and the ratio of the shear modulus to the axial modulus is from 2% to 10%.

8. The composite material of claim 1, wherein the composite material comprises the polymer in an amount of from 25% to 75% by weight based on the weight of the composite material.

9. The composite material of claim 1, wherein the plurality of particles comprising the toughening agent have an average particle size of from 10 nanometers (nm) to 500 nm.

10. The composite material of claim 1, wherein the plurality of particles comprising the toughening agent comprise carbon nanotubes, graphene, silica, or a combination thereof.

11. The composite material of claim 1, wherein the composite material comprises the toughening agent in an amount of from 0.5% to 75% by weight based on the weight of the polymer in the composite material.

12. The composite material of claim 1, wherein the toughening agent is dispersed substantially evenly throughout the hybrid layer.

13. The composite material of claim 1, wherein the plurality of IM carbon fibers, the plurality of HM carbon fibers, or a combination thereof comprise polyacrylonitrile based carbon fibers.

14. The composite material of claim 1, wherein the hybrid layer comprises an amount of the plurality of IM carbon fibers and an amount of the plurality of HM carbon fibers and wherein the ratio of the amount of the plurality of IM carbon fibers to the amount of the plurality of HM carbon fibers (IM:HM) is 1:1 or more (w/w).

15. The composite material of claim 1, wherein the plurality of IM carbon fibers, the plurality of HM carbon fibers, or a combination thereof have an average diameter of from 1 micrometer (micron, μm) to 20 μm.

16. The composite material of claim 1, wherein the plurality of IM carbon fibers and the plurality of HM fibers have substantially the same average diameter.

17. A method of making the composite material of claim 1, the method comprising:
   entangling the plurality of IM carbon fibers with the plurality of HM carbon fibers on a fiber level to form an entangled layer;
   dispersing the toughening agent within a polymer precursor for form a precursor solution;
   coating the entangled layer with the precursor solution to form a coated layer; and
   curing the polymer precursor of the coated layer to thereby form the composite material.

18. A method of use of the composite material of claim 1, the method comprising using the composite material to fabricate a portion of an aircraft.

* * * * *